United States Patent
Okada et al.

(10) Patent No.: US 6,529,682 B1
(45) Date of Patent: Mar. 4, 2003

(54) INFORMATION RECORDING MEDIUM, APPARATUS AND METHOD FOR PERFORMING AFTER-RECORDING ON THE RECORDING MEDIUM

(75) Inventors: Tomoyuki Okada, Katano (JP); Kaoru Murase, Nara (JP); Noriko Sugimoto, Takarazuka (JP); Kazuhiro Tsuga, Takarazuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 179 days.

(21) Appl. No.: 09/672,960

(22) Filed: Sep. 29, 2000

Related U.S. Application Data

(62) Division of application No. 09/504,938, filed on Feb. 16, 2000, now Pat. No. 6,374,037.

(30) Foreign Application Priority Data

Feb. 17, 1999 (JP) .............................................. 11-38370

(51) Int. Cl.⁷ ................................................ H04N 5/781
(52) U.S. Cl. ............................. 386/95; 386/96; 386/98; 386/125
(58) Field of Search ................... 386/39, 45, 95–107, 386/125–126; 360/27, 66; 369/32; H04N 5/76, 5/92, 5/781, 9/79

(56) References Cited

U.S. PATENT DOCUMENTS 5,737,478 A 4/1998 Yamagishi et al.

FOREIGN PATENT DOCUMENTS

| EP | 0 295 148 | 12/1988 |
|----|-----------|---------|
| EP | 0 639-927 | 2/1995 |
| EP | 0 644 692 | 3/1995 |
| EP | 903 738 | 3/1999 |
| EP | 0 903 742 | 3/1999 |
| EP | 0 924 704 | 6/1999 |
| EP | 926 903 | 6/1999 |
| EP | 1024492 | 8/2000 |
| JP | 7-93873 | 4/1995 |
| JP | 8-7282 | 1/1996 |
| JP | 2000-23102 | 1/2000 |
| WO | 97/03443 | 1/1997 |

Primary Examiner—Thai Tran
(74) Attorney, Agent, or Firm—Wenderoth, Lind & Ponack, L.L.P.

(57) ABSTRACT

The invention provides an information recording medium such as an optical disk, having a large capacity and being capable of performing read/write operations at high speeds. The recording medium includes audio stream prepared for after-recording data, and a audio attribute information having a bit rate information to the recorded audio stream as a management information. A recorder according to the invention has a check unit for checking, in advance, the possibility of after-recording operation of the recorder to the audio stream to be after-recorded with reference to the bit rate information of the audio attribute information.

24 Claims, 56 Drawing Sheets

Fig. 7

| VERN | | | | | | | | |
|---|---|---|---|---|---|---|---|---|
| b15 | b14 | b13 | b12 | b11 | b10 | b9 | b8 | |
| | | | reserved | | | | | |
| b7 | b6 | b5 | b4 | b3 | b2 | b1 | b0 | |
| | | | Book version | | | | | |

| TM_ZONE | | | | | | | | |
|---|---|---|---|---|---|---|---|---|
| b15 | b14 | b13 | b12 | b11 | b10 | b9 | b8 | |
| | TZ_TY | | | | TZ_OFFSET[11..8] | | | |
| b7 | b6 | b5 | b4 | b3 | b2 | b1 | b0 | |
| | | | TZ_OFFSET[7..0] | | | | | |

Fig.9

| PL_TY | | | | | | | |
|---|---|---|---|---|---|---|---|
| b7 | b6 | b5 | b4 | b3 | b2 | b1 | b0 |
| PL TY1 | | | | reserved | | | |

| PL_CREATE_TM | | | | | | | |
|---|---|---|---|---|---|---|---|
| b39 | b38 | b37 | b36 | b35 | b34 | b33 | b32 |
| | | | Year[13..6] | | | | |
| b31 | b30 | b29 | b28 | b27 | b26 | b25 | b24 |
| Year[5..0] | | | | | | Month[3..2] | |
| b23 | b22 | b21 | b20 | b19 | b18 | b17 | b16 |
| Month[1..0] | | Day[4..0] | | | | Hour[4] | |
| b15 | b14 | b13 | b12 | b11 | b10 | b9 | b8 |
| Hour[3..0] | | | | Minute[5..2] | | | |
| b7 | b6 | b5 | b4 | b3 | b2 | b1 | b0 |
| Minute[1..0] | | Second [5..0] | | | | | |

*Fig.10*

| PTM describing format | | | | | | |
|---|---|---|---|---|---|---|
| b47 | b46 | b45 | b44 | b43 | b42 | b41 | b41 |
| b39 | b38 | b37 | b36 | b35 | b34 | b33 | b32 |
| | | | PTM_base[31..24] | | | | |
| b31 | b30 | b29 | b28 | b27 | b26 | b25 | b24 |
| | | | PTM_base[23..16] | | | | |
| b23 | b22 | b21 | b20 | b19 | b18 | b17 | b16 |
| | | | PTM_base[15..8] | | | | |
| b15 | b14 | b13 | b12 | b11 | b10 | b9 | b8 |
| | | | PTM_base [7..0] | | | | |
| b7 | b6 | b5 | b4 | b3 | b2 | b1 | b0 |
| | | | PTM_extension[15..8] | | | | |
| | | | PTM_extension [7..0] | | | | |

Fig.11

S_VOB_ENTN describing format

| | | | | S_VOB_ENTN | | | |
|---|---|---|---|---|---|---|---|
| b47 | b46 | b45 | b44 | b43 | b42 | b41 | b41 |
| b39 | b38 | b37 | b36 | b35 | b34 | b33 | b32 |
| b31 | b30 | b29 | b28 | b27 | b26 | b25 | b24 |
| b23 | b22 | b21 | b20 | b19 | b18 | b17 | b16 |
| b15 | b14 | b13 | b12 | b11 | b10 | b9 | b8 |
| b7 | b6 | b5 | b4 | b3 | b2 | b1 | b0 |
| reserved | | | | | | | |
| reserved | | | | | | | |
| reserved | | | | | | | |
| reserved | | | | | | | |

Fig.13

V_ATR

| b15 | b14 | b13 | b12 | b11 | b10 | b9 | b8 |
|---|---|---|---|---|---|---|---|
| Video compression mode | | TV system | | Aspect ratio | | reserved | |
| b7 | b6 | b5 | b4 | b3 | b2 | b1 | b0 |
| line21_switch_1 | line21_switch_2 | Video resolution | | | reserved | | |

A_ATR0/1

| b23 | b22 | b21 | b20 | b19 | b18 | b17 | b16 |
|---|---|---|---|---|---|---|---|
| Audio coding mode | | | reserved | | | Application Flag | |
| b15 | b14 | b13 | b12 | b11 | b10 | b9 | b8 |
| Quantization/DRC | | fs | | | Number of Audio channels | | |
| b7 | b6 | b5 | b4 | b3 | b2 | b1 | b0 |
| Bitrate | | | | | | | |

Fig. 14

SP_ATR

| b15 | b14 | b13 | b12 | b11 | b10 | b9 | b8 |
|---|---|---|---|---|---|---|---|
| " | reserved | | | | | Application Flag | |
| b7 | b6 | b5 | b4 | b3 | b2 | b1 | b0 |
| reserved | | | | | | | |

SP_PLT

| b23 | b22 | b21 | b20 | b19 | b18 | b17 | b16 |
|---|---|---|---|---|---|---|---|
| Luminance signal (Y) | | | | | | | |
| b15 | b14 | b13 | b12 | b11 | b10 | b9 | b8 |
| Color difference signal (Cr=R−Y) | | | | | | | |
| b7 | b6 | b5 | b4 | b3 | b2 | b1 | b0 |
| Color difference signal (Cb=B−Y) | | | | | | | |

Fig. 17

| VOB_TY | | | | | | | |
|---|---|---|---|---|---|---|---|
| b15 | b14 | b13 | b12 | b11 | b10 | b9 | b8 |
| TE | A0_STATUS | | A1_STATUS | | reserved | APS | |
| b7 | b6 | b5 | b4 | b3 | b2 | b1 | b0 |
| SML_FLG | A0_GAP_LOC | | A1_GAP_LOC | | reserved | | |

Fig. 19

| VOBU_ENT | | | | | | |
|---|---|---|---|---|---|---|
| b23 | b22 | b21 | b20 | b19 | b18 | b17 | b16 |
| | | | 1STREF_SZ | | | |
| b15 | b14 | b13 | b12 | b11 | b10 | b9 | b8 |
| | | VOBU_PB_TM | | | | VOBU_SZ(upper) |
| b7 | b6 | b5 | b4 | b3 | b2 | b1 | b0 |
| | | | VOBU_SZ(lower) | | | |

Fig.21

V_ATR

| b15 | b14 | b13 | b12 | b11 | b10 | b9 | b8 |
|---|---|---|---|---|---|---|---|
| Video compression mode | | TV system | | Aspect ratio | | reserved | |
| b7 | b6 | b5 | b4 | b3 | b2 | b1 | b0 |
| reserved | | Video resolution | | | reserved | | |

OA_ATR

| b15 | b14 | b13 | b12 | b11 | b10 | b9 | b8 |
|---|---|---|---|---|---|---|---|
| Audio coding mode | | | reserved | | | Application Flag | |
| b7 | b6 | b5 | b4 | b3 | b2 | b1 | b0 |
| Quan./DRC | | fs | | | Number of Audio channels | | |

Fig.22

SP_ATR

| b15 | b14 | b13 | b12 | b11 | b10 | b9 | b8 |
|---|---|---|---|---|---|---|---|
| reserved | | | | | | Application Flag | |
| b7 | b6 | b5 | b4 | b3 | b2 | b1 | b0 |
| reserved | | | | | | | |

SP_PLT

| b23 | b22 | b21 | b20 | b19 | b18 | b17 | b16 |
|---|---|---|---|---|---|---|---|
| Luminance signal (Y) | | | | | | | |
| b15 | b14 | b13 | b12 | b11 | b10 | b9 | b8 |
| Color difference signal (Cr=R−Y) | | | | | | | |
| b7 | b6 | b5 | b4 | b3 | b2 | b1 | b0 |
| Color difference signal (Cb=B−Y) | | | | | | | |

Fig.24

| S_VOB_ENT (TYPE A) 2bytes | |
|---|---|
| S_VOB_ENT_TY | 1byte |
| V_PART_SZ | 1byte |

| S_VOB_ENT (TYPE B) 6bytes | |
|---|---|
| S_VOB_ENT_TY | 1byte |
| V_PART_SZ | 1byte |
| A_PART_SZ | 2bytes |
| A_PB_TM | 2bytes |

Fig.25

| S_VOB_ENT_TY | | | | | | | |
|---|---|---|---|---|---|---|---|
| b7 | b6 | b5 | b4 | b3 | b2 | b1 | b0 |
| MAP_TY | | TE | reserved | | | | SPST_Ns |

Fig.29

| PG_TY | | | | | | | |
|---|---|---|---|---|---|---|---|
| b7 | b6 | b5 | b4 | b3 | b2 | b1 | b0 |
| Protect | reserved | | | | | | |

Fig.31

| C_TY | | | | | | | |
|---|---|---|---|---|---|---|---|
| b7 | b6 | b5 | b4 | b3 | b2 | b1 | b0 |
| C_TY1 | | reserved | | | | | |

Fig.32

| M_C_EPI(Type A) 7bytes |
|---|
| EP TY (1byte) |
| EP PTM (6bytes) |

| M_C_EPI(Type B) 135bytes |
|---|
| EP TY (1byte) |
| EP PTM (6bytes) |
| PRM TXTI (128bytes) |

| S_C_EPI(Type A) 7bytes |
|---|
| EP TY (1byte) |
| S VOB ENTN (6bytes) |

| S_C_EPI(Type B) 135bytes |
|---|
| EP TY (1byte) |
| S VOB ENTN (6bytes) |
| PRM TXTI (128bytes) |

Fig.33

| EP_TY1 | | b6 | b5 | b4 | b3 | b2 | b1 | b0 |
|---|---|---|---|---|---|---|---|---|
| b7 | | | | | | | | |
| EP_TY1 | | | reserved | | | | | |

Fig.39A Video
Fig.39B Video Buffer
Fig.39C MPEG Stream
Fig.39D Audio

Prior Art

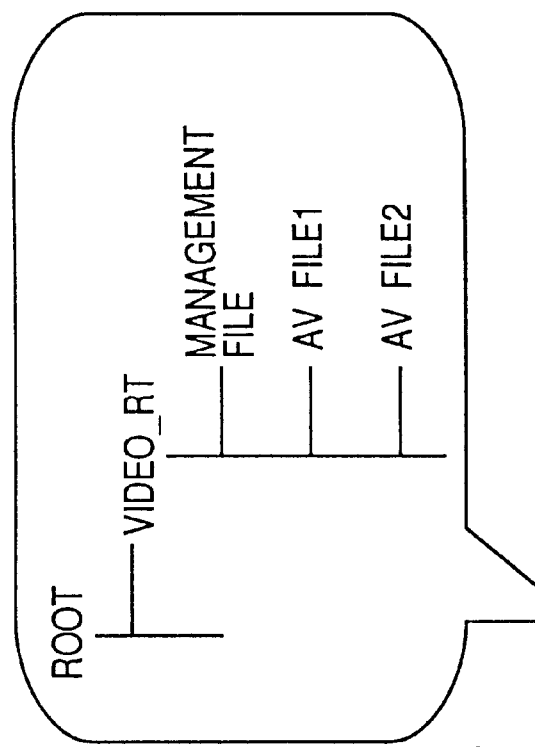
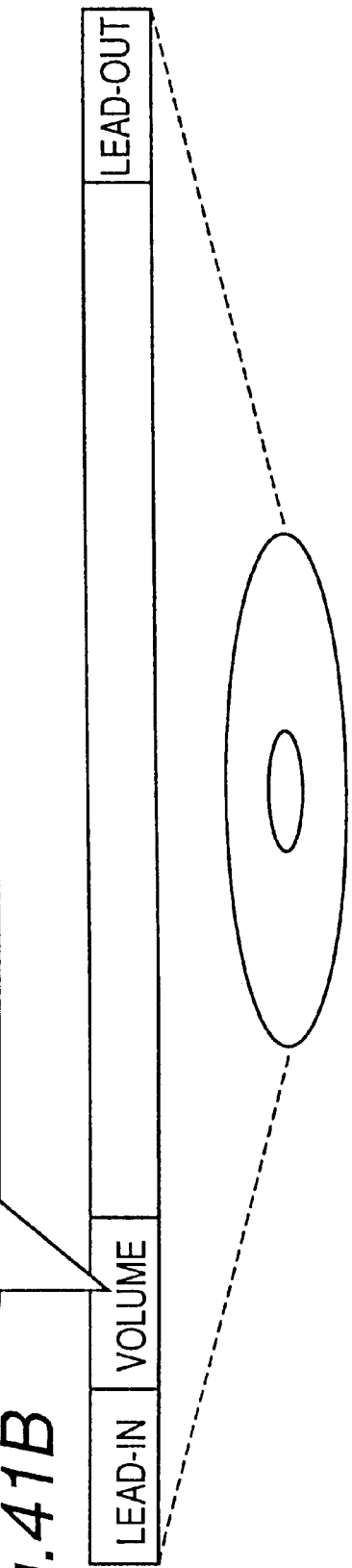
Fig. 41A
Fig. 41B

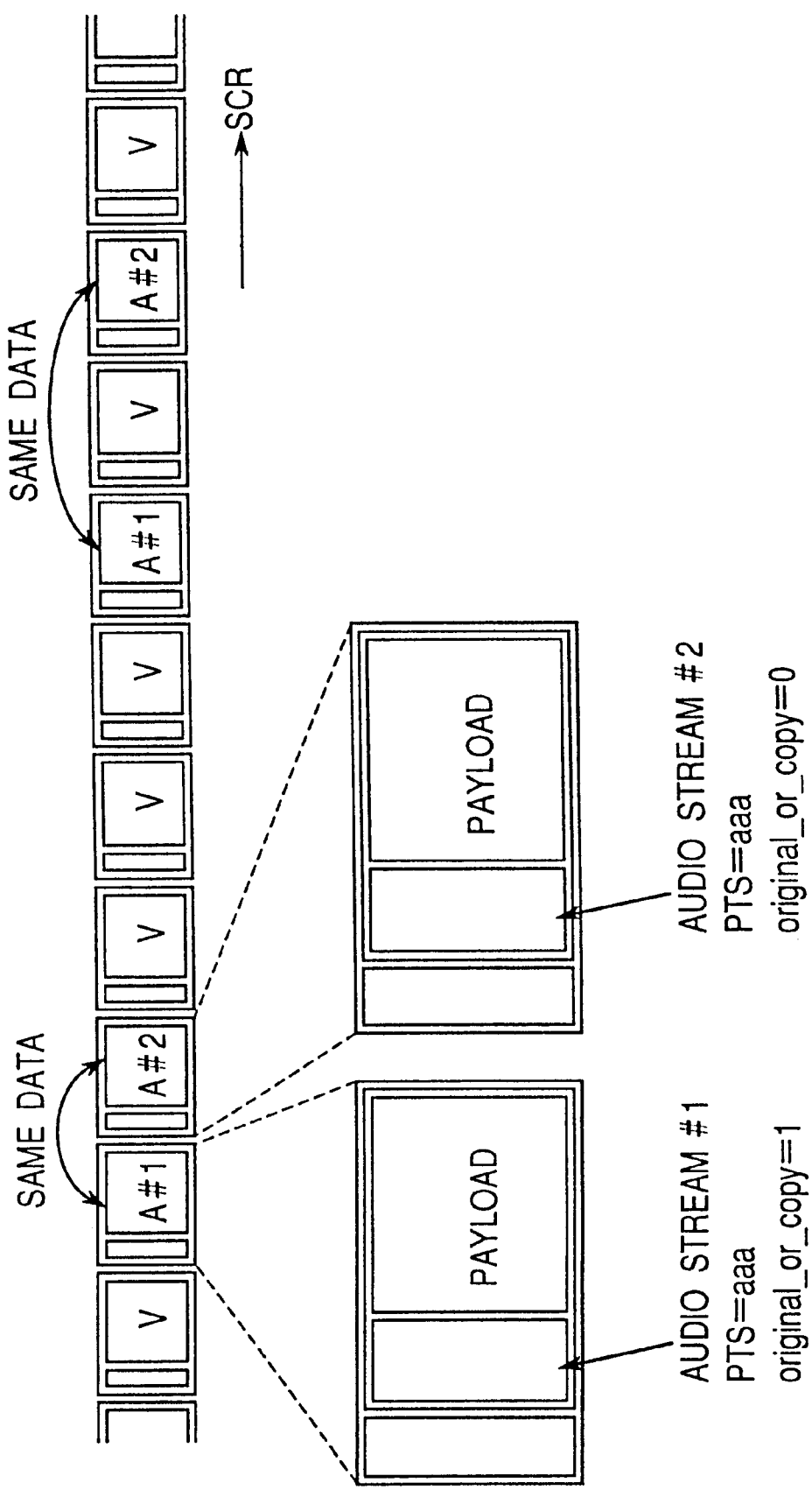

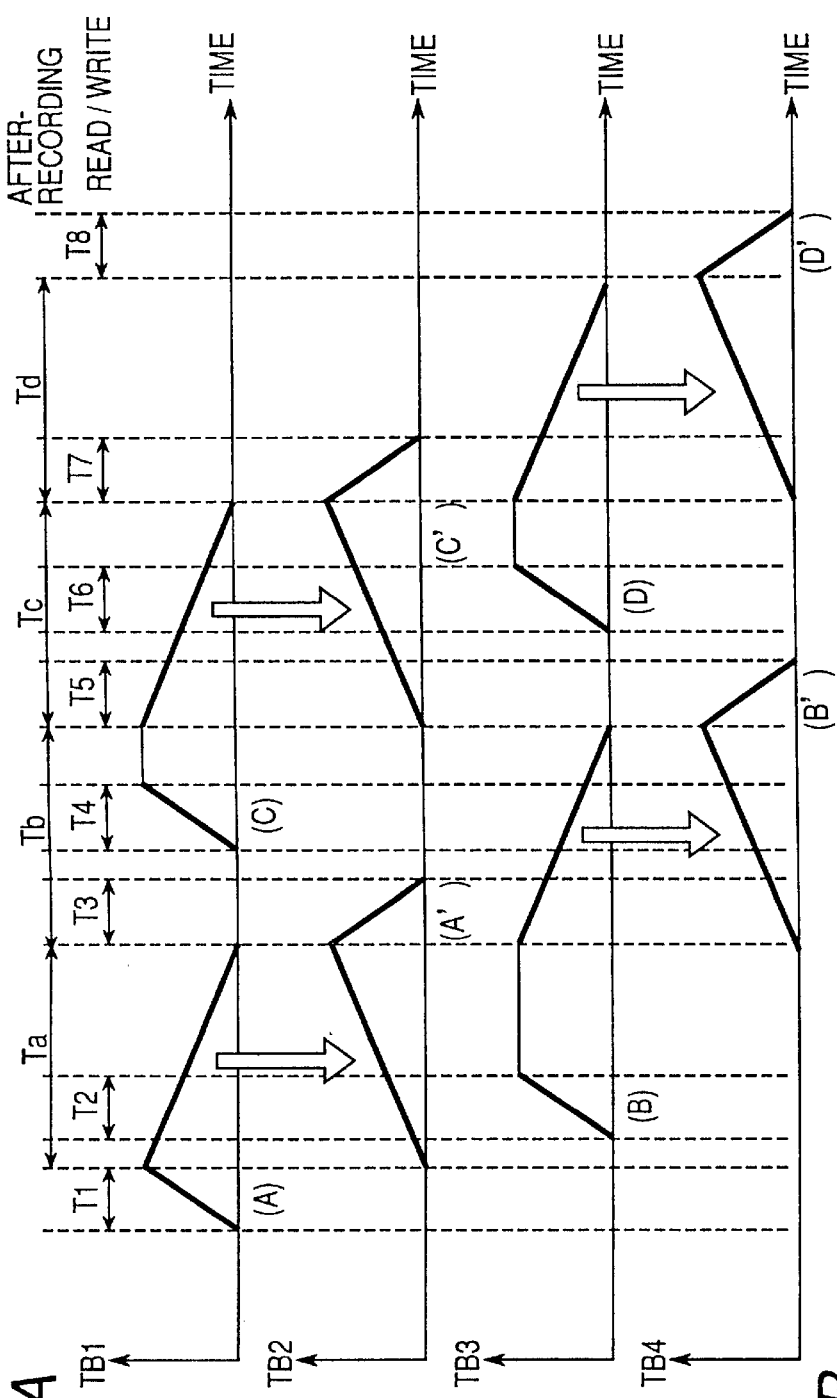
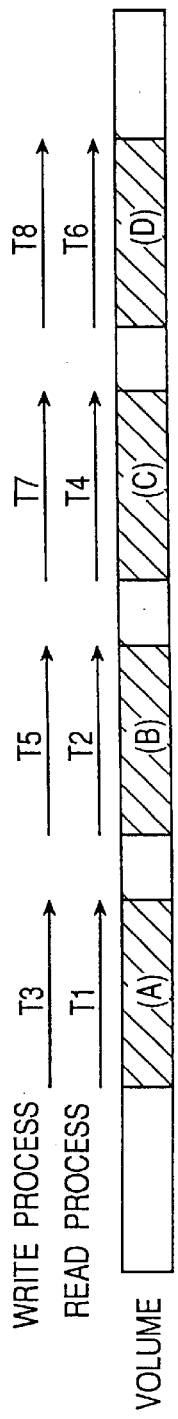
Fig.52A
Fig.52B

INFORMATION RECORDING MEDIUM, APPARATUS AND METHOD FOR PERFORMING AFTER-RECORDING ON THE RECORDING MEDIUM

This is a divisional application of Ser. No. 09/504,938 filed Feb. 16, 2000, now U.S. Pat. No. 6,374,037 B1.

BACKGROUND OF THE INVENTION

1. Field of the Invention

The present invention relates to an information recording medium like an optical disc which has large capacity and to/from which data are written/ read in high speed, and more particularly to a recording medium which can perform after-recording, an apparatus and a method for recording thereto.

2. Related Art

In the field of a writable optical disc having an upper bound of approximately 650 MB, a phase change type disc DVD-RAM having a capacity of several GB has appeared. Moreover, in addition to the practical use of MPEG (MPEG2) which is the coding standard of digital AV data, the DVD-RAM has been expected as recording and reproducing media in the AV field as well as computer application. In other words, it is expected that the DVD-RAM will spread as media in place of a magnetic tape which is conventionally typical AV. recording media.

(Description of DVD-RAM)

In recent years, an enhancement in the density of a writable optical disc has been developed so that it has been possible to record video data as well as computer data and audio data.

For example, a convexo-concavo shaped guide groove has conventionally been formed on the signal recording face of the optical disc. While a signal has conventionally been recorded on only a land portion or a groove portion, it has become possible to record the signal on both the land and groove portions by a land-groove recording method. Consequently, a recording density has been enhanced by approximately twice as much (see Japanese Patent Laid-Open Publication No. 8-7282, for example). Moreover, there has also been devised and practically used a zone CLV method or the like in which the control of a CLV method (constant linear velocity recording) effective in an enhancement in the recording density can be simplified and easily used practically (see Japanese Patent Laid-Open Publication No. 7-93873, for example).

Significant problems in the future are how to record AV data including video data using an optical disc intended to have an increase in a capacity, and how to implement performance greatly exceeding a conventional AV apparatus and new functions.

By the appearance of such a writable optical disc having a large capacity, it can be supposed that an optical disc becomes a mainstream also for AV recording and reproduction in place of a conventional tape. The conversion of recording media from the tape into the disc has various influences on the function and performance of an AV apparatus. The conversion into the disc has the greatest feature that random access performance is considerably enhanced. If the tape is subjected to random access, it is necessary to usually take a time in order of several minutes for one rewinding. This is extraordinarily late as compared with a seek time (20–60 ms or less) on the optical disc media. Accordingly, the tape cannot act as a random access device in respect of practical use. By such random access performance, the distributed recording operation of the AV data which could not be performed by the conventional tape can be implemented by the optical disc.

FIG. 34 is a block diagram showing a drive device of a DVD recorder. In the drawing, the reference numeral 11 denotes a optical pick-up for reading the data of a disc, the reference numeral 12 denotes an ECC (error correcting code) processing section, the reference numeral 13 denotes a track buffer, the reference numeral 14 denotes a switch for switching the input and output to and from the track buffer, the reference numeral 15 denotes an encoder, and the reference numeral 16 denotes a decoder. The reference numeral 17 denotes a enlarged part of the disc.

As shown by the reference numeral 17, data are recorded on the DVD-RAM disc with 1 sector=2 KB as a minimum unit. Moreover, an error correcting processing is executed by the ECC processing section 12 with 16 sectors=1 ECC block.

The track buffer shown by the reference numeral 13 serves to record the AV data with a variable bit rate in order to record the AV data on the DVD-RAM disc more efficiently. While a read/write rate (Va in the drawing) from/to the DVD-RAM is a fixed rate, the AV data change a bit rate (Vb in the drawing) according to the complexity of the contents thereof (a video image, for example). The track buffer 13 serves to absorb a difference in the bit rate. For example, this is not required if the AV data is set to the fixed bit rate as in a video CD.

By utilizing the track buffer 13 still effectively, the AV data can be discretely provided on the disc. Description will be given with reference to FIG. 35.

FIG. 35A is a diagram showing an address space on a disc. In the case where the AV data are separately recorded in a continuous region of [a1, a2] and a continuous region of [a3, a4] as shown in FIG. 35A, the AV data can be continuously reproduced by supplying data stored in the track buffer 13 to the decoder 16 while a seek is being carried out from a2 to a3. A status obtained at this time is shown in FIG. 35B.

The AV data read from a1 are input to the track buffer 13 and output from the track buffer 13 at a time t1, and the data are stored in the track buffer 13 by a rate difference (Va–Vb) between an input rate (Va) to the track buffer 13 and an output rate (Vb) from the track buffer 13. This state continues up to a2 (time t2). When an amount of data stored in the track buffer 13 for this period of time is represented by B (t2), it is sufficient that amount B (t2) stored in the track buffer 13 can be consumed to be continuously supplied to the decoder 16 until a time t3 corresponding to data reading start point of a3.

In other words, if a constant amount of data to be read before the seek or more are kept, the AV data can be continuously supplied even if the seek is generated.

In the above example the description is given to the case where the data are read from the DVD-RAM (that is, playback), however the case where the data is written to the DVD-RAM (that is, picture recording) may be considered similarly.

If the constant amount or more of data are continuously recorded on the DVD-RAM as described above, continuous reproduction/picture recording can be carried out even if the AV data are distributed and recorded on the disc.

(Description of MPEG)

Next, description will be given to the AV data.

As described earlier, the AV data to be recorded on the DVD-RAM use an international standard referred to as MPEG (ISO/IEC13818).

Even a DVD-RAM having a large capacity of several GBs does not always have a sufficient capacity for exactly recording non-compressed digital AV data. Therefore, a method for compressing and recording the AV data is required. As a method for compressing the AV data, the MPEG (ISO/IEC13818) has widely spread in the world. In recent years, the LSI technology has been improved so that MPEG codec (expansion/compression LSI) has been put into practical use. Consequently, the DVD recorder can implement MPEG expansion/compression.

The MPEG mainly has the following two features in order to implement highly efficient data compression.

A first feature is that a compressing method using a time correlation characteristic between frames is introduced in addition to a compressing method using a space frequency characteristic which has conventionally been carried out in the compression of the motion picture data. In the MPEG, each frame (which will be also referred to as a picture in the MPEG) is classified into three kinds of parts, that is, an I picture (intra-frame coding picture), a P picture (a picture using the intra-frame coding and a reference relationship in the past) and a B picture (a picture using the intraframe coding and reference relationships in the past and future), thereby performing data compression.

FIG. 36 is a diagram showing a relationship among the I, P and B pictures. As shown in FIG. 36, the P picture refers to the last I or P picture in the past, and the B picture refers to the closest I or P picture in the past and future. As shown in FIG. 36, moreover, since the B picture refers to the I or P picture in the future, the display order (display order) of each picture and the order (coding order) on the compressed data may be coincident with each other.

A second feature of the MPEG is that coding amount can be assigned dynamically for each picture in accordance with the complexity of the picture. The decoder of the MPEG comprises an input buffer. The decoder can assign a large coding amount to a complex picture which is hard to compress by storing data in the decoder buffer in advance.

Audio data used by the DVD-RAM can be selected for use from three kinds of parts, that is, MPEG audio for carrying out data compression, Dolby digital (AC-3) and non-compressed LPCM. While the Dolby digital and the LPCM have a fixed bit rate, the MPEG audio has a variable bit rate and has a size which is not as great as the size of a video stream but can be selected from plural kinds of sizes in an audio frame unit.

Such AV data are multiplexed into one stream by a method referred to as an MPEG system. FIG. 37 is a diagram showing the structure of the MPEG system. The reference numeral 41 denotes a pack header, the reference numeral 42 denotes a packet header, and the reference numeral 43 denotes a payload. The MPEG system has a hierarchical structure which is referred to as a pack and a packet. The packet comprises the packet header 42 and the payload 43. The AV data are divided per proper size from the head, and are stored in the payload 43. The packet header 42 stores ID (stream ID) for identifying stored data, a decoding time DTS (Decoding Time Stamp) of data (the DTS is omitted if the decoding and the display are carried out at the same time as in the audio data) and a presentation time PTS (Presentation Time Stamp) of the data which are included in the payload represented with a precision of 90 kHz are recorded, as information related to AV data stored in the payload 43. The pack is a unit having a plurality of packets together. In case of the DVD-RAM, one pack is used every packet. Therefore, the pack comprises the pack header 41 and the packet (the packet header 42 and the payload 43). The pack header stores SCR (System Clock Reference) representing with a precision of 27 MHz a time that data in the pack are input to the decoder buffer.

In the DVD-RAM, such an MPEG system stream is recorded by using one pack as one sector (=2048 B).

Next, description will be given to a decoder for decoding the above-mentioned MPEG system stream. FIG. 38 shows a decoder model (PS-TD) of the MPEG system decoder. The reference numeral 51 denotes an STC (System Time Clock) acting as a reference time in the decoder. The reference numeral 52 denotes a demultiplexer for decoding or demultiplexing a system stream. The reference numeral 53 denotes an input buffer of a video decoder. The reference numeral 54 denotes a video decoder. The reference numeral 55 denotes a reorder buffer for temporarily storing the I and P pictures to absorb a difference between the data order and the display order which is made between the I and P pictures and the B picture as described above. The reference numeral 56 denotes a switch for adjusting the order of the outputs of the I and P pictures stored in the reorder buffer and the B picture. The reference numeral 57 denotes an input buffer of an audio decoder. The reference numeral 58 denotes an audio decoder.

Such an MPEG system decoder serves to process the abovementioned MPEG system stream in the following manner. At a time that the time of the STC 51 is coincident with the SCR described in the pack header, the demultiplexer 52 inputs the same pack. The demultiplexer 52 serves to interpret a stream ID in the packet header and to transfer the data of the payload to the decoder buffer for each stream. Moreover, the demultiplexer 52 fetches the PTS and the DTS in the packet header. The video decoder 54 fetches picture data from the video buffer 53 at a time that the time of the STC 51 is coincident with the DTS to carry out a decode processing, and stores the I and P pictures in the reorder buffer 55 and displays the B picture. While the I and P pictures are decoded by the video decoder 54, the switch 56 is connected to the reorder buffer 55 to output a previous I or P picture in the reorder buffer 55. While the B picture is decoded, the switch 56 is connected to the video decoder 54. The audio decoder 58 fetches and decodes data for one audio frame from the audio buffer 57 at a time that the time of the STC 51 and the PTS (there is no DTS in cast of audio) are coincident with each other in the same manner as the video decoder 54.

Next, description will be given to a method for multiplexing the MPEG system stream with reference to FIGS. 39A–39D. FIG. 39A shows a video frame, FIG. 39B shows a status in the video buffer, FIG. 39C shows the MPEG system stream, and FIG. 39D shows audio data. An axis of abscissa indicates a time base which is common to each drawing, and each drawing is represented on the same time base. As shown in FIG. 39B, moreover, an axis of ordinate indicates a buffer usage (the data storage amount of the video buffer), and a thick line in the drawing indicates a transition of the buffer usage on a time basis. Furthermore, the gradient of the thick line is equivalent to the bit rate of the video, and indicates that data are input to the buffer at a constant rate. A reduction in the buffer usage at a constant interval indicates that the data are decoded. Besides, the intersection of an oblique dotted line and the time basis indicates a time that the data transfer of the video frame to the video buffer is started.

Hereinafter, a complex image A in the video data will be described as an example. Since an image A requires a large coding amount as shown in FIG. 39B, the data transfer to the video buffer should be started at a time t1 in the drawing in place of the decoding time of the image A. (A time from the data input start time t1 till the decoding will be referred to as vbv_delay). As a result, the AV data are multiplexed in the position (time) of the video pack shown in an oblique line. On the other hand, the transfer of the audio data which does not require dynamic coding amount control differently from the video data does not need to be particularly made earlier than the decode time. For this reason, generally, the multiplexing is carried out a little before the decode time. Accordingly, the video data and the audio data which are reproduced at the same time are multiplexed in the state in which the video data are preceded. In the MPEG, a time that data can be stored in the buffer is restricted, and all the data but still picture data are defined such that they should be output from the buffer to the decoder within one second after they are input to the buffer. For this reason, a shift of the multiplexing of the video data and the audio data is one second at the maximum (strictly speaking, there is a further shift by the reorder of the video data).

While the video has been followed by the audio in this example, the audio can also be followed by the video in respect of theory. When a simple picture having a high compression ratio is prepared for the video data and the audio data are transferred unnecessary quickly, such data can be created intentionally. However, the precedence can be given within one second at the maximum based on the restrictions of the MPEG.

(Description of Tape Media)

Next, description will be given to tape media.

FIG. 40 is a diagram illustrating a relation between a tape and a tape recorder (recording head). As shown in the figure, recording areas for video data and audio data are separately provided in parallel with a tape running direction. Therefore it is easy to record audio data independently. In a conventional analog video tape recorder, reproduction and recording can be carried out simultaneously with one head since a delay time from reproduction to recording is almost zero.

The DVD-RAM expected as the next generation AV recording media for example has the following problems.

The biggest problem to an after-recording operation in the DVD recorder is caused by an MPEG stream which is AV data to be recorded by the DVD recorder and the difference of mechanism between a video recorder and the DVD recorder.

In the video recorder, as described in the prior art, each of video and audio channels is independently recorded on a tape. The after-recording operation of an audio can easily be carried out because there is no delay from playback to sound recording. In the DVD recorder, however, a video and an audio are recorded in one multiplexed stream. One optical pick-up is used for reading and writing operations. A time difference is made from playback to recording, since one track buffer is provided for implementing a variable bit rate. Even though two optical pick-ups are provided, they should be operated independently. Even if each of the optical pick-ups can be operated independently, the recording and playback operations cannot be carried out at the same time in the DVD-RAM for changing a rotating speed for each zone when a region to be accessed by each of the pick-ups is provided across different zones.

As described in the prior art, a time stamp for AV synchronous playback is described on the MPEG stream. Therefore, in the case where a time stamp to be given to an audio stream to be recorded later is inconsistent with a time stamp given to an existing stream, a decoder is not normally operated in some cases. For example, in the case where an SCR given to a video pack in the existing stream and an SCR given to an audio pack recorded later have the same time, two data to be processed on the time of the SCR by the decoder are simultaneously present. Consequently, the decoder cannot be normally operated. Thus, there is a problem in that the worst hang up is caused.

The DVD-RAM can store audio streams in various kinds of format. The DVD recorder can not know whether the DVD recorder can apply an after-record operation to the DVD-RAM in which data has been recorded by other recorders. Therefore the stream must be analyzed at start of data recording.

SUMMARY OF THE INVENTION

This invention is directed to provide information recording medium which actualize easy determination of a possibility of after-recording on the recording medium. This invention is also directed to provide an apparatus and a method for recording data to such a recording medium.

In a first aspect of the invention, a recording medium comprises an audio stream capable of being replaced with an after-recorded audio stream; and audio attribute information including bit rate information indicative of a bit rate of the audio stream. In the recording medium, a plurality of audio streams may be stored therein. At least one of the plurality of audio streams may be the audio stream capable of being replaced with an after-recorded audio stream. The audio stream capable of being replaced with an after-recorded audio stream may be one audio stream which is provided for the other audio stream carrying original audio data and has same audio attribute as the other audio stream.

In a second aspect of the invention, an apparatus is provided for performing after-recording to an audio stream recorded on the recording medium according to the invention. The apparatus comprises a checking section for checking a possibility of after-recording operation to the recorder before after-recording operation starts, and an operation section for performing the after-recording operation.

In a third aspect of the invention, a method is provided for performing after-recording to an audio stream recorded on the recording medium according to the invention by using a recording apparatus. The method comprises referring to the bit rate information in the audio attribute information, determining whether or not the apparatus is able to encode the audio stream to be after-recorded in a bit rate of the bit rate information, and deciding that the apparatus is able to perform after-recording when the apparatus is determined to be able to encode the audio stream in the bit rate.

In accordance with the present invention, it is possible to determine whether or not the after-recording operation to an audio stream can be performed. Therefore, the recorder, for example, provides a warning to a user when the recorder does not have enough ability to process the audio stream for after-recording.

RELATED REFERENCE

It should be noted that this application is based on application No. 11-38370 filed in Japan, the coritents of which is herein incorporated by reference.

BRIEF DESCRIPTION OF THE DRAWINGS

FIG. 7 is a diagram illustrating VERN and TM_ZONE formats.

FIG. 9 is a diagram illustrating PL_TY and PL_CREATE formats.

FIG. 10 is a diagram illustrating a PTM recording format.

FIG. 11 is a diagram illustrating an S_VOB_ENTN recording format.

FIG. 13 is a diagram illustrating V_ATR and A_ATR formats.

FIG. 14 is a diagram illustrating SP_ATR and SP_PLT formats for a motion picture.

FIG. 17 is a diagram illustrating a VOB_TY format.

FIG. 19 is a diagram illustrating a VOBU_ENT format.

FIG. 21 is a diagram illustrating V_ATR and OA_ATR formats.

FIG. 22 is a diagram illustrating SP_ATR and SP_PLT formats for a still picture.

FIG. 24 is a diagram showing the structure of S_VOB_ENT.

FIG. 25 is a diagram illustrating an S_VOB_ENT_TY format.

FIG. 29 is a diagram illustrating a PG_TY format.

FIG. 31 is a diagram illustrating a C_TY format.

FIG. 32 is a diagram showing the structure of C_EPI.

FIG. 33 is a diagram illustrating an EP_TY1 format.

FIG. 41A is a diagram illustrating the directory structure, and FIG. 41B is a diagram illustrating physical allocation on the disc.

FIG. 43 is a diagram illustrating the structure of MPEG stream including band area for after-recording date.

FIG. 52A is a timing chart of track buffers, and FIG. 52B is a diagram showing data area including data stored in track buffers.

DETAILED DESCRIPTION OF THE PREFERRED EMBODIMENTS

The present invention will be described in detail by using a DVD recorder and a DVD-RAM according to an embodiment of the present invention.

First Embodiment (Logical Structure on DVD-RAM)

First of all, the logical structure on the DVD-RAM will be described with reference to FIGS. 41A and 41B. FIG. 41A shows a data structure on a disc seen through a file system, and FIG. 41B shows a physical sector address on a disc.

The head portion of the physical sector address has a lead-in region which stores a reference signal necessary for stabilizing a servo, an identification signal with other media and the like. A data region is provided following the lead-in region. In this portion, logically effective data are recorded. Finally, a lead-out region is provided and stores the same reference signal as in the lead-in region and the like. A management information for the file system which is referred to as a volume information is recorded on the head of the data region. Since the file system is not directly related to the contents of the present invention, the description of it will be omitted.

Through the file system, the data in the disc can be dealt with as a directory or a file as shown in FIG. 41A. All the data to be dealt with by the DVD recorder are put on a VIDEO_RT directory under a ROOT directory as shown in FIG. 41A. A file to be dealt with by the DVD recorder is roughly classified into two kinds, that is, one management information file and at least one AV file (ordinarily, a plurality of files).

(Management Information File)

Figures 42A, 42B:
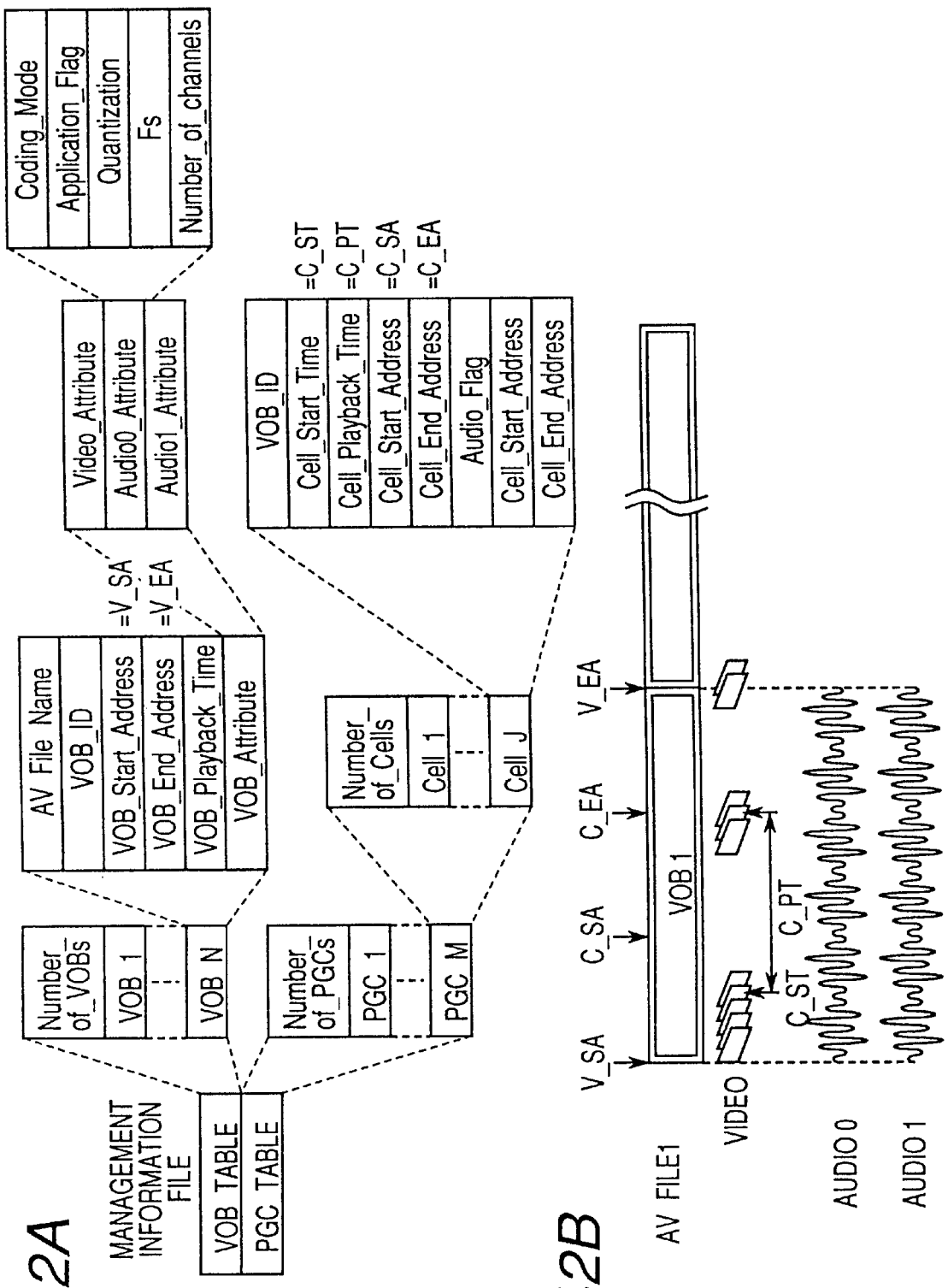
FIG. 42A is a diagram illustrating the management information.
FIG. 42B is a diagram illustrating the structure of stream data.

Next, the contents of the management information file will be described with reference to FIG. 42A.

The management information file is roughly divided into a VOB table and a PGC table. VOB (Video Object) means a program stream of MPEG. PGC defines the playback order of Cell which uses any partial section (or all sections) in the VOB as one logical playback unit. In other words, the VOB is a unit which is significant as the MPEG, and the PGC is a unit at which a player plays back.

The VOB table stores the number of VOBs (Number_of_VOBs) and each VOB information therein. The VOB information comprises a corresponding AV file name (AV_File_Name), a VOB identifier in the disc (VOB_ID), a start address in the AV file (VOB_Start_Address), an end address in the AV file (VOB_End_Address), a playback time length of the VOB (VOB_Playback_Time) and an attribute information of the stream (VOB_Attribute).

A stream attribute information field comprises a video attribute (Video_Attribute), a first audio stream attribute (Audio0_Attribute) and a second audio stream attribute (Audio1_Attribute). The audio stream attribute information comprises an audio coding mode (Coding_Mode), an application flag (Application_Flag), a quantization coefficient (Quantization), a sampling frequency (Sampling_Frequency) and the number of audio channels (Number_of_channels).

The PGC table includes the number of PGCs (Number_of_PGCs) and each PGC information therein. The PGC information comprises the number of Cells (Number_of_Cells) in the PGC and each Cell information. The cell information comprises corresponding VOB_ID, a playback start time in the VOB (Cell_Start_Time), a playback time in the VOB (Cell_Playback_Time), a playback start address in the VOB (Cell_Start_Address), a playback end address in the VOB (Cell_End_Address), an audio flag (Audio_Flag) for specifying that audio signal played back in the Cell is an original audio or a after-recording audio. The cell information further comprises Cell_Start_Address and Cell_End_Address for the after-recording audio.

(AV File)

Next, an AV file will be described with reference to FIG. 42B.

The AV file includes at least one VOB (ordinarily, a plurality of VOBs). The VOB is continuously recorded in the AV file. The VOB in the AV file is managed by the VOB information of the above-mentioned management information file. A player can access the VOB by first accessing the management information file to read out the start and end addresses of the VOB. Moreover, the Cell is defined as a logical playback unit in the VOB. The Cell is the partial playback section (or the whole sections) of the VOB and can be freely set by a user. By the Cell, it is possible to edit AV data simply without actual operation of the AV data. In the same manner as the VOB, an access information about the Cell is managed in the Cell information in the management information file. The player can access the Cell by first accessing the management information file to read out the start and end addresses of the Cell.

The address information of the Cell is based on the VOB and the address information of the VOB is based on the AV file. Therefore, the player actually accesses the AV file by adding the address information of the VOB to the address information of the Cell to calculate an address information in the AV file.

(Structure of VOB)

FIG. 43 is a diagram showing the structure of the VOB according to the present embodiment.

Two audio streams are set to an audio stream #1 and an audio stream #2, respectively. As shown in FIG. 43, the same audio stream is stored in the audio stream #1 and the audio stream #2.

It is to be noted that the audio streams are not simply identical as streams but are identical in pack and packet units. The value of SCRs (System Clock References) of a pack header, the value of stream numbers of a packet header and the value of original_or_copy are different. However, other fields, for example, PST and the like have the same values. Of course, the contents of a payload are identical.

The fields of original_or_copy are different in order to explicitly indicate, in the streams, that the stream #1 is an original stream and the stream #2 is a dummy stream for the after-recording operation. The flags may have the same values.

Figure 44:
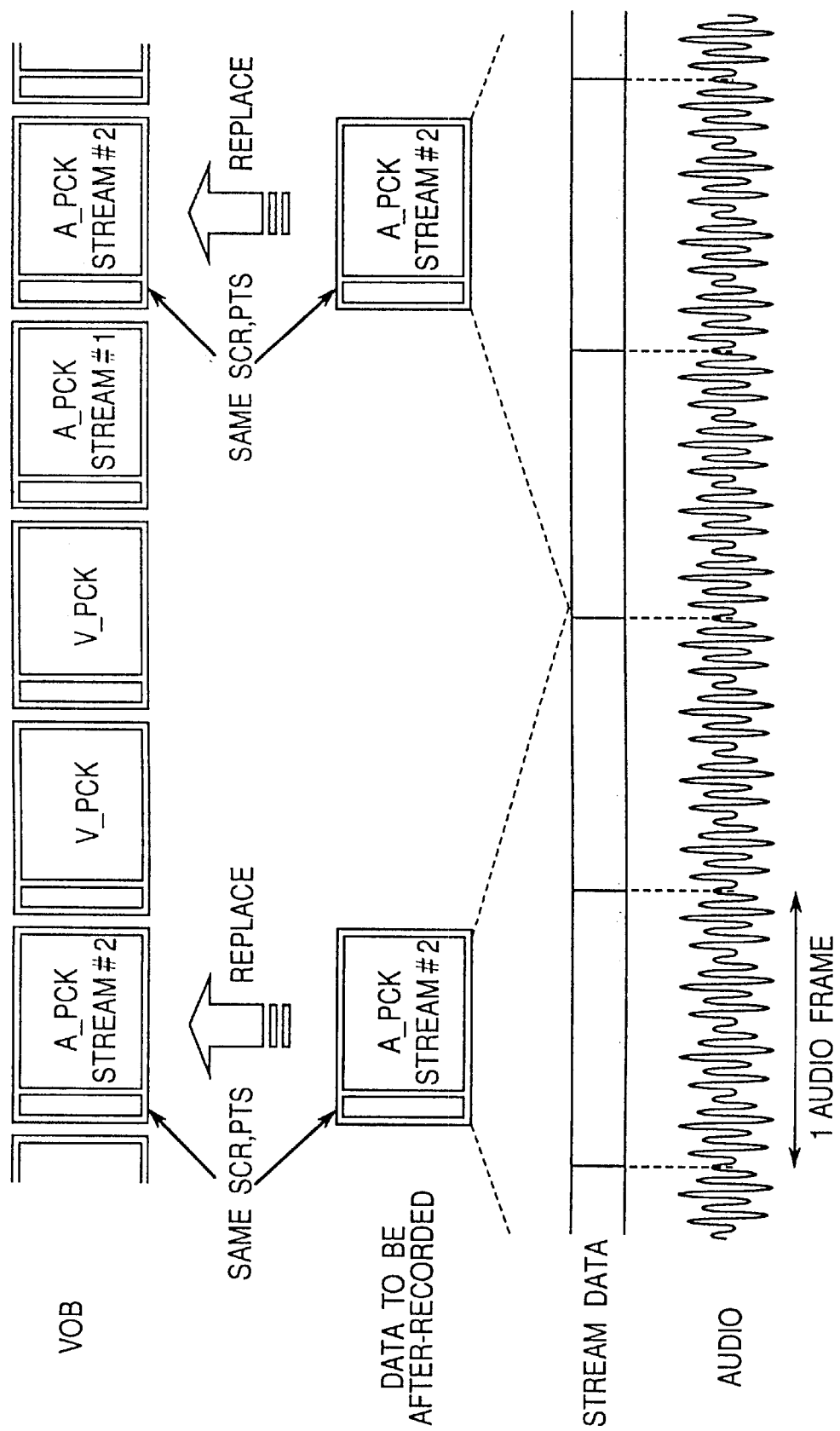
FIG. 44 is a diagram illustrating a way of inserting after-recording data into the MPEG stream.

By putting such two audio streams in the VOB, one of the original audio data can remain even if one of the audio streams is recorded by the after-recording operation as shown in FIG. 44.

For the following purpose, the two audio streams are put in. A recording region for the after-recording operation, that is, a recording band is kept. In addition, if the attribute of the audio stream to be after-recorded, that is, a coding mode and a bit rate are set identical to that of the audio stream recorded in a dummy, a pack and a packet header become completely identical and the after-recording operation can be carried out only by exchanging the contents of the payload.

This means that even though the system encoder of the MPEG should carry out the multiplexing operation of the audio pack so that an audio buffer neither underflows nor overflows, the multiplexing operation can be omitted on the after-recording operation.

When the after-recording operation is to be carried out in various coding modes and bit rates, the audio pack should be replaced not only to ensure a band but also to prevent the overflow and underflow of the audio buffer. Therefore, it is impossible to simply ensure the replacement of the audio pack between sets having different algorithms.

In the present embodiment, the SCR and the PTS are not changed in the same coding mode and the same bit rate but data are rewritten in a pack unit such that only the contents of the audio payload are replaced.

Of course, while the contents of the pack header and the packet header including the SCR and the PTS may be rewritten, it is apparent that the completed stream should satisfy the conditions of the MPEG stream.

Next, the reason why the same audio data are to be recorded in the stream #1 and the stream #2 will be described with reference to FIG. 45.

For example, in the case where a part of the VOB is to be after-recorded, when the data recorded as the stream #2 are silent or have insignificant contents, for example, insignificant data and significant data are switched with each other on the boundary between a after-recorded portion and a non-after-recorded portion.

Since the DVD recorder has only one audio decoder, the stream #1 and the stream #2 cannot be played back at the same time. Accordingly, when the partial after-recording operation is to be carried out, it is necessary to designate the audio stream to be played back to a decoder so as to switch the audio stream from original data to after-recorded data or from after-recorded data to original data on the boundary portion. The audio stream to be played back is generally designated by control from the host side, that is, a microprocessor. Therefore, it is hard to designate the switching in a frame unit.

Figure 45:
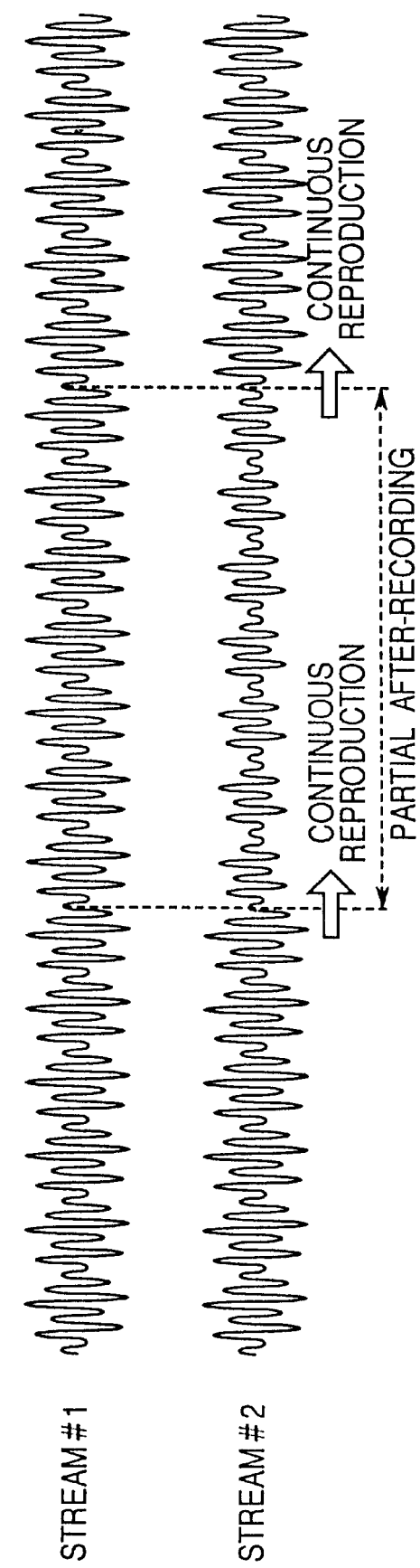
FIG. 45 is a diagram illustrating a partial after-recording.

By recording the same audio data as the original on the dummy audio stream itself as shown in FIG. 45, it is also possible to continuously play back on the boundary portion where the partial after-recording operation is executed.

The above-mentioned problem of the partial after-recording operation can be solved when the audio streams are not completely identical but have the same contents, that is, are data having the same contents as analog data during the playback. Description will be given to the reason why two completely identical streams are required to be recorded.

When the user wants to turn back the after-recorded audio data (that is, to erase the audio data) after the partial after-recording operation, it is necessary to record some data again because the overwritten data cannot be turned back. When the silent audio stream is to be recorded, the above-mentioned problem of the partial after-recording operation is caused when the user tries the after-recording operation again in the partial section of the silent audio stream section.

Figure 46:
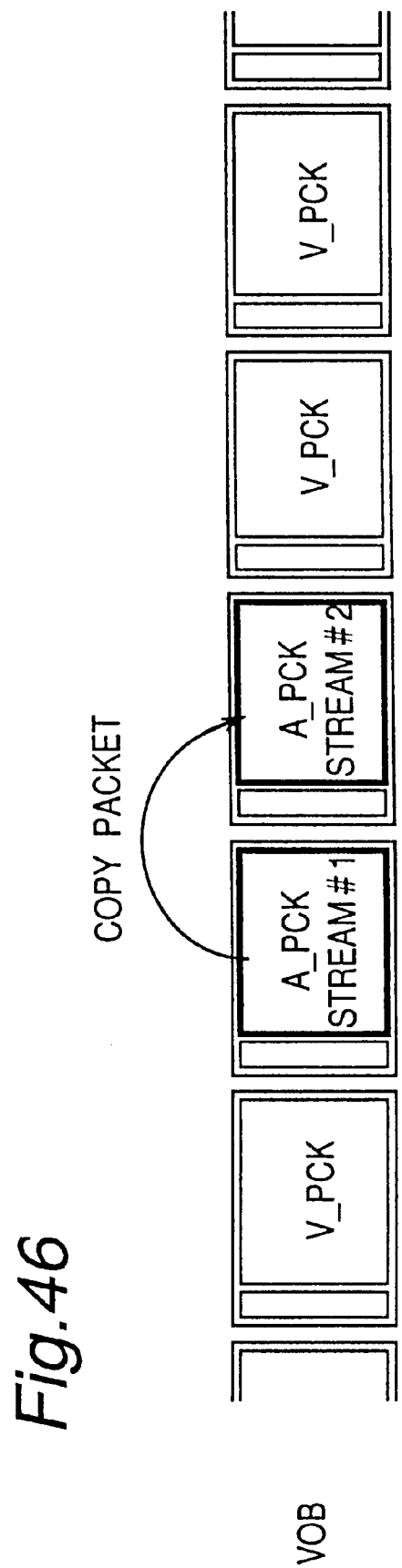
FIG. 46 is a diagram illustrating a way of restoring after-recorded audio stream.

In the case where the two identical audio streams are used in the pack and packet units except the SCR and the stream number as shown in FIG. 46, an original state can be restored by copying data in the packet unit from the stream #1 to the stream #2. At this time, it is apparent that the stream number in the packet header should be modified.

(State of Audio Stream #2)

Figure 47:
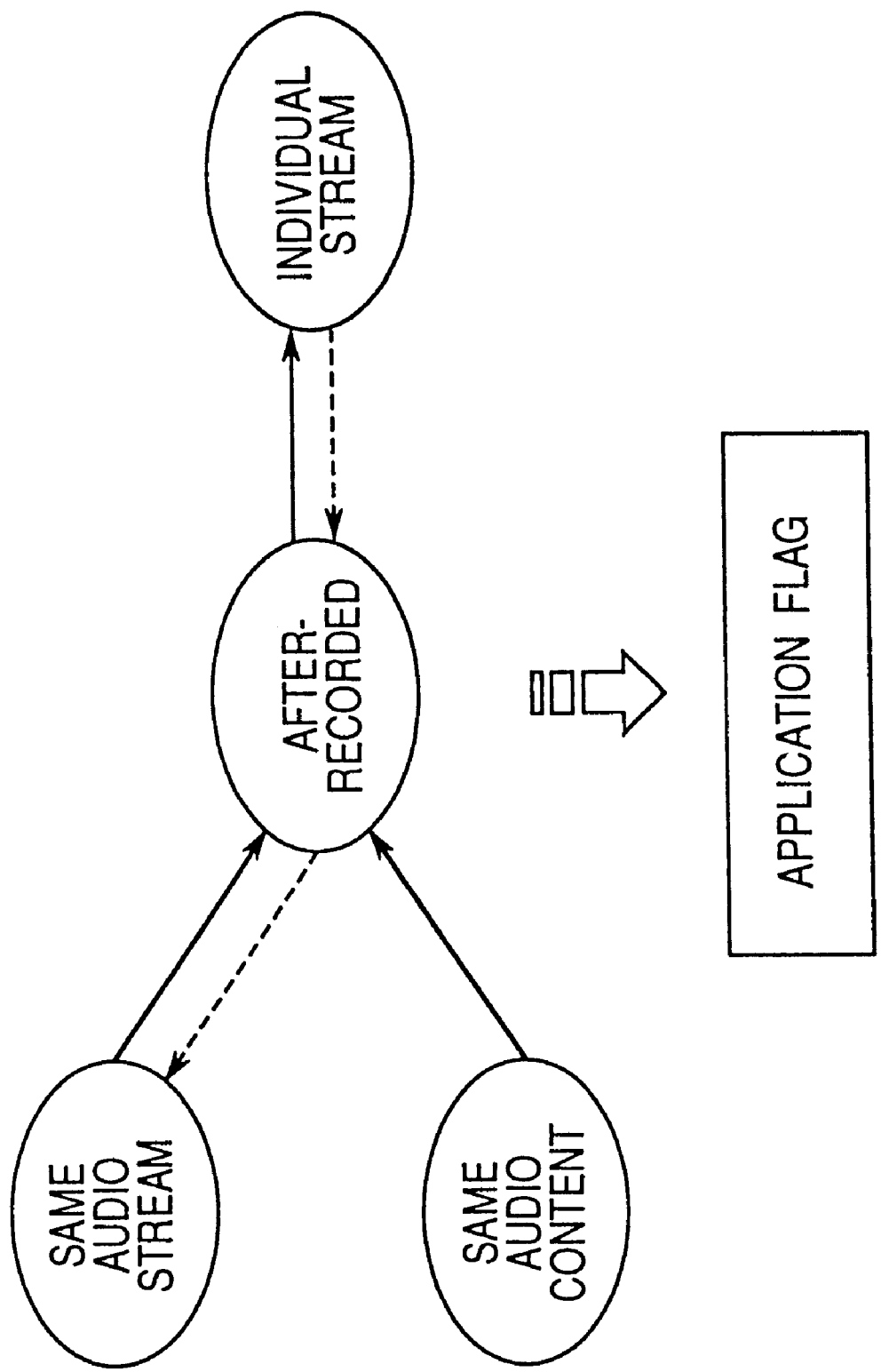
FIG. 47 is a state transition diagram of an audio stream.

FIG. 47 is a diagram showing the state of the stream #2 recorded for the after-recording operation described above. The state of the stream #2 is divided into "same audio stream", "stream having the same audio contents", "after-recorded stream" and "individual stream". As described above, it is possible to carry out the after-recording operation from the same audio stream and the stream having the same audio contents. On the contrary, it is possible to return only to the same audio stream. That is, it is possible to return from the after-recorded audio stream to the same stream.

Moreover, the after-recorded stream can be regarded as an independent stream. In the independent stream (for example, the audio stream #2 in which silent data are recorded), the after-recording operation can be carried out for the whole VOB. However, the partial after-recording operation of the VOB causes the above-mentioned problem.

The above-mentioned state is managed in an Application Flag on the DVD-RAM disc.

(Structure of DVD Recorder)

Figure 48:
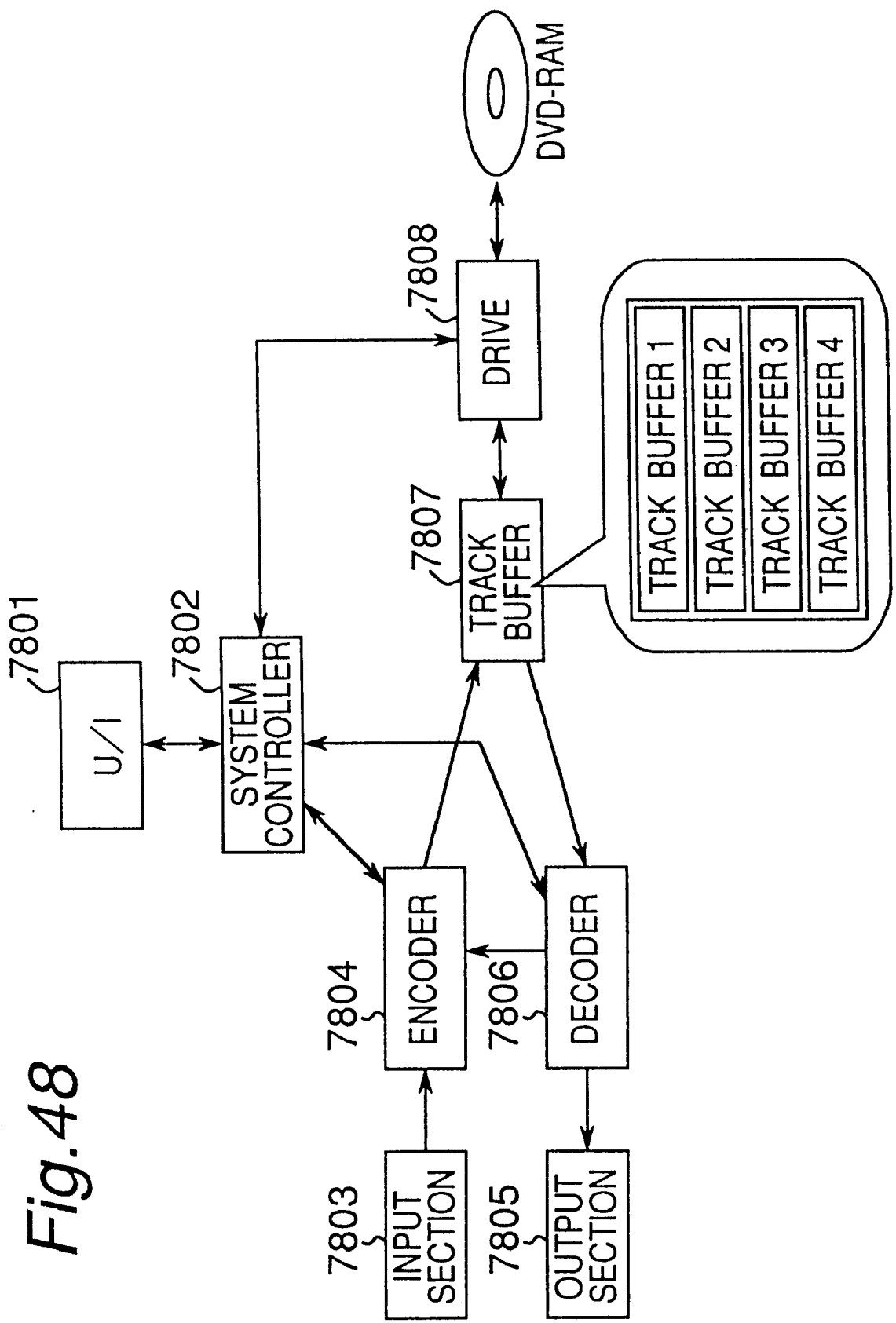
FIG. 48 is a block diagram of a DVD recorder in the first embodiment.

Next, the structure of the DVD recorder will be described with reference to FIG. 48.

In the drawing, the DVD recorder comprises a user interface 7801, a system controller 7802, an input section 7803, an encoder 7804, an output section 7805, a decoder 7806, a track buffer 7807 and a drive 7808. The user interface 7801 transfers data displayed to the user or accepts a request from the user. The system controller 7802 serves to wholly perform management and control. The input section 7803 including an AD converter inputs video and audio data. The output section 7805 outputs a video and audio data. The decoder 7806 decodes an MPEG stream.

(Recording Operation of DVD Recorder)

The recording operation of the DVD recorder will be described.

The user interface 7801 first accepts a request from the user. The user interface 7801 transmits the request from the user to the system controller 7802. The system controller 7802 interprets the request from the user and gives a process request to each module. When the user gives a request for picture recording, the system controller 7802 gives a request for encoding to the encoder 7804.

The encoder 7804 carries out video encoding, audio encoding and system encoding for video and audio information sent from the input section 7803, and transfers the encoded data to the track buffer 7807.

Next, the system controller 7802 gives, to the driver 7808, a request for writing data stored in the track buffer, and the drive 7808 fetches data from the track buffer and records the fetched data in the DVD-RAM.

The user's request for stop is transmitted to the system controller 7802 through the user interface 7801. The system controller 7802 gives a request for encoding stop to the encoder 7804, and the encoder 7804 stops an encoding process when the data are completely encoded and informs the system controller 7802 of encoding termination.

Then, the system controller 7802 gives a request for a writing termination to the drive 7808, and the drive 7808 stops reading and writing data to the DVD-RAM when the track buffer 7807 becomes empty.

Finally, the system controller 7802 modifies an AV file information, a clip sequence information and a file system information for the recorded VOB, and records them in the DVD-RAM through the drive 7808. In particular, a value of Application Flag is recorded as the same audio stream.

For the recording operation, it is important that two audio streams are inserted into the outputting VOB in the encoder 7804, while one audio data is input.

Figure 49:
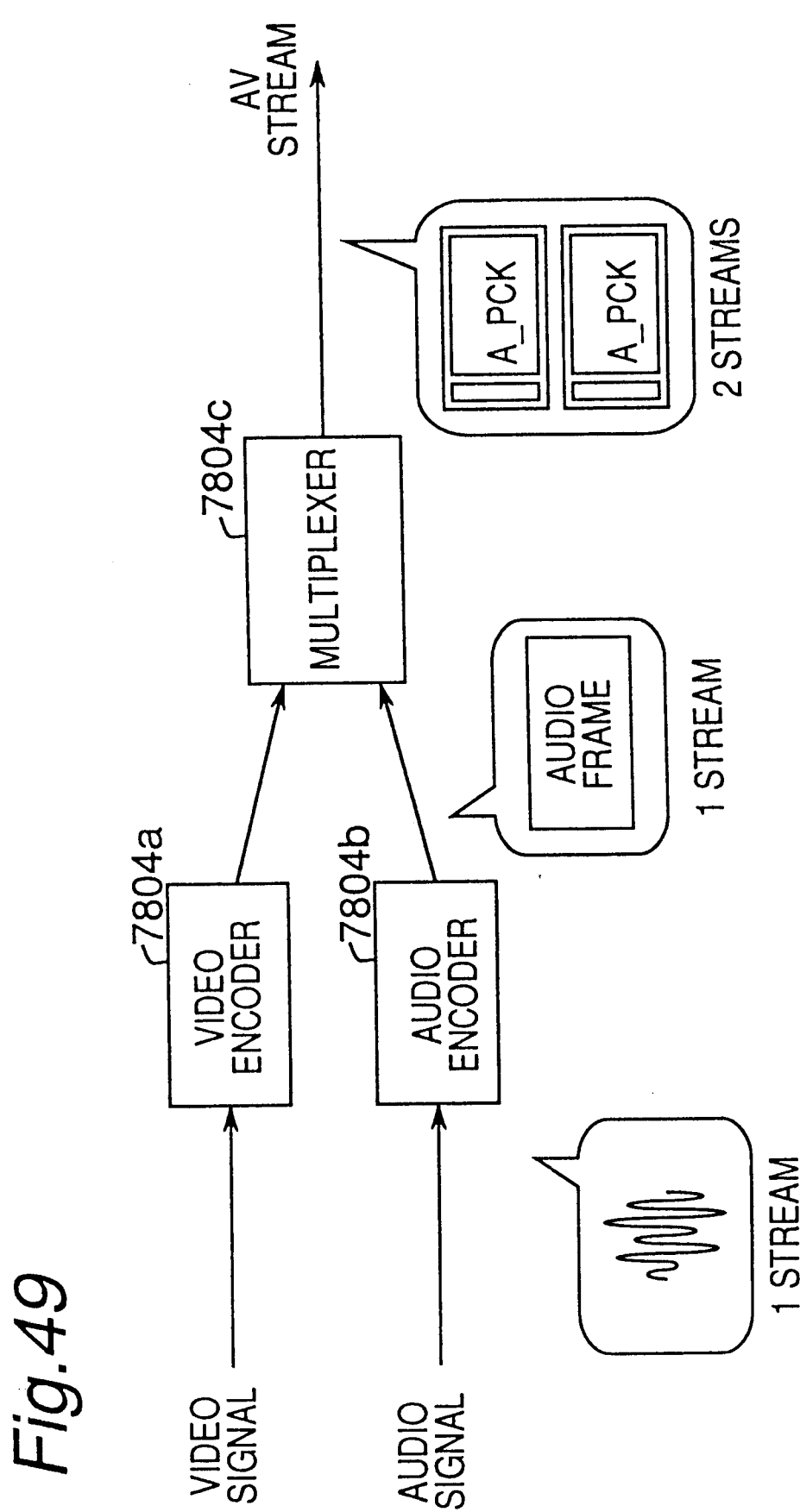
FIG. 49 is a block diagram of the encoder.

A process of inserting the two audio streams will be described with reference to FIG. 49. FIG. 49 is a diagram showing the structure of the encoder. As shown, the encoder comprises a video encoder 7804a, an audio encoder 7804b and a system multiplexer 7804c.

The video encoder 7804a encodes an input video signal into an MPEG video stream. The audio encoder 7804b encodes an input audio signal into an audio stream. At this time, there is one audio stream. Next, the multiplexer 7804c performs packing, packetizing and multiplexing the video stream and audio stream. In the multiplexing process, copy is carried out in an audio pack unit and the multiplexing is executed for the two audio streams.

The audio stream may be copied in a form of a packet, or in a form of a payload immediately before the packetizing process. As described above, the two audio streams are inserted into the VOB.

(After-recording Operation of the DVD Recorder)

Next, description will be given to the after-recording operation in the DVD recorder.

First of all, description will be given to the input and output of AV data on the after-recording operation by the DVD recorder. In the input and output of the AV data, data are read or written in a unit called an AV block.

Figure 35A:
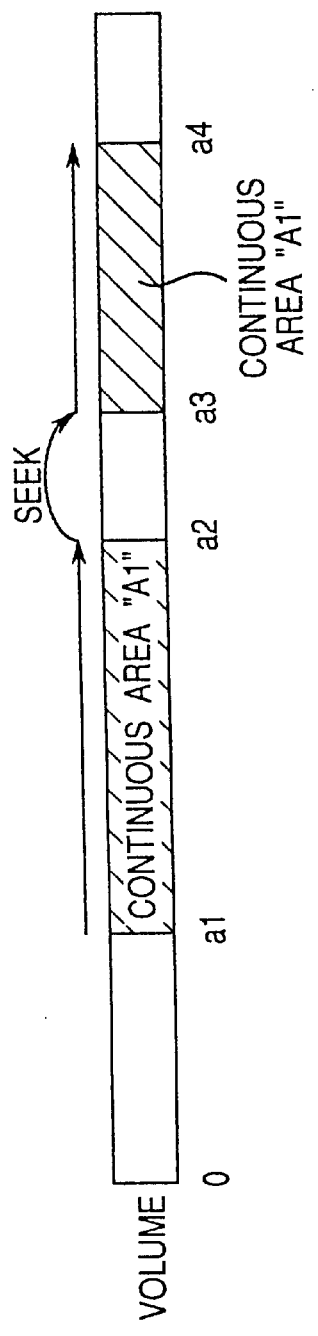
FIG. 35A is a diagram showing an address space on a disc.
Figure 35B:
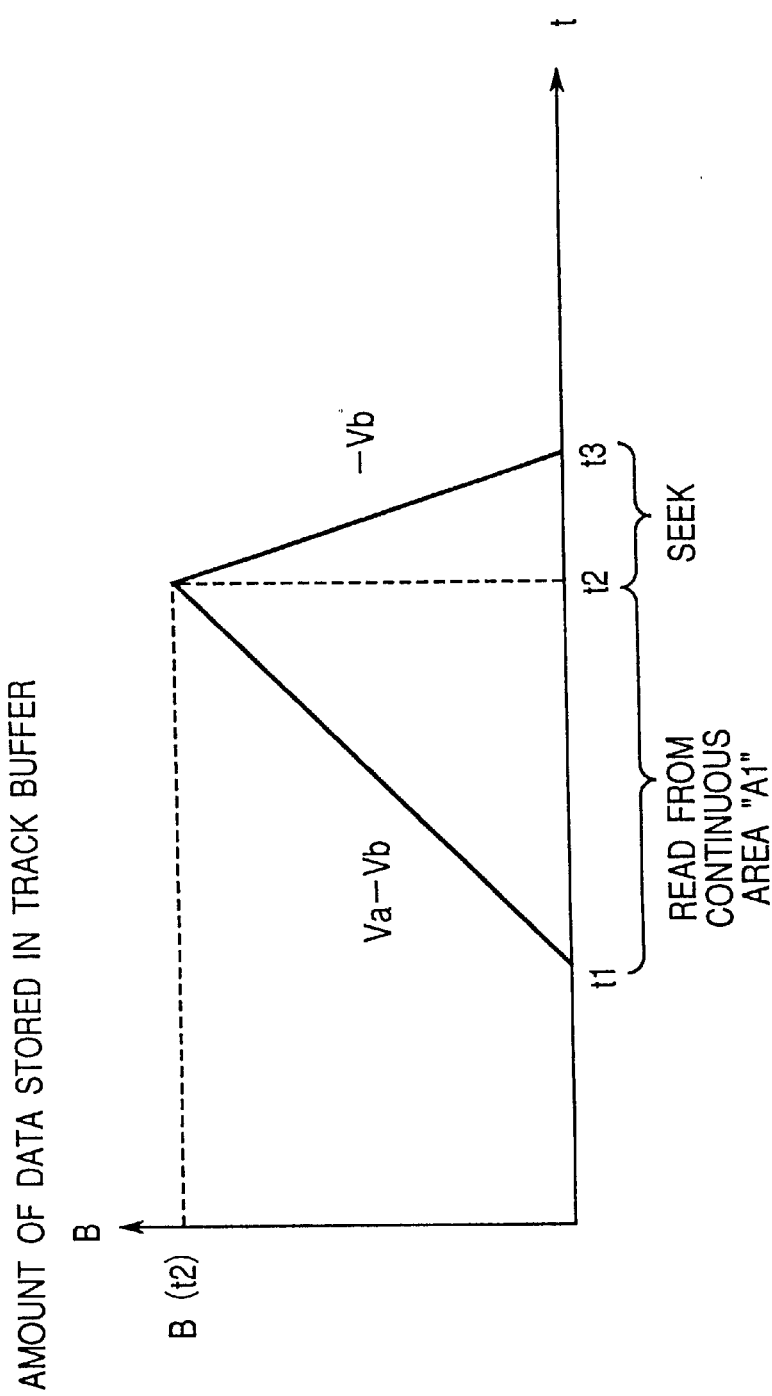
FIG. 35B is a chart showing a data storage amount in a track buffer.
Figure 36:
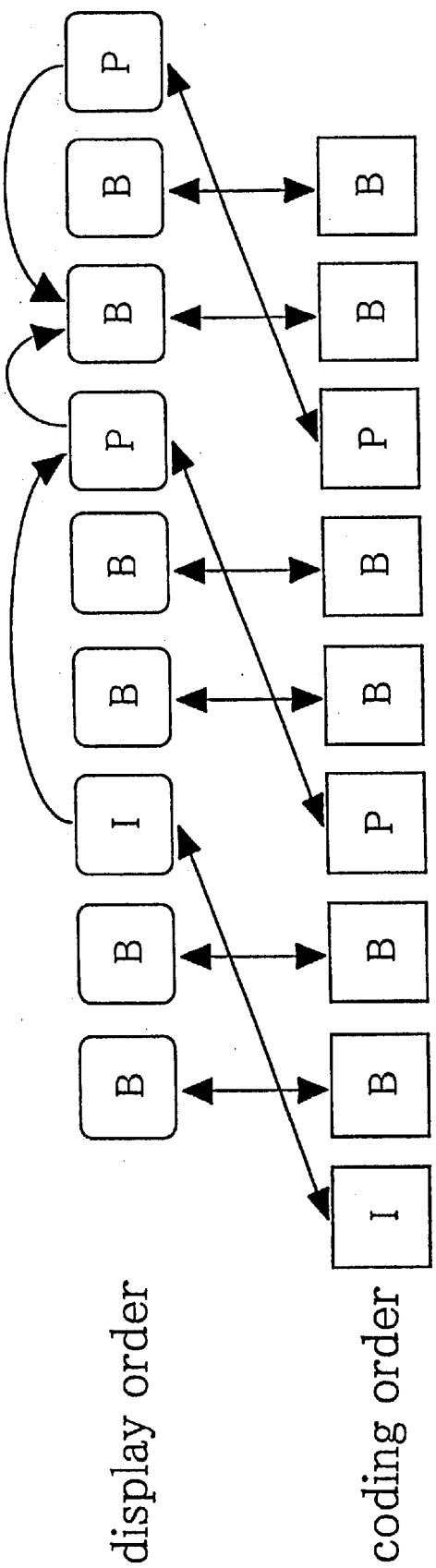
FIG. 36 is a picture correlation diagram in an MPEG video stream.
Figure 37:
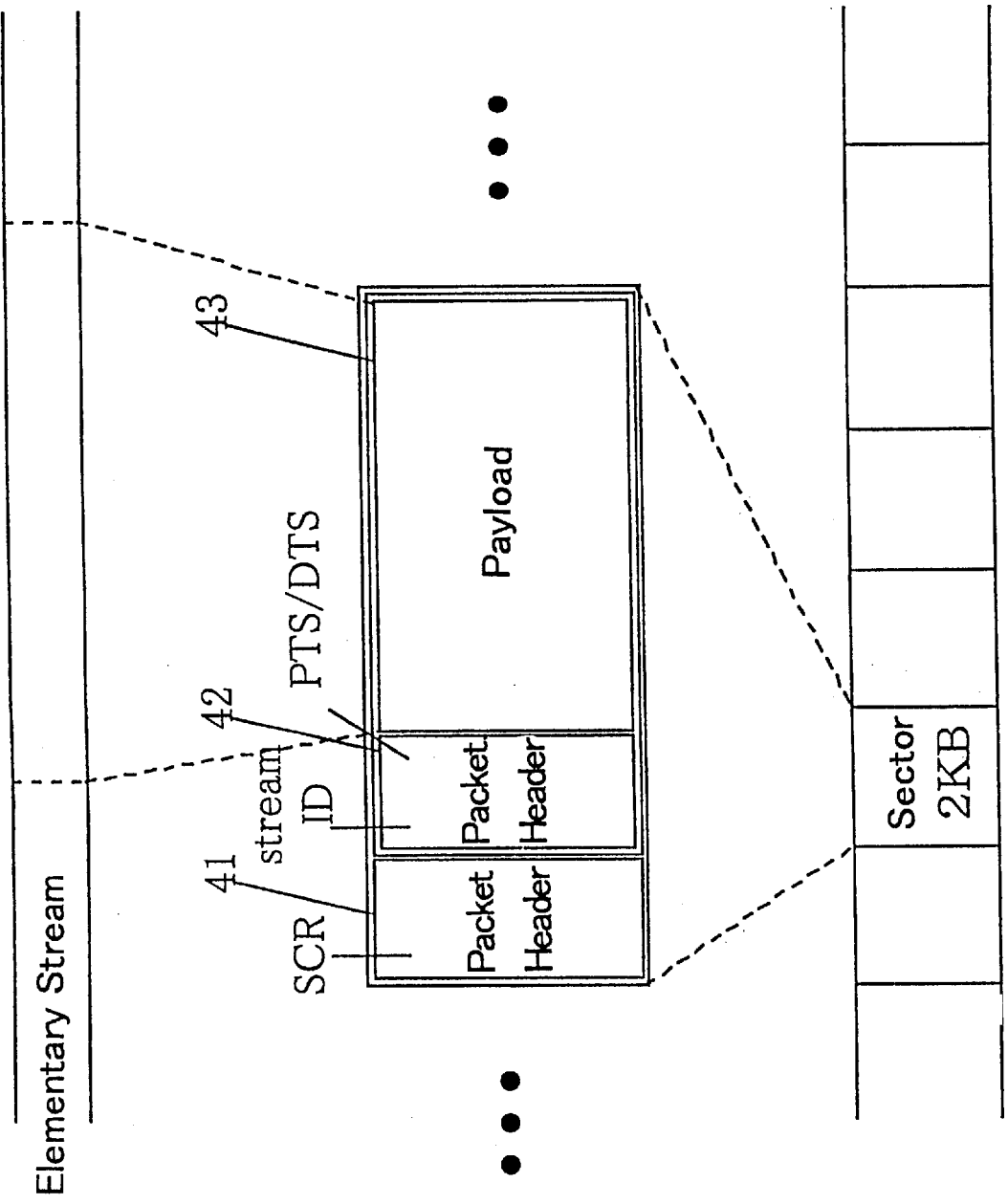
FIG. 37 is a diagram showing the structure of an MPEG system stream.
Figure 38:
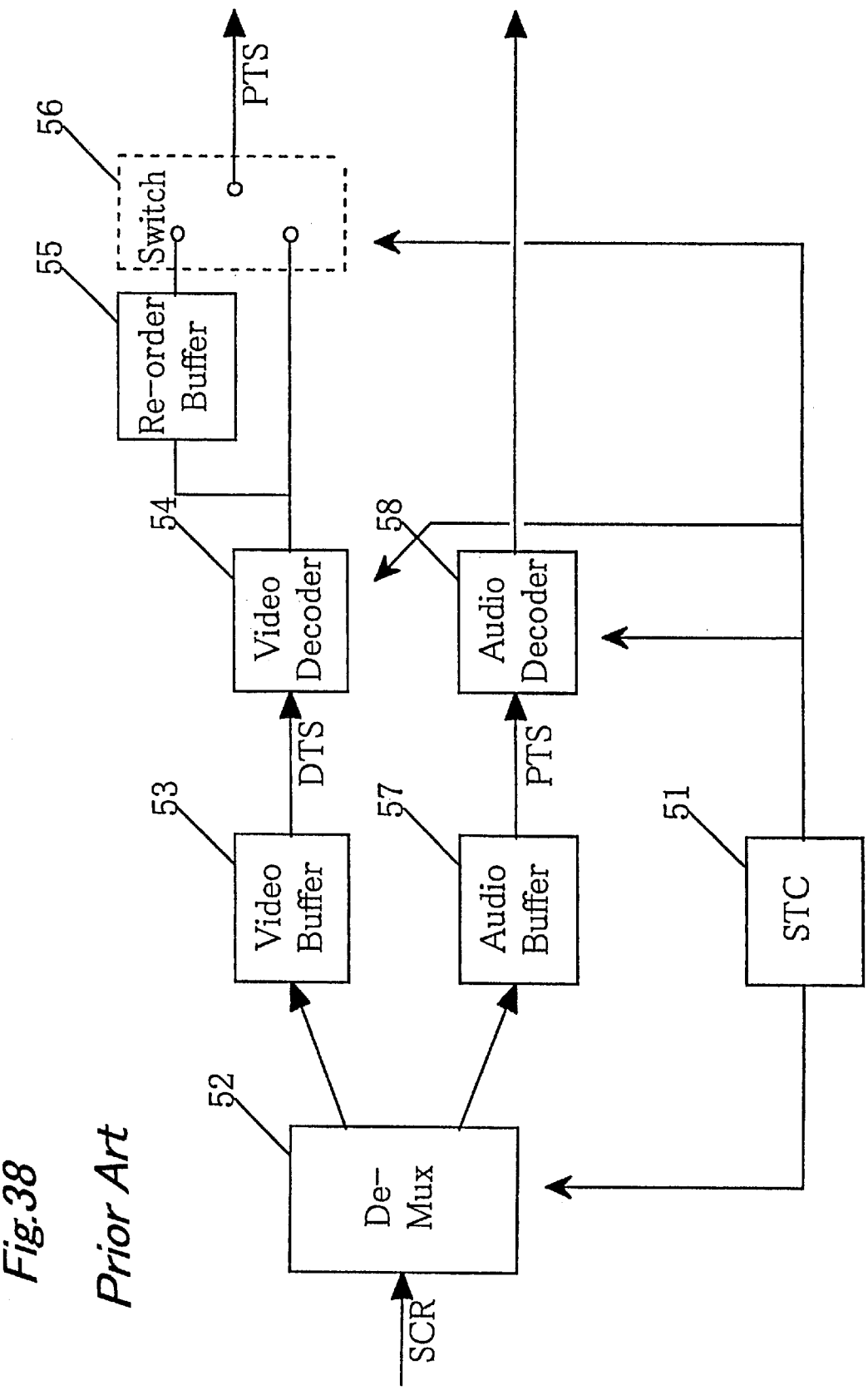
FIG. 38 is a diagram showing the structure of an MPEG system decoder (P-STD).
Figure 39:
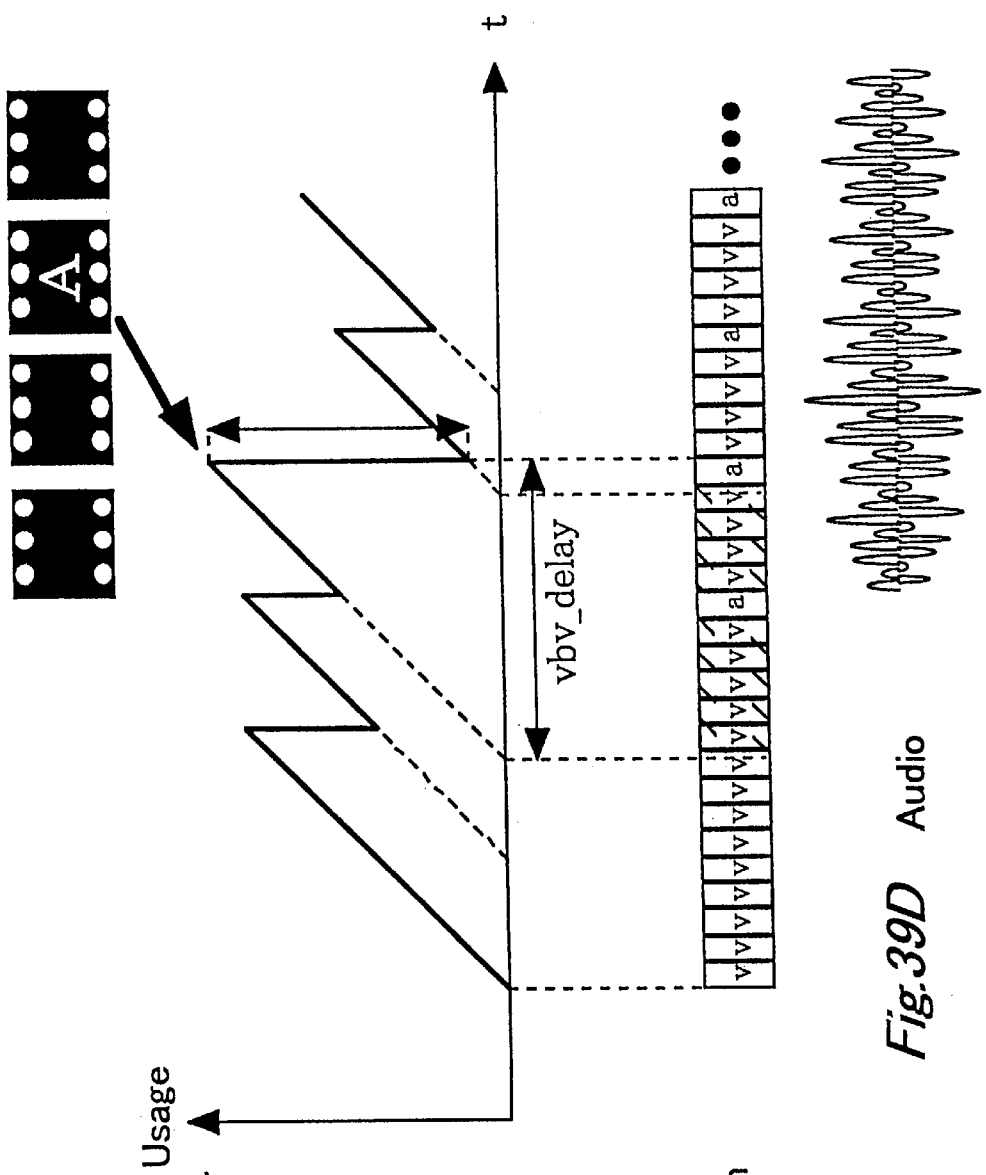
FIG. 39A is a diagram showing video data.
FIG. 39B is a chart showing a video buffer usage.
FIG. 39C is a diagram showing the MPEG system stream.
FIG. 39D is a diagram showing audio data.
Figure 40:
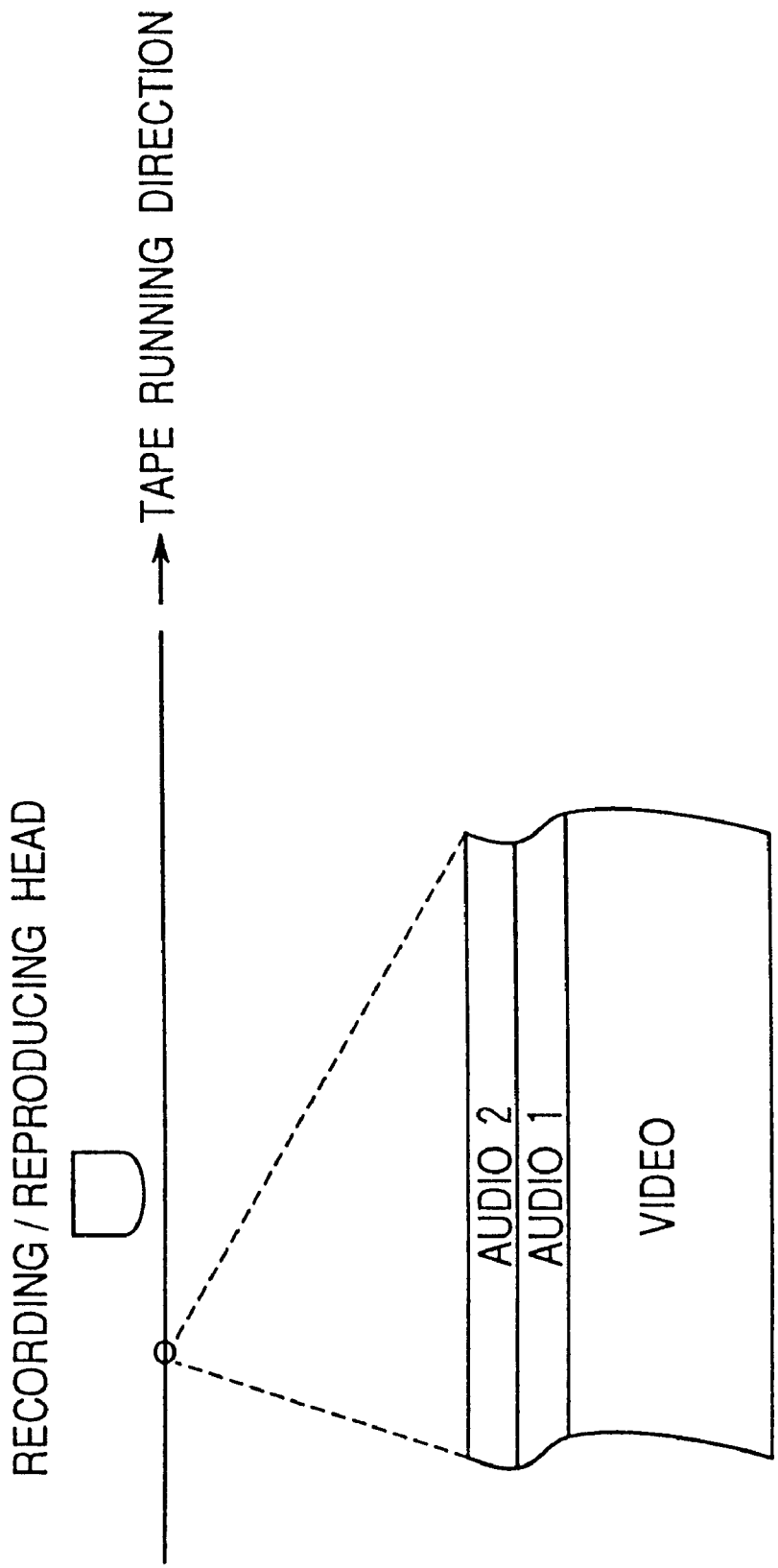
FIG. 40 is a diagram showing the structure of a recording band on a tape.

The AV block indicates the continuous recording region shown in FIG. 35. When the continuous recording region is much greater than a continuous recording length necessary for seeking the continuous recording region, it may be divided into small regions as AV blocks.

Figure 50:
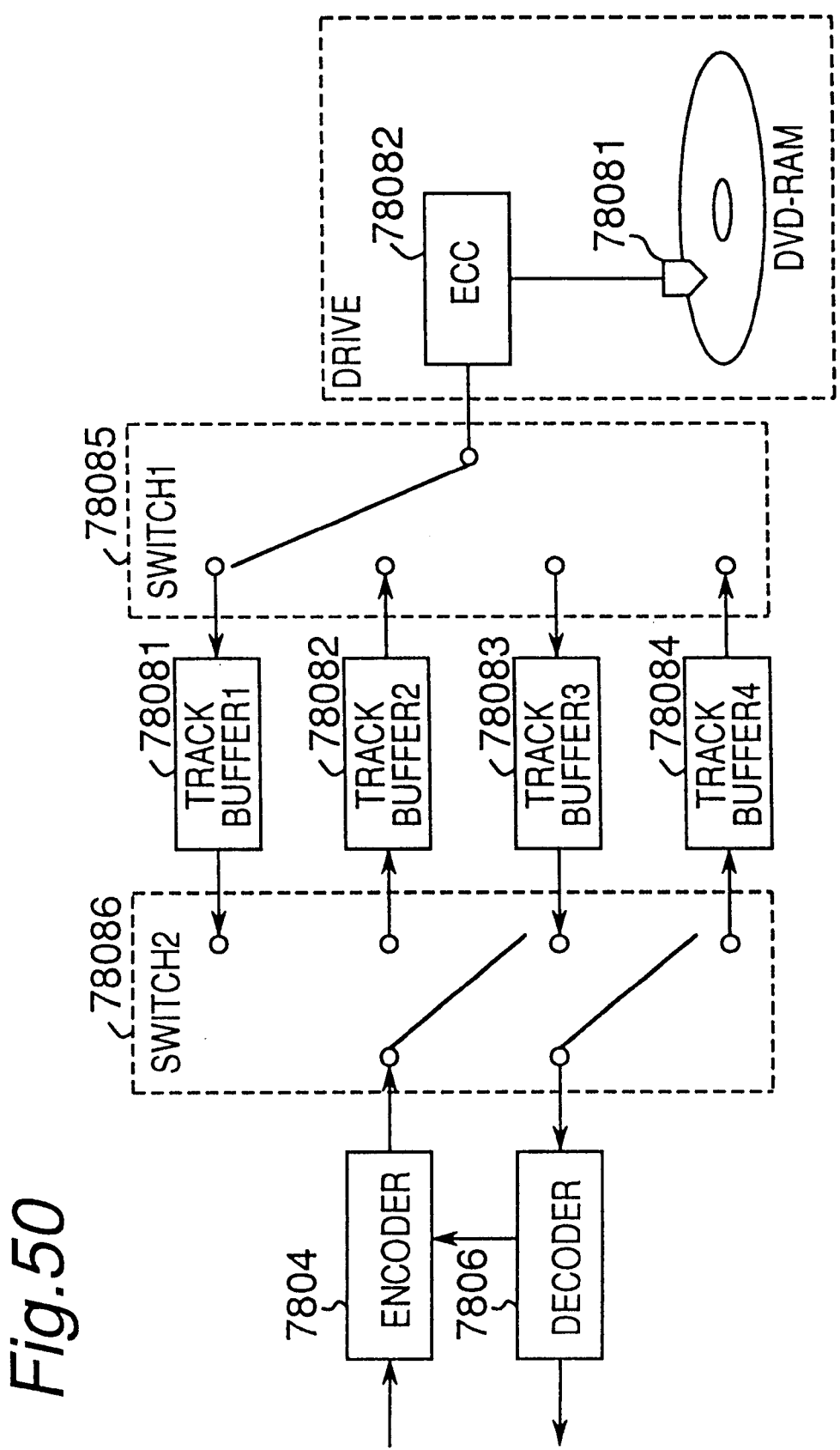
FIG. 50 is a block diagram of a DVD recorder with four track buffers.

Subsequently, the track buffer 7807 is divided into track buffer1 and track buffer3 to be used for playback and track buffer2 and track buffer4 to be used for recording. This state is illustrated in FIG. 50.

The input and output of the track buffer will be described in a time series with reference to FIG. 52.

Description will be given by taking, as an example, the case where the VOB is constituted by four AV blocks A, B, C and D as shown in FIG. 52B.

FIG. 52A is a diagram representing the buffer storage amounts of the track buffers 1, 2, 3 and 4 on a time base. At the track buffer1 (TB1) and the track buffer3 (TB3), the data storage amount is increased because data are input from the drive, that is, data are read out for playback from the DVD-RAM, and the data storage amount is decreased because data are supplied to the decoder.

On the contrary, at the track buffer2 (TB2) and the track buffer4 (TB4), the data storage amount is increased because data are input from the encoder after the after-recording operation, that is, data are recorded (overwritten) on the DVD-RAM, and the data storage amount is decreased because data are supplied to the drive for recording in the DVD-RAM.

During period T1 in the drawing, first, the AV block A is read out on the track buffer1 and the after-recording operation starts immediately after the data are read out. During period Ta, the after-recording operation is carried out for the AV block A. The after-recorded data of the AV block A are recorded on TB2. Therefore, the storage amount of the TB2 is increased during the period Ta.

The drive reads the next AV block B immediately after the period T1. The AV block A and the AV block B are not present on the same continuous recording region, and therefore the AV block B is read out after the seeking of a head (period T2).

After the after-recording operation of the AV block A is ended, the after-recording operation of the AV block B then starts (period Tb). The data of the AV block B stored in the track buffer3 are supplied to the decoder. The data after-recorded through the encoder are stored in the track buffer4 during the period Tb.

Immediately after the after-recording operation of the AV block A is ended, the drive overwrites the after-recorded data of the AV block A stored in the track buffer2 onto the AV block A (period T3).

When the overwriting process on the AV block A is completed, the drive then reads out the AV block C. The read data on the AV block C are stored in the track buffer1 (period T4).

By repeating the above-mentioned operation, the after-recording process can be carried out.

Next, description will be given to a process flow in the DVD recorder.

The user's request for the after-recording operation is transmitted to the system controller 7802 through the user interface 7801. First of all, the system controller 7802 gives, to the drive 7808, a request for reading out the VOB to be after-recorded.

The drive 7808 reads out the VOB to be after-recorded from the DVD-RAM in an AV block unit and records the read VOB in the track buffer1.

At the same time, the system controller 7802 gives a request for the after-recording process to the encoder 7804.

Figure 51:
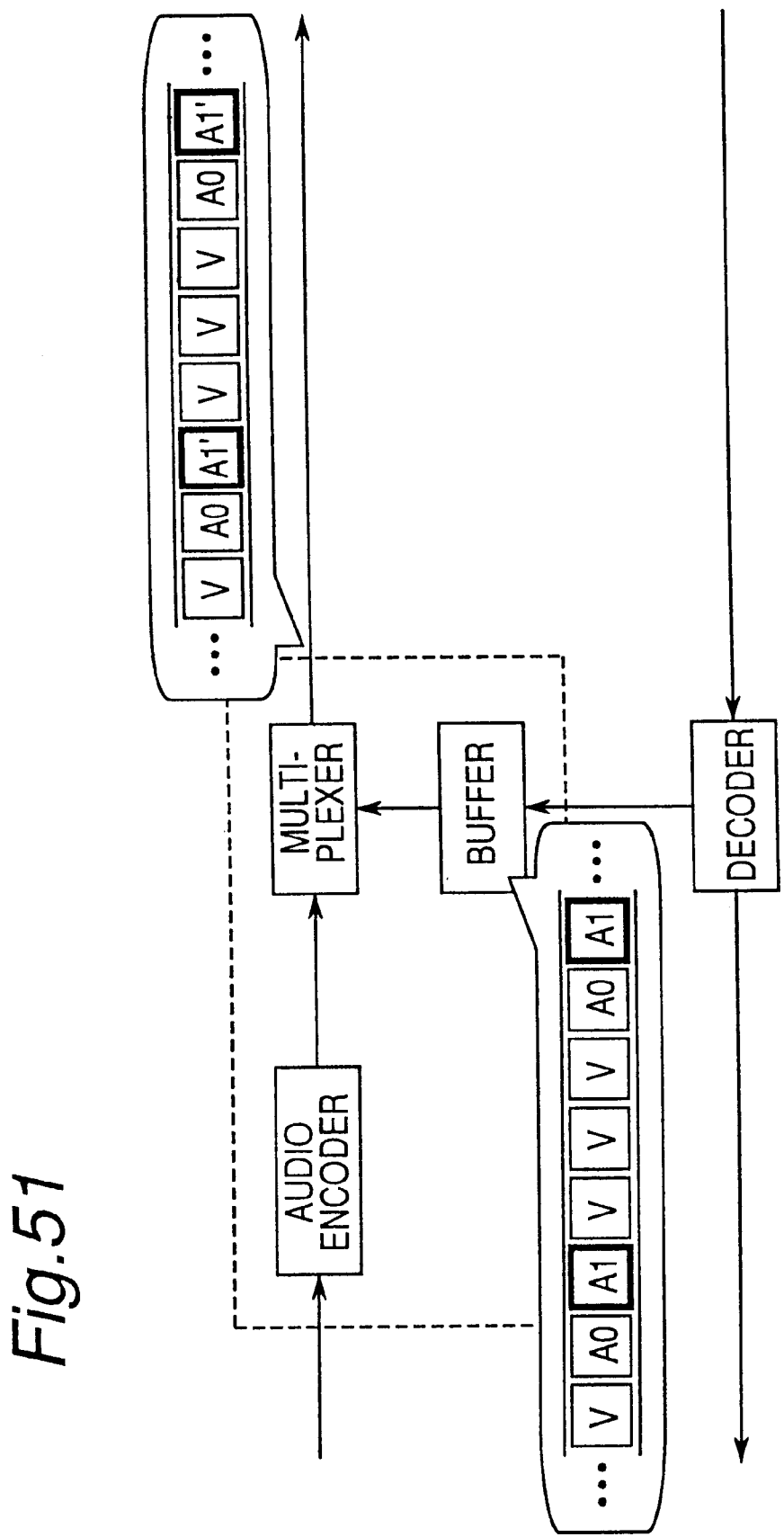
FIG. 51 is a diagram illustrating an after-recording operation in the encoder.

The encoder 7804 performs the audio-encoding of audio data input from the input section 7803, reads out an audio pack including the audio stream #2 in the stream sent from the decoder, replaces a payload with the encoded after-recording audio stream, and records the after-recording audio stream in the track buffer2. This state is shown in FIG. 51.

When the after-recording process of the AV data stored in the track buffer1 is completed, the encoder 7804 consecutively starts the after-recording process of the AV data recorded in the track buffer3 and notifies the system controller 7802 that the after-recording process of the track buffer1 is ended.

Next, the system controller 7802 gives, to the drive 7808, a request for writing the data of the track buffer 2.

The drive 7808 overwrites and records the data of the track buffer 2 on the DVD-RAM after the completion of writing into the track buffer3.

By sequentially carrying out the above-mentioned processes for the track buffer1, the track buffer2, the track buffer3 and the track buffer4 as described above, the after-recording operation can be executed.

Moreover, when the VOB is completely read out from the DVD-RAM, the drive 7808 informs the system controller 7802 of termination of the VOB reading process.

The system controller 7802 gives a request for termination of after-recording to the encoder 7804. The encoder 7804 carries out the after-recording process until the after-recording processes of all the audio data remaining in the track buffer1 and the track buffer3 are terminated. The encoder 7804 informs the system controller 7802 of the after-recording termination when the after recording processes of all the data are-completed.

Next, the system controller 7802 gives a request for a writing end process to the drive 7808. The drive 7808 overwrites and records all the VOB data remaining in the track buffer2 and the track buffer4 on the DVD-RAM disc and informs the system controller 7802 that the after-recording process is completed after the completion of the recording operation.

The system controller 7802 changes the Application Flag to the "after-recorded" and carries out the recording operation on the DVD-RAM through the drive 7808 again.

(Playback (Reproduction) Operation of DVD Recorder)

Next, the playback operation of the DVD recorder will be described.

The user's request for a playback process is transmitted to the system controller 7802 through the user interface 7801. The system controller 7802 gives a request for reading the VOB to the drive 7808, and the drive 7808 reads out the VOB data from the DVD-RAM and transfers the VOB data to the track buffer 7807.

Then, the system controller 7802 gives a request for playing back the VOB to the decoder 7806, and the decoder 7806 reads out data from the track buffer 7807, decodes the read data and outputs the decoded data through the output section 7805.

When the VOB is completely read out, the drive 7808 informs the system controller 7802 of termination of the reading process, and the system controller 7802 gives a request for ending the playback to the decoder 7806. The decoder 7806 carries out the reading and decoding operations of the data until the data of the track buffer 7807 becomes empty, and informs the system controller 7802 of the end of the playback operation after the completion of decoding process for all data.

At this time, the following is important. In the case where the user gives a request for switching the audio stream, that is, a request for playing back the audio stream #2, the system controller 7802 informs the user through the user interface 7801 that the switching is impossible, without playing back the audio stream #2 when the value of the Application Flag indicates the same audio streams or the same audio contents.

When the same audio streams or the same audio contents are recorded in the audio stream #2, an error message is displayed for the user. This prevents the user from thinking that the switching has failed or that the DVD recorder is out of order, because the user performing the switching operation of the audio stream expects the playback of an audio stream different from the audio stream #1, however just the same audio is played back in this case even if audio stream to be played back is switched to the audio stream #2.

While the audio stream 2 has been a dummy audio stream for the after-recording operation in the present embodiment, the audio stream 1 may be the dummy audio stream for the after-recording operation.

The payloads in the packets between the two audio streams have been coincident with each other in the present embodiment. The sizes of the audio data to be packetized may be different from each other, and may be identical to the audio streams recorded in the completed VOB or have the same contents as the audio streams recorded in the completed VOB.

In the present embodiment, furthermore, restrictions may be put on that the audio pack of the audio stream #1 always comes earlier between the corresponding audio packets between the two audio streams or the audio pack of the audio stream #2 may be arranged immediately after the audio pack of the audio stream #1. By putting such restrictions, it is easy to find the audio pack of the audio stream #2 during the after-recording operation. Moreover, restrictions can be put on that the audio stream #2 precedes the audio stream #1.

Moreover, there have been four kinds of values of the Application Flag, that is, "the same audio stream", "the stream having same audio contents", "the after-recorded stream" and "the individual stream". The "same audio stream" and the "same audio contents" may be dealt with as one state, the "after-recorded stream" and the "individual stream" may be dealt with as one state. Also the "same audio stream", "stream having same audio contents" and "after-recorded stream" may be dealt with as one state.

Furthermore, although four track buffers have been provided in the description of the after-recording operation, the AV data may be overwritten on the track buffers by sharing the track buffer1 and track buffer2, and by sharing the track buffer3 and track buffer4, respectively.

Second Embodiment

It has been possible to implement the after-recording operation which is hard to perform in the DVD and the DVD recorder in the first embodiment. However, the DVD and the DVD recorder further have the following problem.

Different from the conventional tape media, the DVD can carry out recording in various audio stream formats. This causes the after-recording operation in the DVD recorder to be hard to perform.

Concretely, the audio stream which can be recorded in the DVD has three kinds of formats of AC-3, MPEG audio and linear PCM. Moreover, there are various modes such as recording channel numbers, a recording bit rate and the like in individual formats.

On the other hand, a general audio encoder rarely can operate with all encode modes, channel numbers and bit rates, and can operate with only a mode suitable for each merchandise target. In other words, when the after-recording operation is applied to the disc on which data have been recorded by the other DVD recorder, the after-recording operation should be actually started or the recorded audio stream should be analyzed in order to decide whether the after-recording operation is operable or not.

The DVD and DVD recorder in this embodiment have basically the same structure as in the first embodiment, and are characterized by a method of having a management information on the disc and the operation of a recorder for performing the after-recording process. In the present embodiment, the difference from the first embodiment will be mainly described.

(Logical Structure of DVD-RAM)

Figure 1:
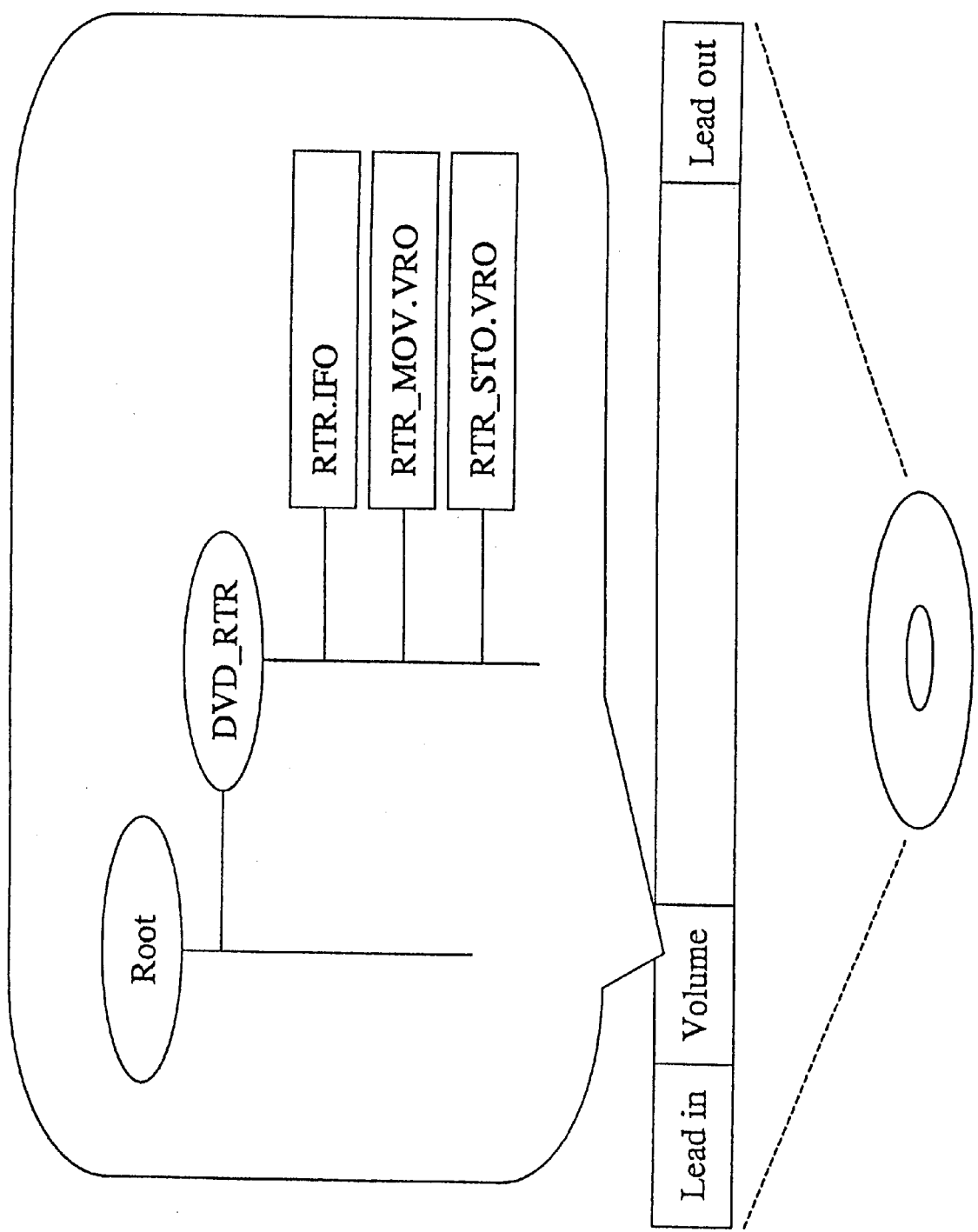
FIG. 1 is a diagram showing the logical structure of a disc in the second embodiment.

First of all, the logical structure of the DVD-RAM will be described with reference to FIG. 1. FIG. 1 shows a physical sector address on a disk and a data structure on the disk which can be seen through a file system.

All the data to be dealt with by the DVD recorder are put on a DVD_RTR directory immediately under a ROOT directory as shown in FIG. 1. The file to be dealt with by the DVD recorder is roughly divided-into 2 kinds of files, that is, one management information file and at least one AV file (ordinary a plurality of AV files). The AV file stores an RTR_MOV.VRO file for storing a motion picture and an RTR_STO.VRO file for storing a still picture and audio data which are recorded at the same time with the motion picture or the still picture.

Figure 2:
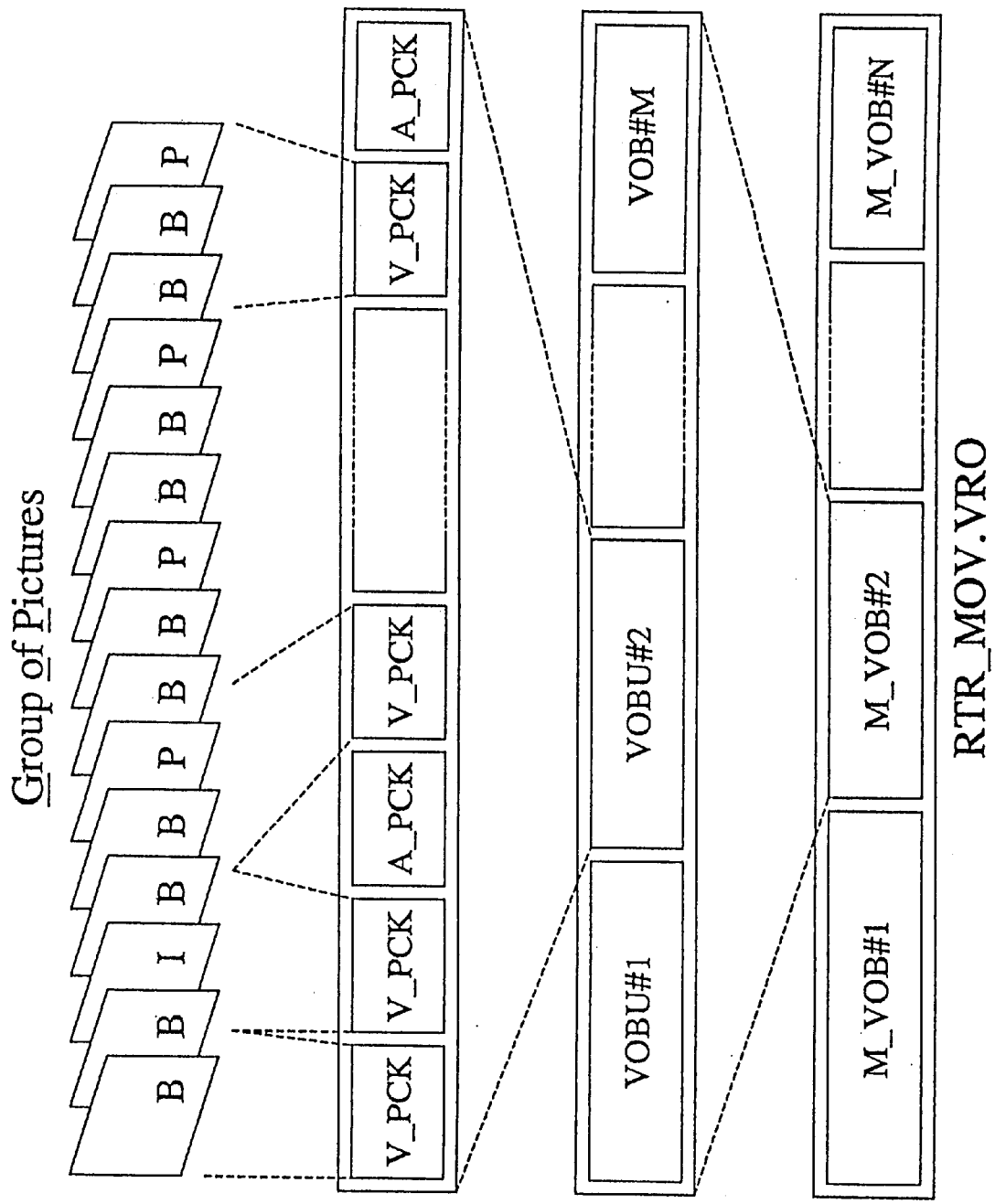
FIG. 2 is a diagram showing a structure in an AV file for a motion picture or movie data.

FIG. 2 is a diagram showing the structure of the RTR_MOV.VRO file having motion picture. As shown in FIG. 2, M_VOB (Movie Video Object) which is the program stream of MPEG is provided in the RTR_MOV.VRO file in order of picture recording.

The M_VOB comprises a VOBU (Video Object Unit) in which one unit is 0.4 to 1.0 second based on a video reproducing time. The VOBU comprises V_PCK (Video Pack), A_PCK (Audio Pack) and SP_PCK (Sub-picture Pack). Each pack is constituted in a 2 KB unit.

Video data in the VOBU also comprises at least one GOP (Group of Pictures). The GOP is the decode unit of the MPEG video and includes a plurality of P pictures and B pictures with the I pictures in a head.

Figure 3:
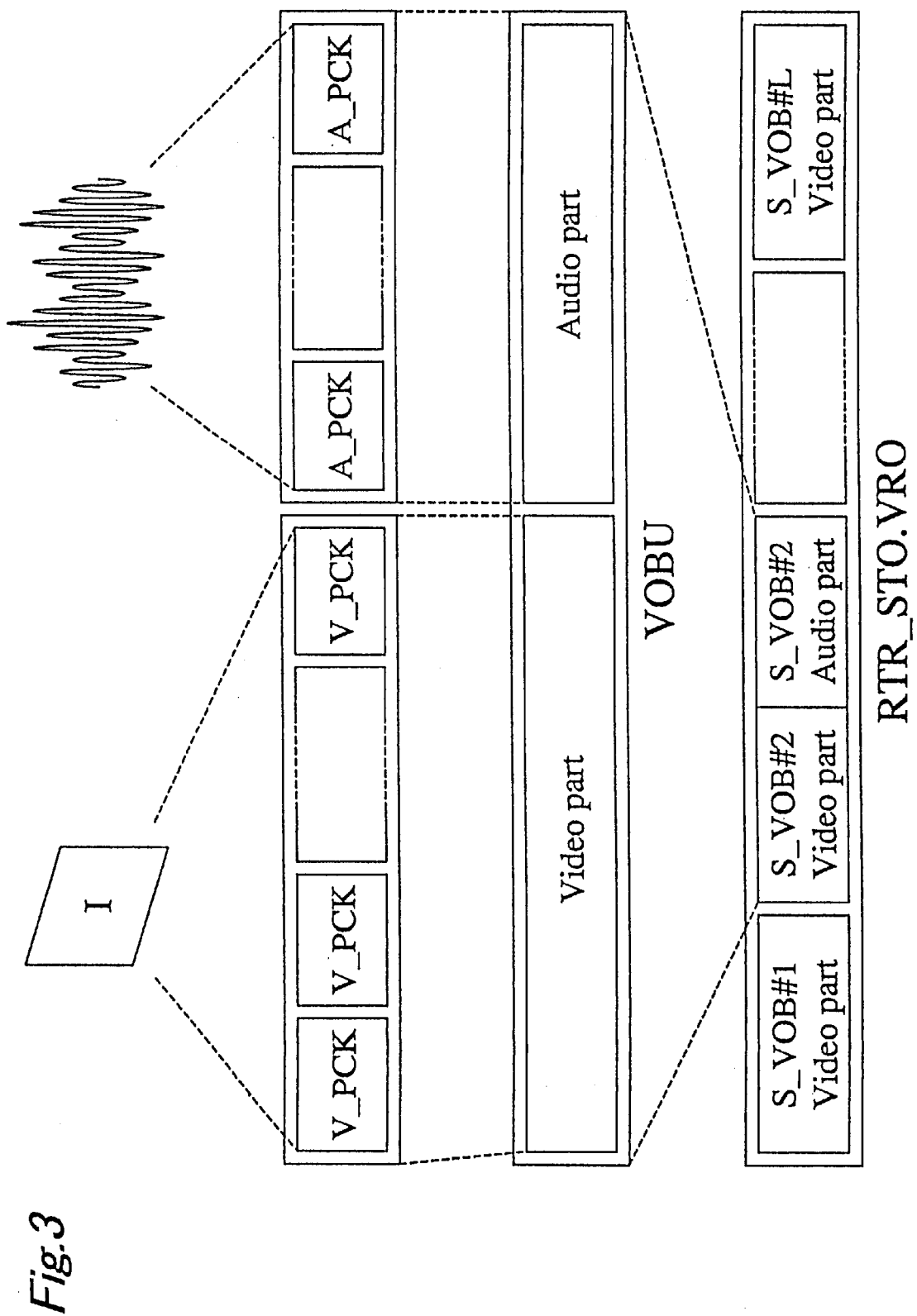
FIG. 3 is a diagram showing a structure in an AV file for a still picture.

FIG. 3 is a diagram showing the structure of the RTR_STO.VRO file in which a still picture and audio data are recorded. As shown in FIG. 3, S_VOB (Still Picture Video Object) which is an MPEG program stream for the still picture is recorded in the RTR_STO.VRO file in order of picture recording.

A great difference between the M_VOB and the S_VOB is that motion picture data and audio data are not mutually multiplexed but audio data (Audio part) are successively recorded after the still picture data (Video part), in addition to the recording of the still picture data in place of the motion picture data. Moreover, the S_VOB is constituted by one VOBU. The VOBU comprises the V_PCK, the A_PCK and the SP_PCK.

(AV Data and Management Information)

Figure 4:
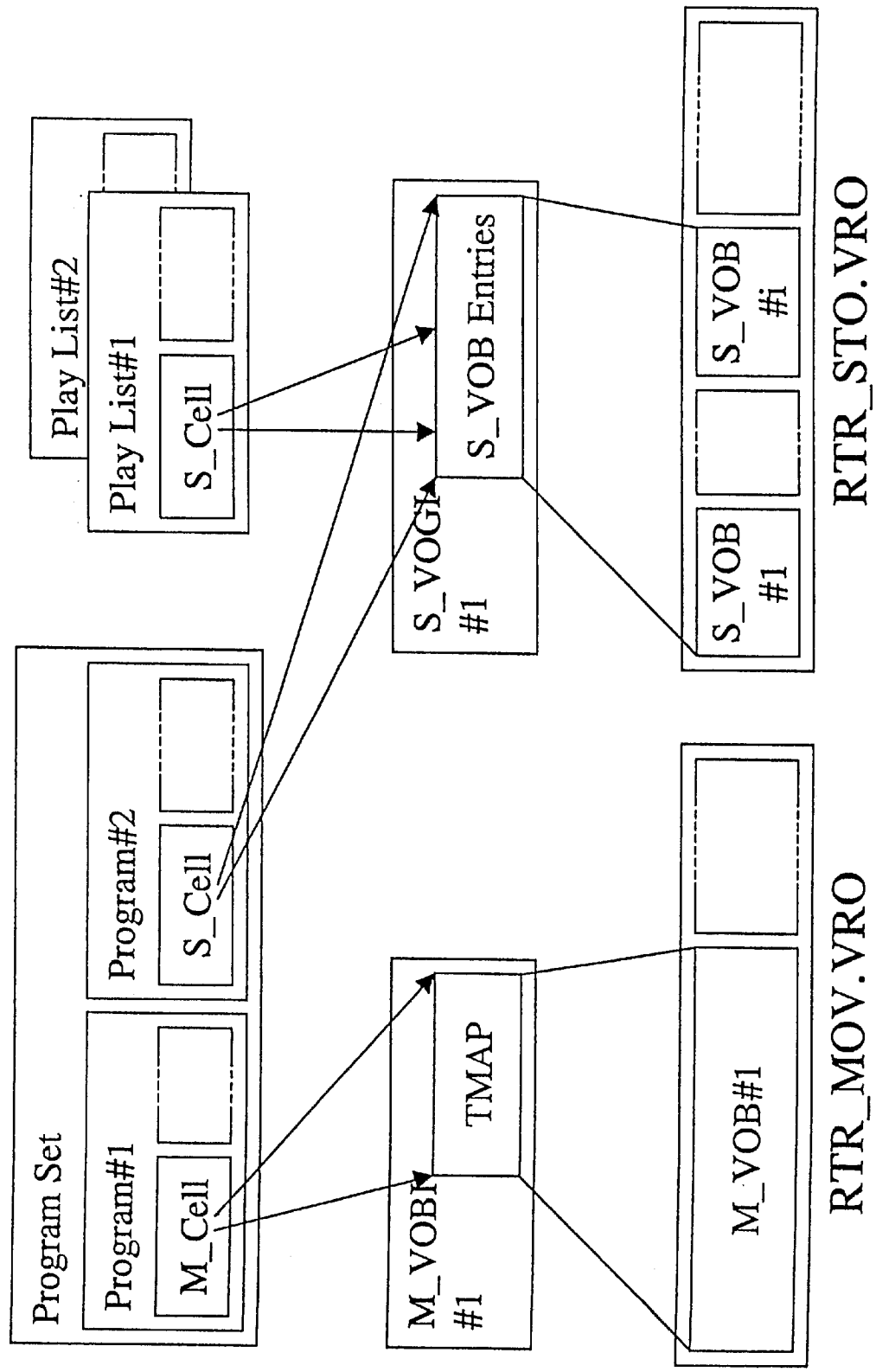
FIG. 4 is a diagram showing a relationship between AV data and management information.
Figure 5:
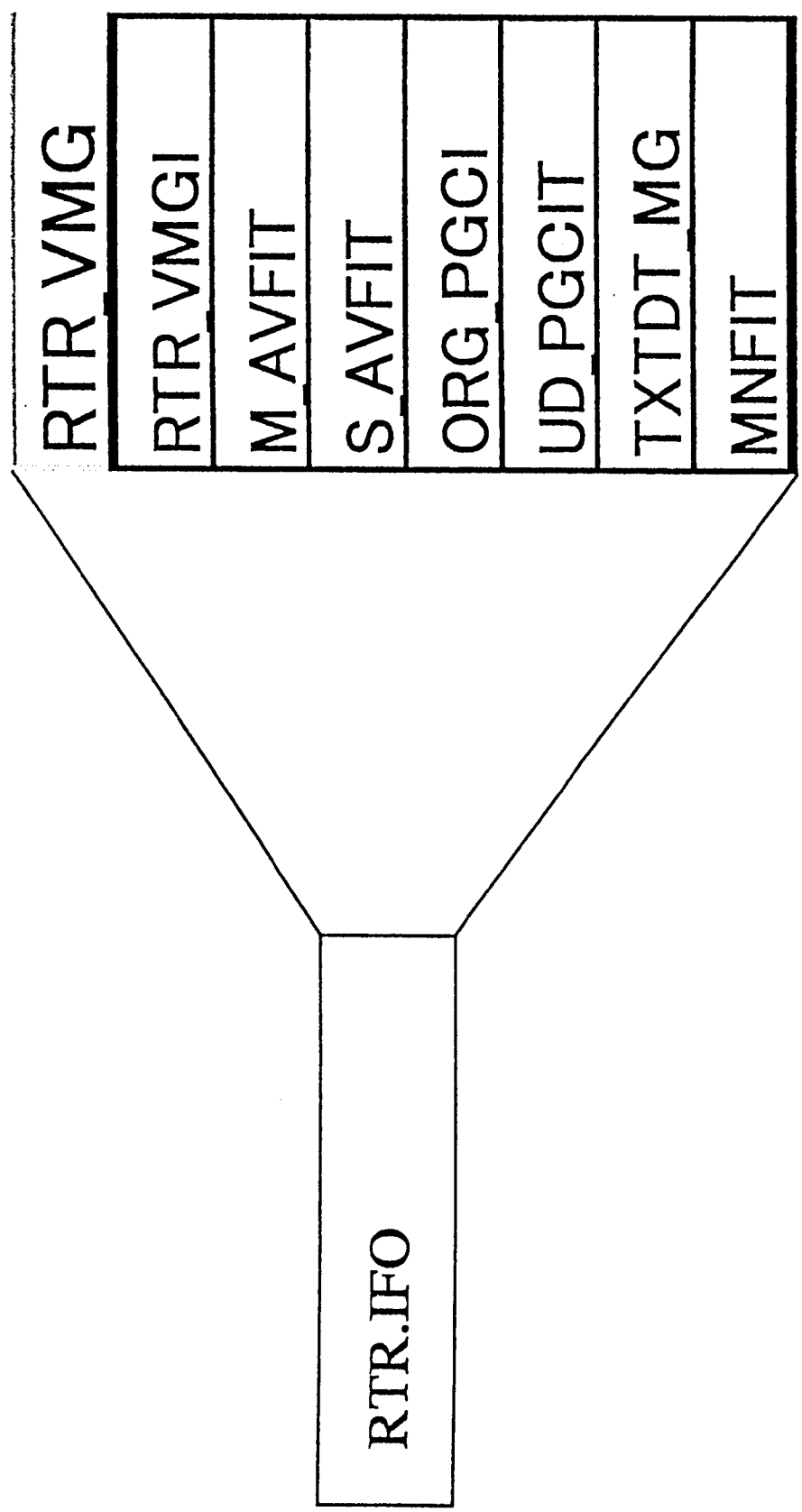
FIG. 5 is a diagram showing the structure of RTR_VMG.
Figure 6:
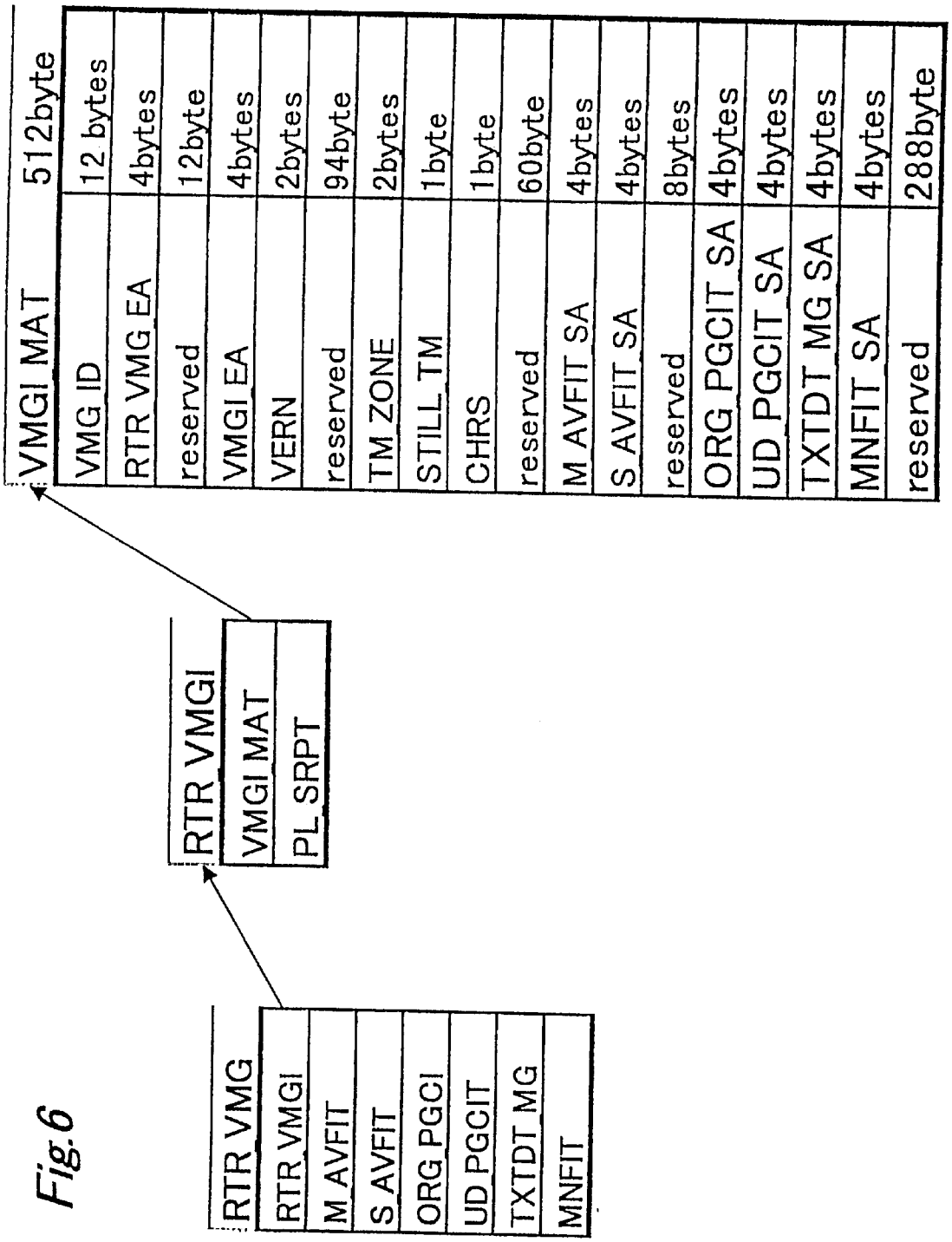
FIG. 6 is a diagram showing the structure of RTR_VMGI.
Figure 8:
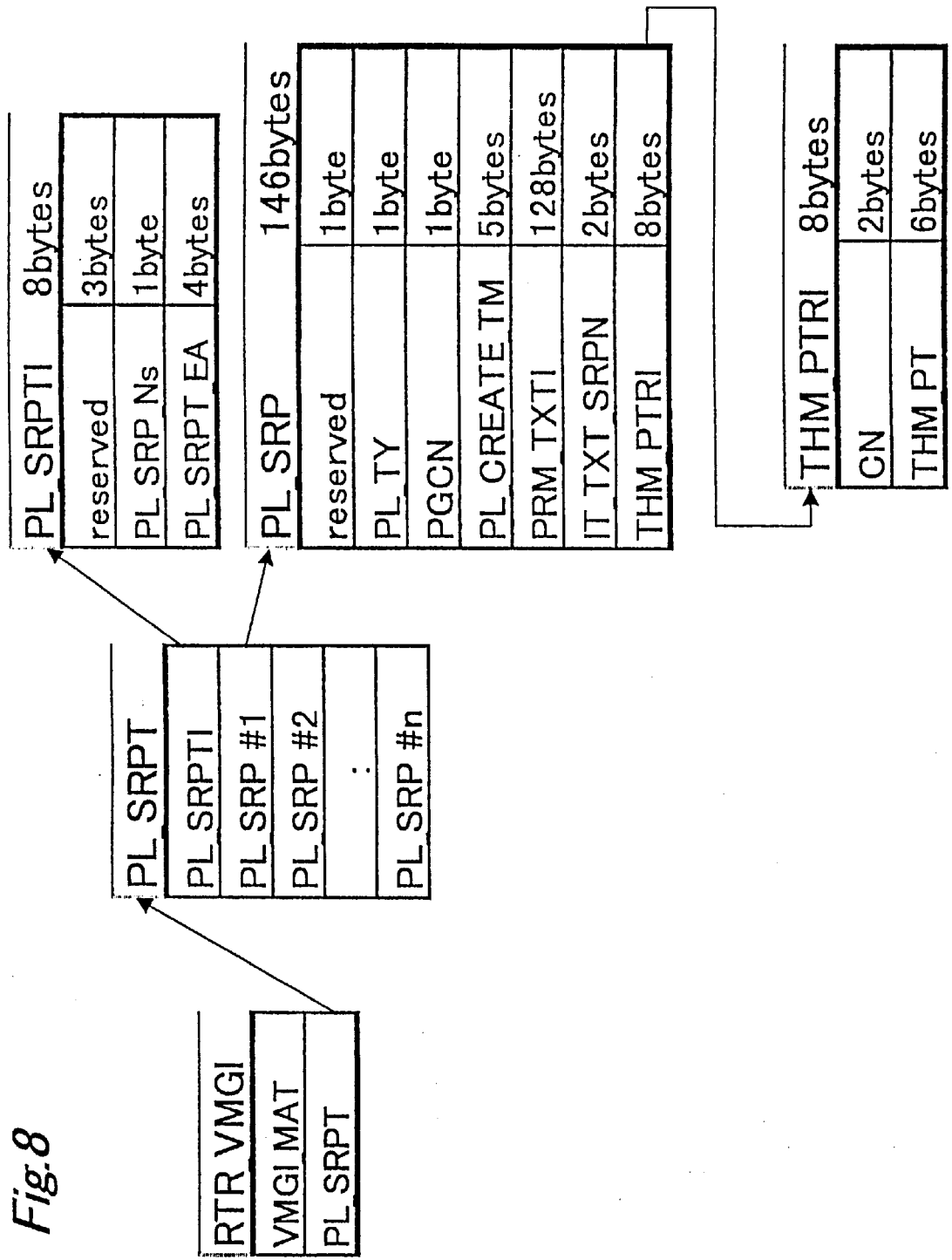
FIG. 8 is a diagram showing the structure of PL_SRP.
Figure 12:
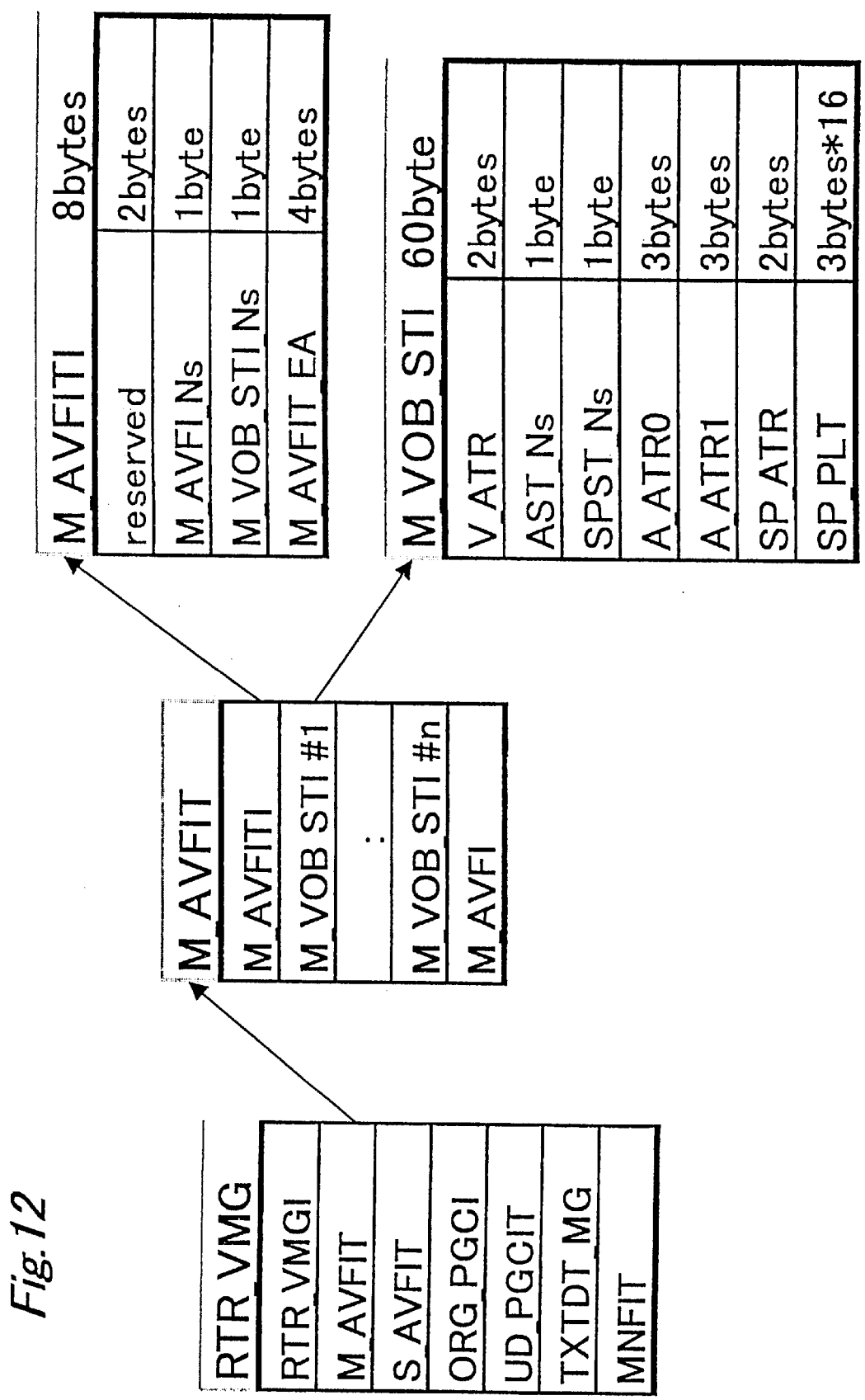
FIG. 12 is a diagram showing the structure of M_AVFIT.
Figure 15:
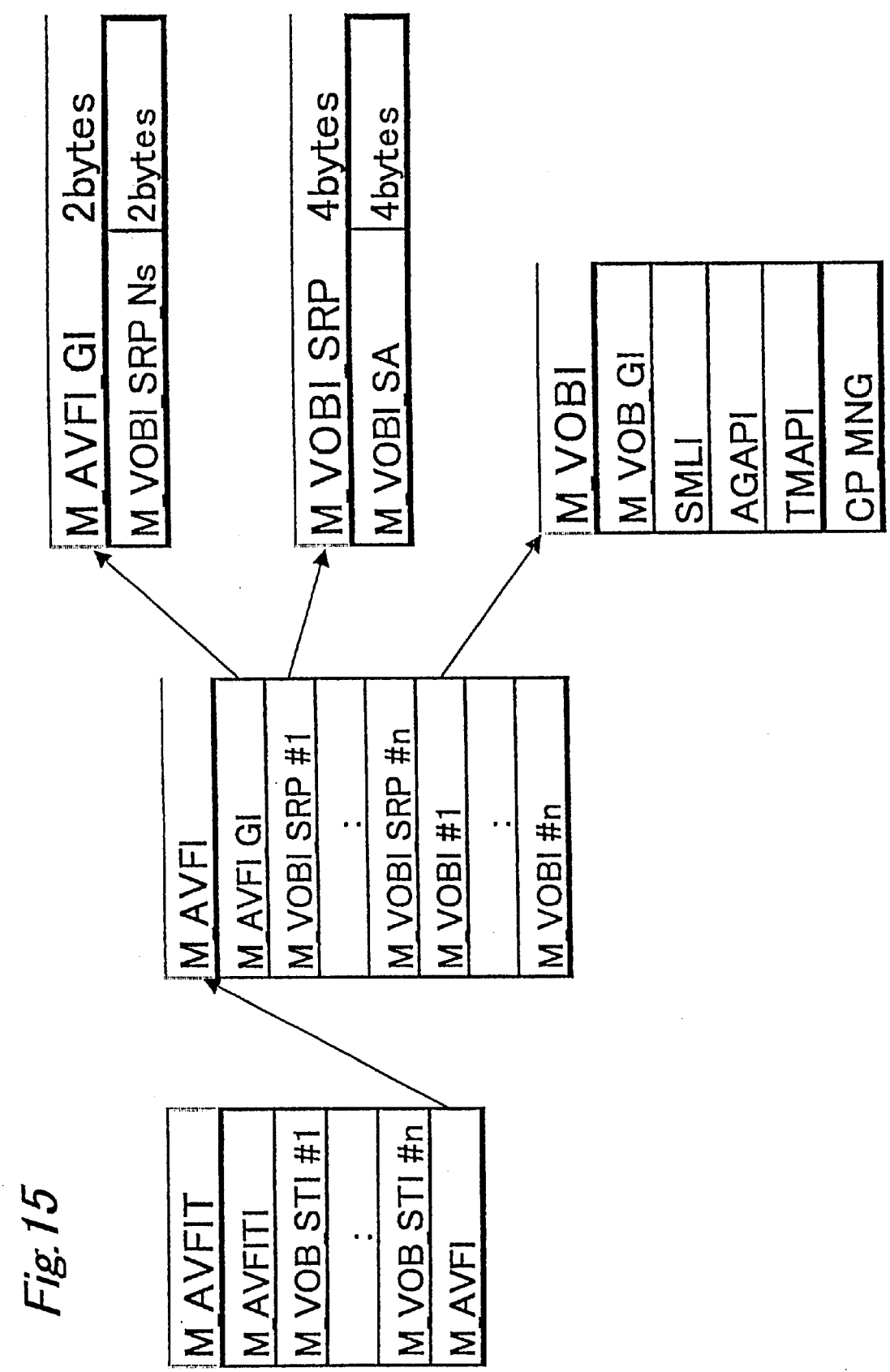
FIG. 15 is a diagram showing the structure of M_AVFI.
Figure 16:
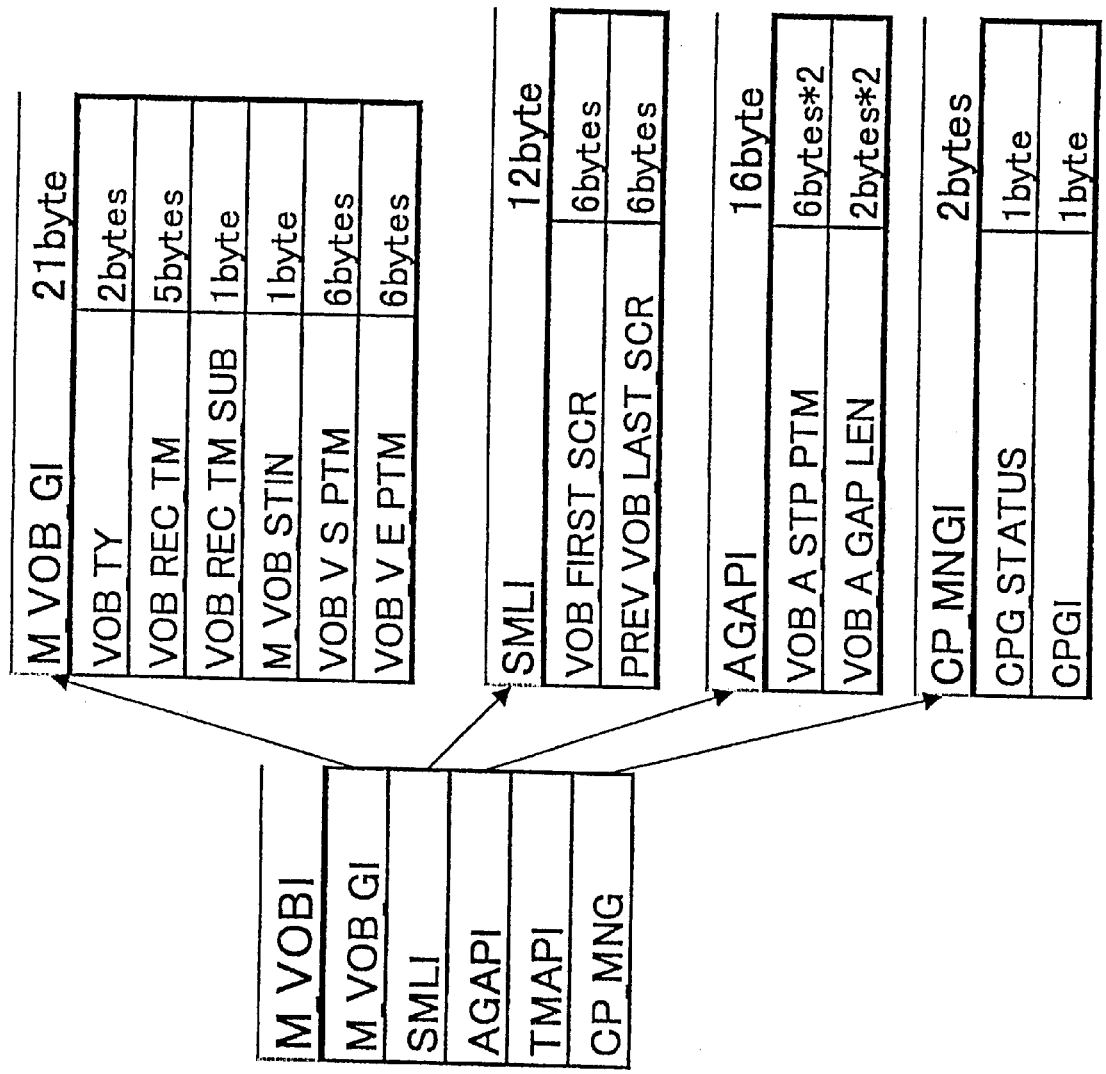
FIG. 16 is a diagram showing the structure of M_VOBI.
Figure 18:
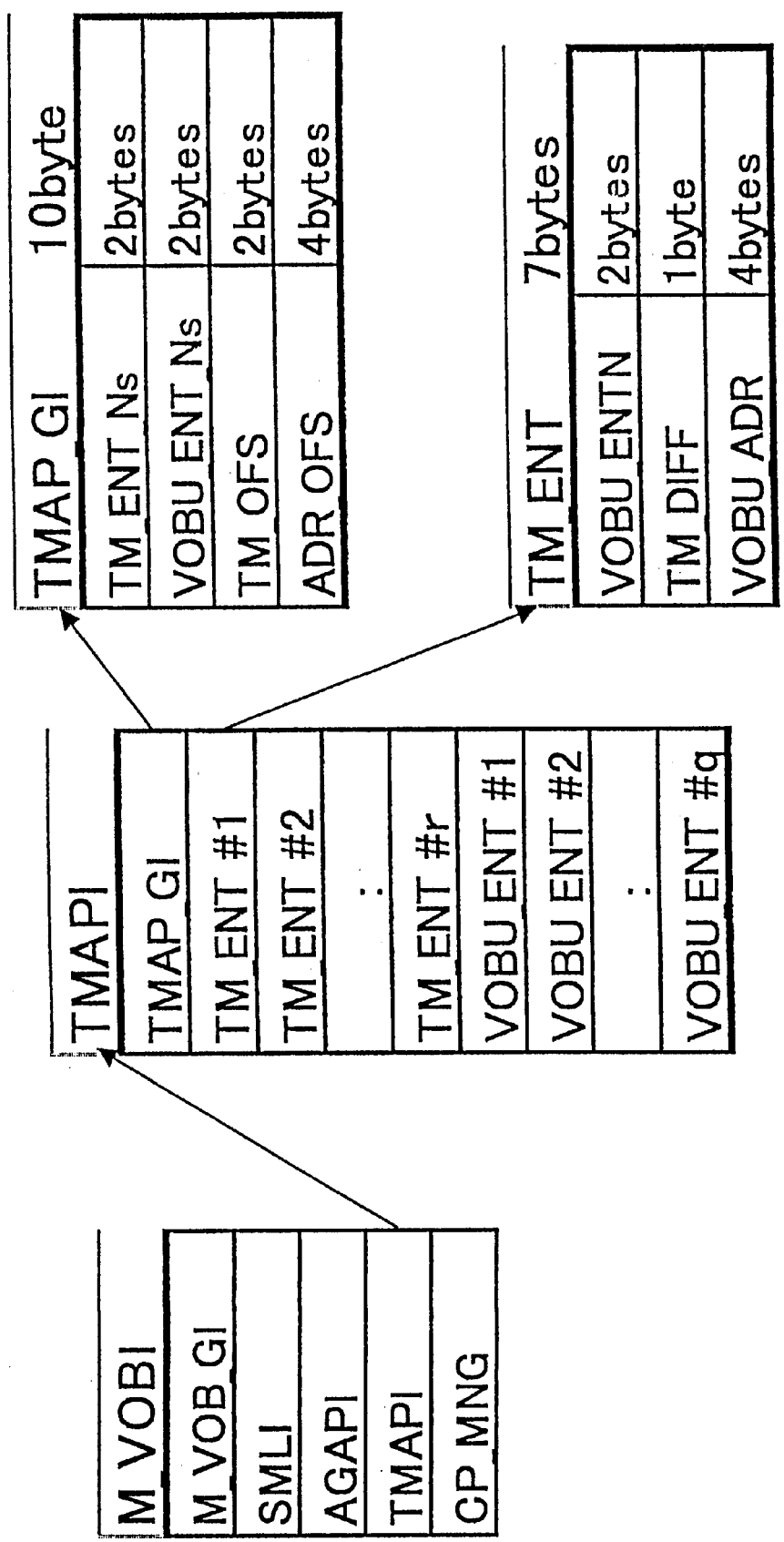
FIG. 18 is a diagram showing the structure of TMAPI.
Figure 20:
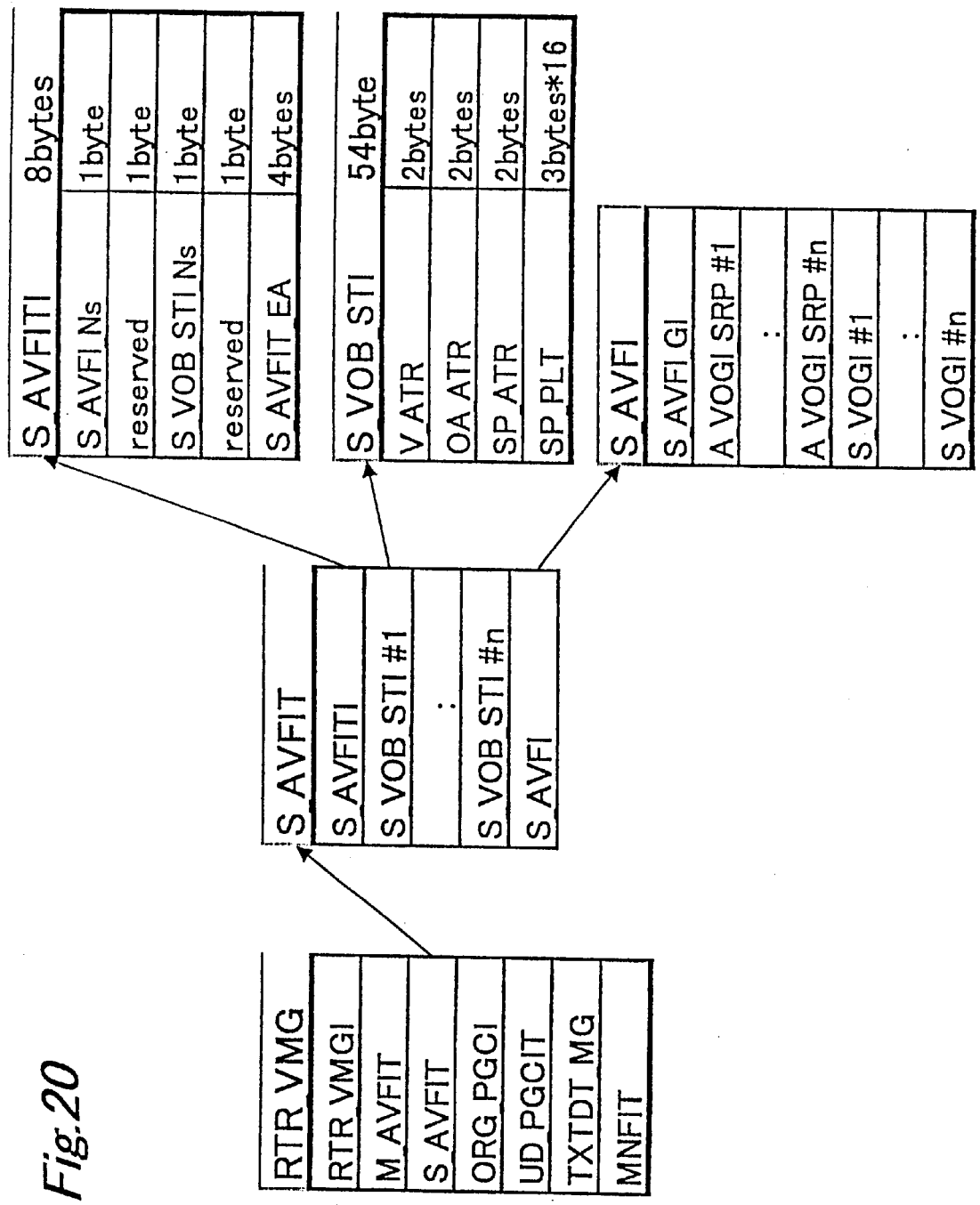
FIG. 20 is a diagram showing the structure of S_AVFIT.
Figure 23:
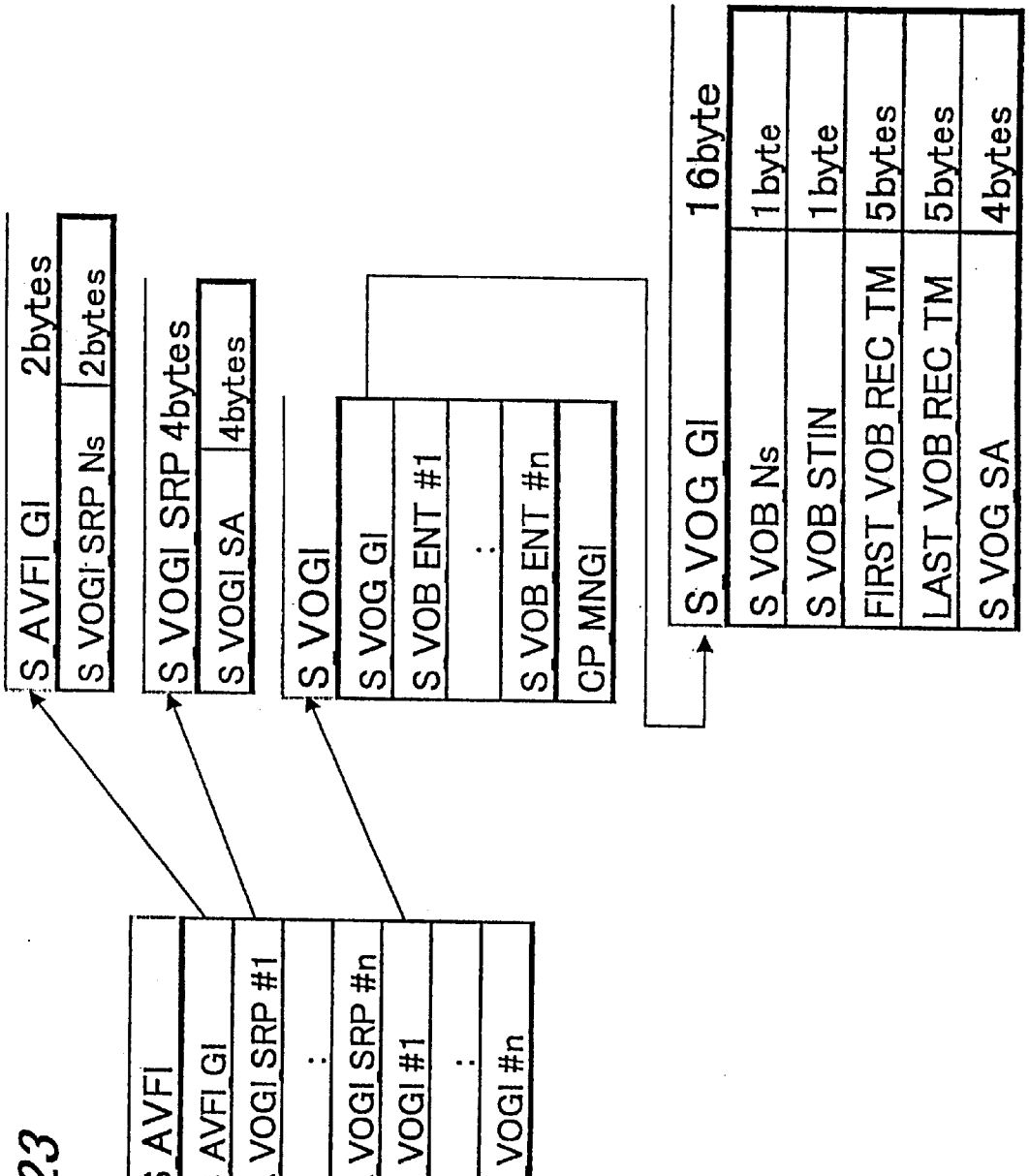
FIG. 23 is a diagram showing the structure of S_AVFI.
Figure 26:
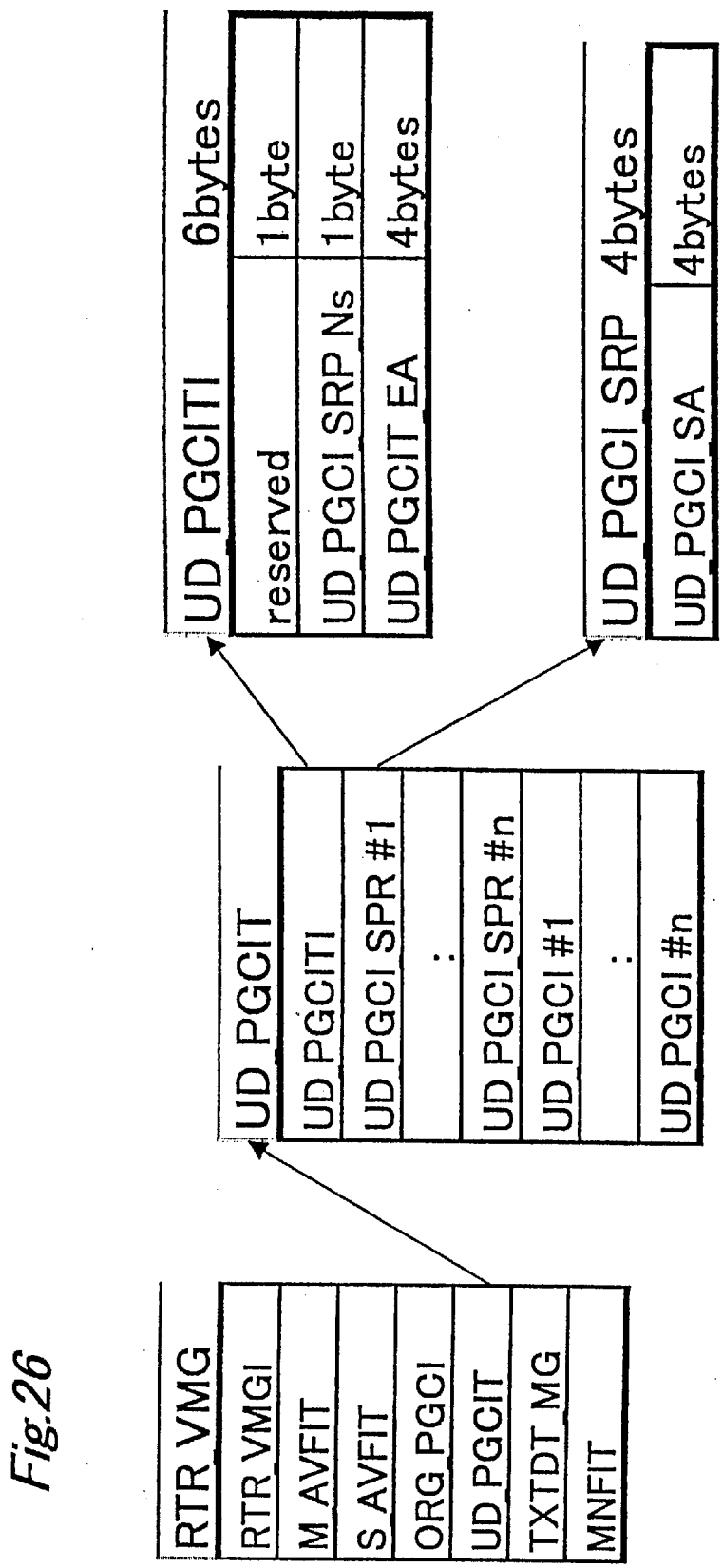
FIG. 26 is a diagram showing the structure of UD_PGCIT.
Figure 27:
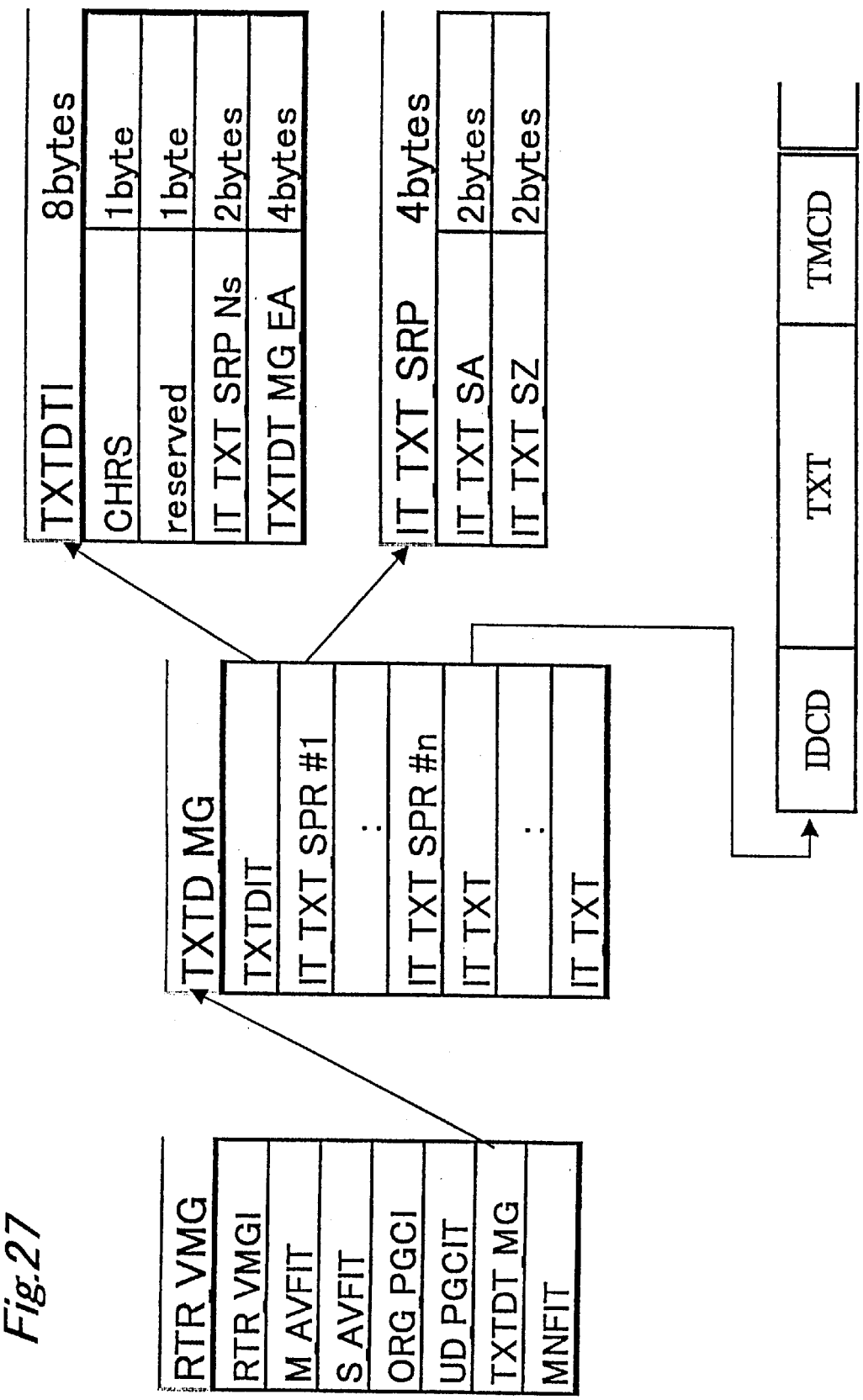
FIG. 27 is a diagram showing the structure of TXTDT_MG.
Figure 28:
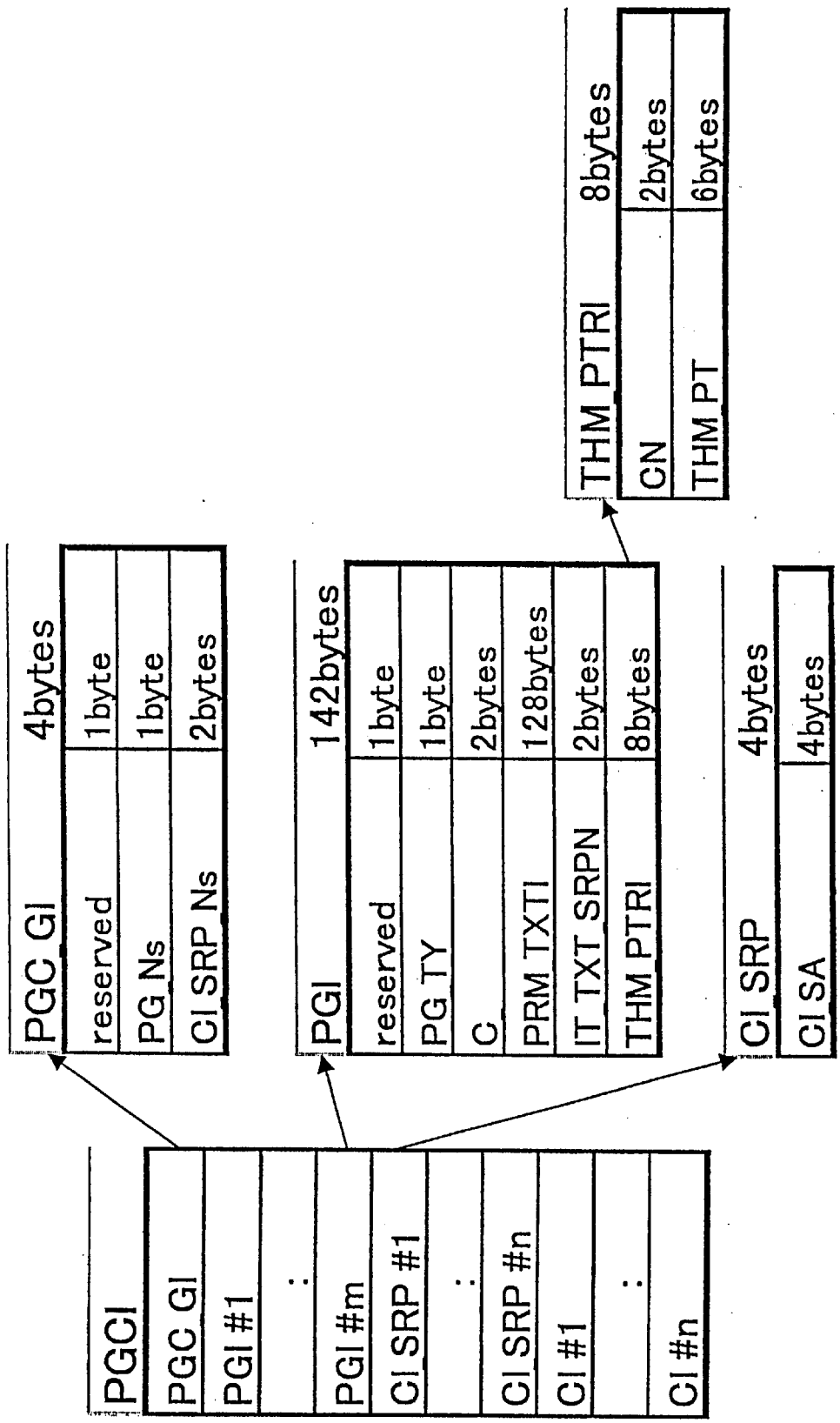
FIG. 28 is a diagram showing the structure of PGCI.
Figure 30:
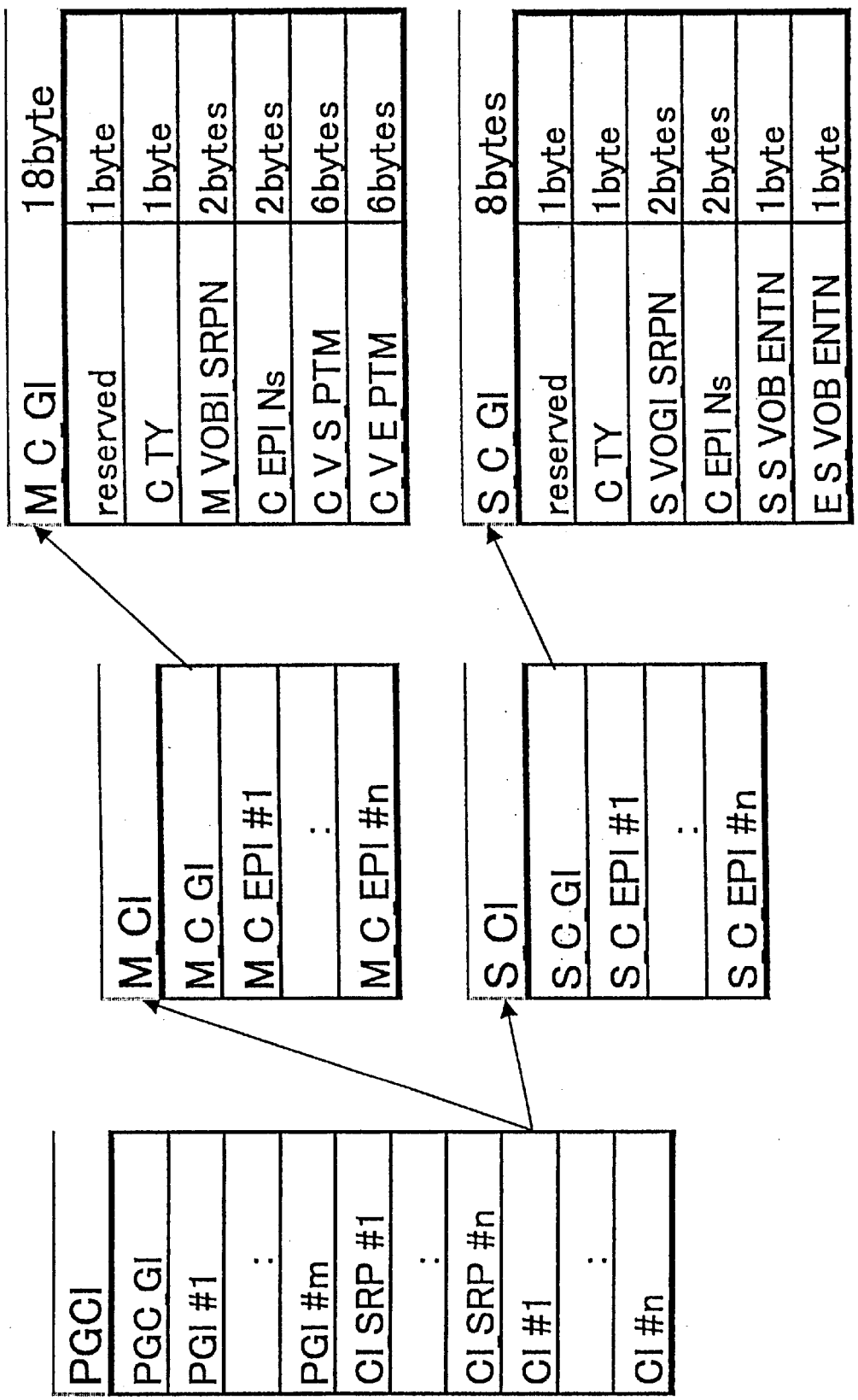
FIG. 30 is a diagram showing the structure of CI.
Figure 34:
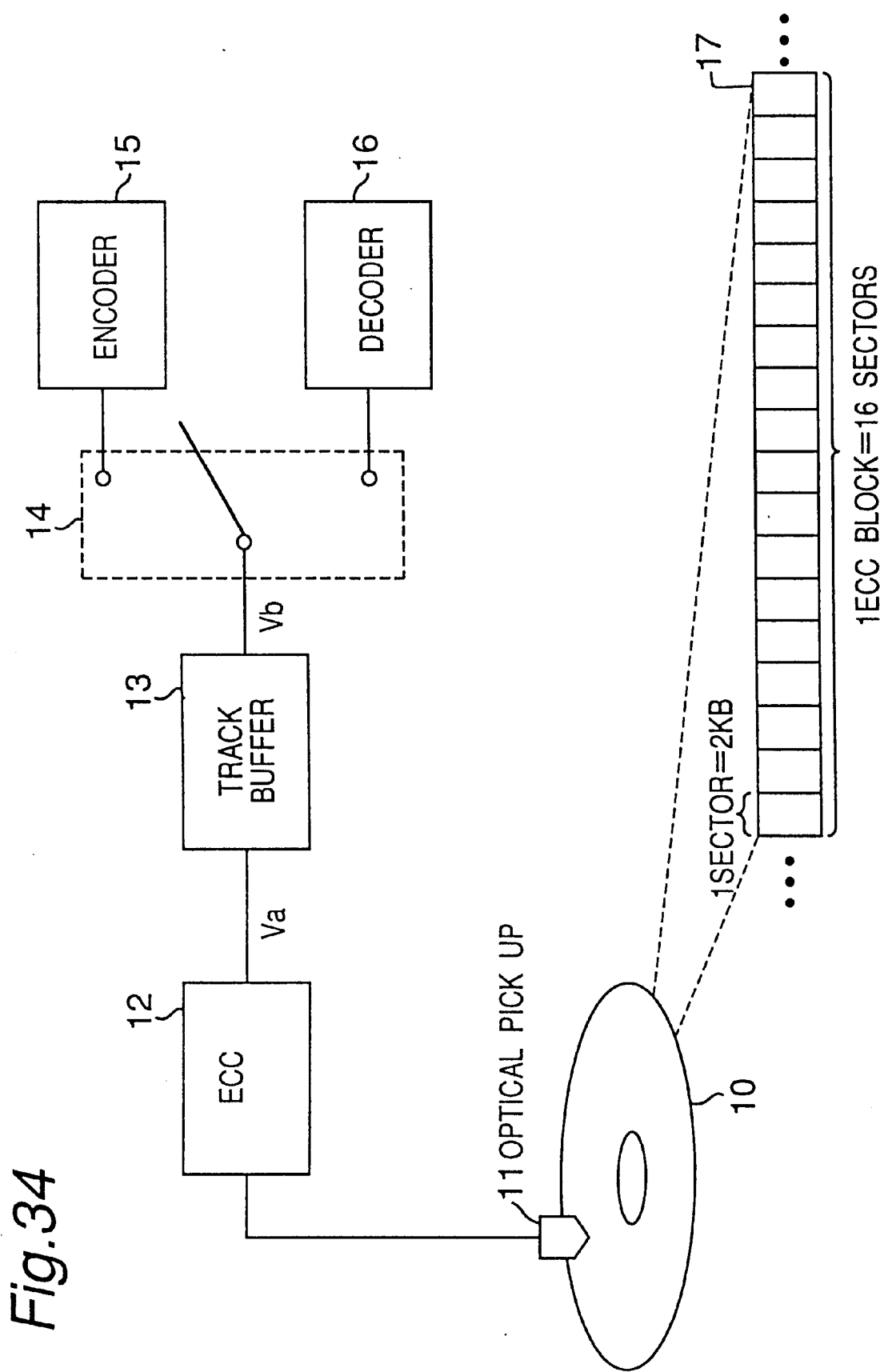
FIG. 34 is a block diagram showing the drive device of a DVD recorder.

Next, description will be given to the relationship between the M_VOB and S_VOB described above with reference to FIG. 4 and management information.

As described above, AV data have two kinds of data, that is, the M_VOB for a motion picture and S_VOB for a still picture. Each M_VOB has management information M_VOBI. Attribute information of the corresponding M_VOB is recorded in M_VOBI. In case of the S_VOB, when management is carried out for each S_VOB, the amount of the management information gets increased. Therefore, management information S_VOGI is provided for each group S_VOG having a lump of S_VOBs. S_VOGI stores the attribute information of a corresponding S_VOB group.

It is important that the data of the MPEG stream have no linearity between a time and a data amount. As described above, a compressing method using a time correlation characteristic and compression using a variable length coding method which is referred to as VBR are executed in order to implement highly efficient compression in the MPEG stream. Therefore, the time and the data amount, that is, address information do not uniquely correspond to each other.

The M_VOBI has a filter (TMAP) for converting a time and an address. The S_VOGI has a filter (S_VOB Entries) for converting still picture number and an address in the group.

Next, description will be given to the management information of a playback sequence.

The playback sequence is defined as a sequence (PGC) of a cell indicative of a partial or whole interval of the M_VOB and the S_VOG. The playback sequence has two kinds of parts, that is, an original PGC and a user-defined PGC. The original PGC refers to all the AV data in the disc. The user-defined PGC defines a playback order of AV data which the user selects in the disc (plural definitions can be obtained). The original PGC is also called a program set (Program Set), and includes a layer which is called a program (Program) having a plurality of cells logically bundled therebetween. The user-defined PGC is also called a play list (Play List) and includes no Program therebetween differently from the original PGC.

(Management Information File)

Next, the contents of the management information file "RTR. IFO" will be described with reference to FIGS. 5 to 33.

"RTR_VMG" (FIG. 5)

Management information referred to as RTR_VMG (Real Time Recording Video Management) is recorded in the RTR. IFO file. The RTR_VMG comprises seven tables of RTR_VMGI, M_AVFIT, S_AVFIT, ORG_PGCI, UD_PGCIT, TXTDT_MG and MNFIT.

Next, each table will be described in detail.

"RTR_VMGI" (FIG. 6)

RTR_VMGI (Real Time Recording Video Management Information) comprises VMGI_MAT and PL_SRPT.

"VMGI_MAT" (FIG. 6)

VMGI_MT (Video Management Information Management Table) stores the following information as information related to the whole disc. A player and a recorder can first read the VMGI_MAT to roughly obtain structural information of the disc.

VMG_ID (Video Management Identifier)

VMG_ID stores an identifier "DVD_RTR_VMG0" indicating that video recording data are recorded in this disc.

RTR_VMG_EA (RTR_VMG End Address)

The end address of the RTR_VMG is recorded therein.

VMGI_EA (VMGI End Address)

The end address of the VMGI is recorded therein.

VERN (Version Number)

The version number of a recording format of the video recording data is recorded in accordance with a format shown in FIG. 7.

TM_ZONE (Time Zone)

Recorded therein is a time zone to be used by all date and time information recorded in this disc. As shown in FIG. 7, TM_ZONE comprises TZ_TY (time zone type) and TZ_OFFSET (time zone offset). TZ_TY indicates which one of the Greenwich mean time as a universal time and a standard time for each region is used for the reference of date information. TZ_OFFSET records a time difference between the date and the Greenwich mean time.

STILL_TM (Still Time)

A static time length obtained when displaying a soundless still picture is recorded.

CHRS (Character Set Code for Primary Text)

A character set code for a primary text which will be described below is recorded therein.

M_AVFIT_SA (M_AVFIT Start Address)

Start address of M_AVFIT is recorded therein. When M_AVFIT is accessed, a seek is carried out up to this start address.

S_AVFIT_SA (S_AVFIT Start Address)

Start address of S_AVFIT is recorded therein. When S_AVFIT is accessed, a seek is carried out up to this start address.

ORG_PGCI_SA (ORG_PGCI Start Address)

Start address of ORG_PGCI is recorded therein. When ORG_PGCI is accessed, a seek is carried out up to this start address.

UD_PGCIT_SA (UD_PGCIT Start Address)

Start address of UD_PGCIT is recorded therein. When UD_PGCIT is accessed, a seek is carried out up to this start address.

TXTDT_MG_SA (TXTDT_MG Start Address)

Start address of TXTDT_MG is recorded therein. When TXTDT_MG is accessed, a seek is carried out up to this start address.

MNFIT_SA (MNFIT Start Address)

Start address of MNFIT is recorded therein. When MNFIT is accessed, a seek is carried out up to this start address.

"PL_SRPT" (FIG. 8)

PL_SRPT (Play List Search Pointer Table) is a table comprising PL_SRPTI and n PL_SRPs.

"PL_SRPTI" (FIG. 8)

PL_SRPTI (Play List Search Pointer Table Information) stores the following information for accessing to PL_SRP.

PL_SRP_Ns (Number of PL_SRP)

Number of PL_SRPs is recorded therein.

PL_SRPT_EA (PL_SRPT End Address)

End address of PL_SRPT is recorded therein.

"PL_SRP" (FIG. 8)

Moreover, the following information for giving access to the user-defined PGC which is actual data of the play list is recorded in PL_SRP (Play List Search Pointer).

PL_TY (Play List Type)

Any of the following values is recorded as a value for identifying the type of a play list in accordance with a description format shown in FIG. 9.

0000b: only motion pictures

0001b: only still pictures

0010b: hybrid of motion pictures and still pictures

PGCN (PGC Number)

PGC number corresponding to the play list is recorded therein.. The PGC number indicates the recording order of PGC information in UD_PGCIT which will be described below.

PL_CREATE_TM (Play List Recording Date)

Information about the date and time at which the play list was created is recorded therein in accordance with the description format shown in FIG. 9.

PRM_TXTI (Primary Text Information)

Text information indicative of the contents of the play list is recorded therein. For example, in the case where a television program is picture recorded, the name of the program is recorded. Moreover, the primary text information is constituted by a field for the ASCII code and a field of a character code set specified by the above-mentioned CHRS.

IT_TXT_SRPN (IT_TXT_SRP Number)

When information indicative of the contents of the play list are optionally recorded as IT_TXT in addition to the above-mentioned primary text, the IT_TXT_SRP number is recorded as link information to the IT_TXT to be recorded in the TXTDT_MG. The IT_TXT_SRP number indicates the recording order in TXTDT_MG which will be described below.

THM_PTRI (Thumb Nail Pointer Information)

Thumb nail information which is representative of the play list is described.

"THM_PTRI" (FIG. 8)

In THM_PTRI is recorded the following information indicative of the position of a thumb nail.

CN (Cell Number)

Cell number of a cell including a thumb nail is recorded therein. The cell number indicates the recording order of cell information in the UD_PGCI to which the play list corresponds.

THM_PT (Thumb Nail Point)

When a cell indicated by the above-mentioned CN is a motion picture cell, the display time of a video frame to be used as a thumb nail is recorded in accordance with a PTM description format shown in FIG. 10. The PTM is given in accordance with the reference time of a time stamp described in the MPEG program stream.

Moreover, when the cell indicated by the above-mentioned CN is a still picture cell, the still picture VOB entry number of a still picture to be used as the thumb nail is recorded in accordance with an S_VOB_ENTN description format shown in FIG. 11. The still picture. VOB entry number indicates the recording order of the still picture VOB entry in a still picture VOB group indicated by this cell.

"M_AVFIT" (FIG. 12)

M_AVFIT (Motion picture AV File Information Table) stores management information corresponding to motion picture AV file "RTR_MOV.VRO" and comprises M_AVFITI, M_VOB_STI and M_AVFI.

"M_AVFITI" (FIG. 12)

M_AVFITI (Motion picture AV File Information Table Information) stores the following information necessary for giving access to M_VOB_STI and M_AVFI.

M_AVFI_Ns (Number of Motion Picture AV File Information)

Number of fields of succeeding AVFI information is indicated therein. When the value is "0", there exists no AVFI, while when the value is "1", there exists AVFI. Moreover, the presence of the AVFI also corresponds to that of RTR_MOV.VRO which is the AV file for motion pictures.

M_VOB_STI_Ns (Number of M_VOB_STI)

Number of fields of succeeding M_VOB_STI is indicated therein.

M_AVFIT_EA (M_AVFIT End Address)

The end address of M_AVFIT is recorded therein.

"M_VOB_STI" (FIG. 12)

M_VOB_STI (Movie VOB Stream Information) stores the following information as the stream information of movie VOB.

V_ATR (Video Attribute)

The following video attribute information is recorded in accordance with a format shown in FIG. 13.

Video Compression Mode

Any one of the following values for identifying a video compression mode is recorded therein.

00b: MPEG-1
01b: MPEG-2

TV System

Any one of the following values for identifying a television system is recorded therein.

00b: 525/60 (NTSC)
01b: 625 50 (PAL)

Aspect Ratio

Any one of the following values for identifying a resolution ratio is recorded therein.

00b: 4×3
01b: 16×9 line21_switch_1

Recorded therein is any one of the following values for identifying that closed caption data for a field 1 are recorded or not in a video stream.

1b: Recorded
0b: Not recorded line21_switch_2

Recorded therein is any one of the following values for identifying that closed caption data for a field 2 are recorded or not in the video stream.

1b: Recorded
0b: Not recorded

Video Resolution

Any one of the following values for identifying a video resolution is recorded therein.

000b: 720×480 (NTSC), 720×576 (PAL)
001b: 702×480 (NTSC), 702×576 (PAL)
010b: 352×480 (NTSC), 352×576 (PAL)
011b: 352×240 (NTSC), 352×288 (PAL)
100b: 544×480 (NTSC), 544×576 (PAL)
101b: 480×480 (NTSC), 480×576 (PAL)

AST_Ns (Number of Audio Streams)

Number of audio streams recorded in corresponding VOB is recorded therein.

SPST_Ns (Number of Sub-picture Streams)

Number of sub-picture streams recorded in corresponding VOB is recorded therein.

A_ATR0 (Attribute of Audio Stream 0)

The following audio attribute information corresponding to an audio stream 0 (corresponding to the audio stream #1 described above) is recorded in accordance with a format shown in FIG. 13.

Audio Coding Mode

Any one of the following values for identifying an audio compressing method is recorded.

000b: Dolby AC-3
001b: MPEG audio having no extended stream
010b: MPEG audio having an extended stream
011b: linear PCM Application Flag Any one of the following values for identifying application information is recorded therein.

00b: No application
01b: Mixed audio channel number
10b: With auxiliary voice

Quantization/DRC

When using the MPEG audio, any one of the following values for identifying the presence of DRC (Dynamic Range Control) information is recorded therein.

00b: DRC data are not included in the MPEG stream.
01b: DRC data are included in the MPEG stream.

When using the LPCM audio, the following value for identifying the Quantization is recorded therein.

00b: 16 bits fs

The following value for identifying a sampling frequency is recorded therein.

00b: 48 kHz

Number of Audio Channels

Any one of the following values for identifying the number of audio channels is recorded therein.

0000b: one channel (monophonic)
0001b: two channels (stereo)
0010b: three channels
0011b: four channels
0100b: five channels
0101b: six channels
0110b: seven channels
0111b: eight channels
1001b: two channels (dual monophonic)

Bitrate

Any one of the following values for identifying a bit rate is recorded therein.

0000 0001b: 64 kbps
0000 0010b: 89 kbps
0000 0011b: 96 kbps
0000 0100b: 112 kbps
0000 0101b: 128 kbps
0000 0110b: 160 kbps
0000 0111b: 192 kbps
0000 1000b: 224 kbps
0000 1001b: 256 kbps
0000 1010b: 320 kbps
0000 1011b: 384 kbps
0000 1100b: 448 kbps
0000 1101b: 768 kbps
0000 1110b 1536 kbps It is important that only the bit rate of a basic stream excluding an extended stream is recorded when the corresponding audio stream is the MPEG audio stream having the extended stream. The reason is that the extended stream cannot be expressed by the above-mentioned fixed bit rate because it carries out the compression using the variable length coding method.

A_ATR1 (Attribute of Audio Stream 1)

The following audio attribute information corresponding to an audio stream 1 (corresponding to the above described audio stream #2 provided for after-recording) is recorded in accordance with a format shown in FIG. 13. Individual fields are the same as the above-mentioned A_ATR0.

SP_ATR (Sub-picture Attribute)

The following sub-picture attribute information is recorded in accordance with a format as shown in FIG. 14.

Application Flag

Any one of the following values for identifying application information is recorded therein.
 00b: No application
 01b: Subtitles
 10b: Animation SP_PLT (Sub-picture Color Palette)

Color palette information for a sub-picture is recorded in accordance with the format shown in FIG. 14.

"M_AVFI" (FIG. 15)

M_AVFI (Motion picture AV File Information) comprises information necessary for giving access to movie VOB (M_VOB), M_AVFI_GI, M_VOBI_SRP and M_VOBI.

"M_AVFI_GI" (FIG. 15)

M_VOBI_SRP_Ns is recorded in M_AVFI_GI (Motion picture AV File Information General Information).

M_VOBI_SRP_Ns (Number of Movie VOB Information Search Pointer)

Number of M_VOBI_SRP is recorded therein.

"M_VOBI SRP" (FIG. 15)

M_VOBI_SRP (Movie VOB Information Search Pointer) stores address information for accessing each M_VOBI.

M_VOBI_SA (Movie VOB Information Start Address)

The start address of M_VOBI is recorded therein. The indicated address herein can be used in seeking operation for accessing the VOB information.

"M_VOBI" (FIG. 16)

M_VOBI (Movie VOB Information) comprises management information of movie VOB, M_VOB_GI, SMLI, AGAPI, TMAPI and CP_MNGI.

"M_VOB GI" (FIG. 16)

M_VOB_GI (Movie VOB General Information) stores the following information as the general information of the Movie_VOB.

VOB_TY (VOB_Type)

The attribute information of VOB is recorded therein in accordance with a format shown in FIG. 17.

TE

Any one of the following values for identifying the status of the VOB is recorded therein.
 0b: Normal status
 1b: Temporary erasing status

A0_STATUS

Any one of the following values for identifying the status of an audio stream 0 is recorded therein.
 00b: Original status
 01b: Rewritten status

A1_STATUS

Any one of the following values for identifying the status of an audio stream 1 is recorded therein.
 00b: Original status
 01b: Rewritten status
 10b: Dummy status for after-recording
 11b: After-recorded status

APS

Any one of the following values for identifing analog copy preventing signal control information is recorded therein.
 00b: NO APS
 01b: Type 1
 10b: Type 2
 11b: Type 3

SML_FLG

Any one of the following values for identifying whether or not the VOB is seamlessly reproduced together with the VOB present just before.
 0b: Seamless reproduction is impossible.
 1b: Seamless reproduction is possible.

A0_GAP_LOC

Recorded therein is any one of the following values indicative of the presence of an audio reproducing gap in the audio stream 0 and VOBU having an audio reproducing gap interval multiplexed.
 00b: No audio reproducing gap
 01b: Audio reproducing gaps are multiplexed to a head VOBU.
 10b: Audio reproducing gaps are multiplexed to a second VOBU.
 11b: Audio reproducing gaps are multiplexed to a third VOBU.

A1_GAP_LOC

Recorded therein is any one of the following values indicative of the presence of an audio reproducing gap in the audio stream 1 and VOBU having an audio reproducing gap interval multiplexed.
 00b: No audio reproducing gap
 01b: Audio reproducing gaps are multiplexed to a head VOBU.
 10b: Audio reproducing gaps are multiplexed to a second VOBU.
 11b: Audio reproducing gaps are multiplexed to a third VOBU.

VOB_REC_TM (VOB Recording Date and Time)

The date and time on which the VOB was recorded is recorded therein in the same format as in the PL_CREATE_TM shown in FIG. 9. It is important that the recording date and time indicates the recording date and time of the display video frame of the VOB head and the VOB_REC_TM should also be corrected when the VOB head video frame is changed by edit or partial erasure. When the recording date and time is to be displayed synchronously with the reproduction of the VOB as often seen in a camcoder, the recording date and time is possible to obtain by adding an elapsed time in the VOB to the VOB_REC_TM.

VOB_REC_TM_SUB (VOB Recording Date and Time Difference Information)

VOB_REC_TM_SUB is a field for absorbing the error of the VOB_REC_TM to be modified when the VOB head video frame is changed by the edit and the partial erasure on the VOB. The VOB_REC_TM has only information about year, month, day, hour, minute and second as shown in FIG. 9. Therefore, in the case where the edit or erasure is carried out in each frame or field, the VOB_REC_TM cannot provide a sufficient recording precision. By using this field, therefore, a fraction is recorded.

M_VOB_STIN (M_VOB_STI Number)

M_VOB_STI number corresponding to the VOB is recorded therein. M_VOB_STI number shown herein is the recording order in the above-mentioned M_VOB_STI table.

VOB_V_S_PTM (VOB Video Start PTM)

The display start time of the VOB is recorded therein with the same reference time as a time stamp in a stream.

VOB_V_E_PTM (VOB Video End PTM)

The display end time of the VOB is recorded therein with the same reference time as a time stamp in a stream. It should be noted that the time stamp in the stream indicates the display start time of the frame, while VOB_V_E_PTM stores the display end time, that is, a time obtained by adding the display period of the frame to the display start time.

"SMLI" (FIG. 16)

SMLI (Seamless Information) stores the following information necessary for seamless reproduction with the last VOB. Moreover, this field is provided only when "1b" is recorded in the above-mentioned SML_FLG.

VOB_FIRST_SCR (VOB Head SCR)

SCR in the first pack of the VOB is recorded.

PREV_VOB_LAST SCR (Previous VOB Last SCR)

SCR of the last pack of the previous VOB is recorded therein.

"AGAPI" (FIG. 16)

AGAPI (Audio Gap Information) stores the following information necessary for processing an audio reproducing gap in a decoder. Moreover, this field is provided in the case where a value other than "00b" is recorded in either the above-mentioned A0_GAP_LOC or A1_GAP_LOC.

VOB_A_STP_PTM (VOB Audio Stop PTM)

The time of the audio reproducing gap, that is, the time that the decoder temporarily stops audio reproduction is recorded therein with the same reference time as a time stamp in a stream.

VOB_A_GAP_LEN (VOB Audio Gap Length)

The time length of an audio reproducing gap is recorded with a precision of 90 kHz.

"CP_MNGI" (FIG. 16)

CP_MNGI (Copy Management Information) comprises copy management information for the VOB, CPG_STATUS and CPGI.

CPG_STATUS (Copy Protecting Status)

As the copy protecting status of the VOB, values for identifying "copy free" or "one generation copying" are recorded therein.

CPGI (Copy Protecting Information)

Copy protecting information applied to the VOB is recorded therein.

"TMAPI" (FIG. 18)

TMPAI (Time Map Information) comprises TMAP_GI, TM_ENT and VOBU_ENT.

"TMAP_GI" (FIG. 18)

TMAP_GI (TMAP General Information) comprises TM_ENT_Ns, VOBU_ENT_Ns, TM_OFS and ADR_OFS. Each field is as follows.

TM_ENT_Ns (Number of TM_ENT)

Number of fields of TM_ENT which will be described below is recorded therein.

VOBU_ENT_Ns (Number of VOBU_ENT)

Number of fields of VOBU_ENT which will be described below is recorded therein.

TM_OFS (Time Offset)

The offset value of a time map is recorded therein with a video field precision.

ADR_OFS (Address Offset)

An offset value in the AV file of the head of the VOB is recorded therein.

"TM_ENT" (FIG. 18)

TM_ENT (Time Entry) comprises the following fields as access point information for each constant interval TMU. TMU for NTSC is 600 video fields (NTSC), while TMU for PAL is 500 video fields.

VOBU_ENTN (VOBU_ENT Number)

The entry number of VOBU including a time indicated by the TM_ENT (TMU×(N−1)+TM_OFS for Nth TM_ENT) is recorded therein.

TM_DIFF (Time Difference)

A difference between a time indicated by the TM_ENT and the display start time of VOBU indicated by the above-mentioned VOBU_ENTN is recorded therein.

VOBU_ADR (VOBU Address)

A head address in the VOB of the VOBU indicated by the abovementioned VOBU_ENTN is recorded therein.

"VOBU_ENT" (FIG. 19)

VOBU_ENT (VOBU Entry) stores the following structure information of the corresponding VOBU in a format shown in FIG. 19. By adding succeeding fields in order, it is possible to obtain a time and address information necessary for accessing desirable VOBU.

ISTREF_SZ

Number of packs from a VOBU head pack to a pack including last data of the head I picture in the VOBU is recorded therein.

VOBU_PB_TM

The reproducing time length of the VOBU is recorded therein.

VOBU_SZ

The data amount of the VOBU is recorded therein.

"S_AVFIT" (FIG. 20)

S_AVFIT (Still picture AV File Information Table) has management information corresponding to the still picture AV file "RTR_STO.VRO" recorded therein, and comprises S_AVFITI, S_VOB_STI and S_AVFI.

"S_AVFITI" (FIG. 20)

S_AVFITI (Still Picture AV File Information Table Information) stores the following information necessary for accessing S_VOB_STI and S_AVFI.

S_AVFI_Ns (Number of Still Picture AV File Information)

"0" or "1" is recorded therein as the S_AVFI number. This value also corresponds to the still picture AV file number, that is, the presence of the RTR_STO.VRO file.

S_VOB_STI_Ns (Number of Still Picture VOB Stream Information)

Number of S_VOB_STI which will be described below is recorded therein.

S_AVFI_EA (Still Picture AV File Information End Address)

The end address of S_AVFI is recorded therein.

"S_VOB_STI" (FIG. 20)

In S_VOB_STI (Still Picture VOB Stream Information) is recorded the following information as the stream information of the still picture VOB.

V_ATR (Video Attribute)

Video compression mode, TV system, Aspect ratio, and Video resolution are recorded therein as video attribute information. Individual fields are the same as V_ATR in the above-mentioned M_VOB_STI.

OA_ATR (Audio Stream Attribute)

Audio coding mode, Application Flag, Quantization/DRC, fs, and Number of Audio channels are recorded as audio stream attribute information. Individual fields are the same as A_ATR0 in the above-mentioned M_VOB_STI.

SP_ATR (Sub-picture Attribute)

Application Flag is recorded therein as sub-picture attribute information. The field is the same as SP_ATR in the above-mentioned M_VOB_STI.

SP_PLT (Sub-picture Color Palette)

Color palette information for a sub-picture is recorded therein. A recording format is the same as SP_PLT in the above-mentioned M_VOB_STI.

"S_AVFI" (FIG. 23)

S_AVFI (Still Picture AV File Information) comprises information necessary for accessing a still picture VOG, S_AVFI_GI, S_VOGI_SRP and S_VOGI.

"S_AVFI_GI" (FIG. 23)

S_AVFI_GI (Still Picture AV File information General Information) stores S_VOGI_SRP_Ns.

S_VOGI_SRP_Ns (Number of Still Picture VOB Group Search Pointer)

Number of fields of S_VOGI_SRP which will be described below is recorded therein.

"S_VOGI_SRP" (FIG. 23)

S_VOGI_SRP (Static VOB Group Information Search Pointer) stores S_VOGI_SA.

The start address of S_VOGI is recorded in the S_VOGI_SA_SA (Still Picture VOB Group Information Start Address).

"S_VOGI" (FIG. 23)

The S_VOGI (Still Picture VOB Group Information) comprises the management information of the still picture VOB, S_VOGI_GI, S_VOB_ENT and CP_MNGI.

"S_VOG_GI" (FIG. 23)

The following information is recorded as the general information of a still picture VOB group in S_VOG_GI (Still Picture VOB Group General Information).

S_VOB_Ns (Number of Still Picture VOBs)

Number of still picture VOBs in the still picture VOB group is recorded therein.

S_VOB_STIN (S_VOB_STI Number)

Recorded therein is S_VOB_STI number of S_VOB_STI which stores the stream information of the still picture VOB. The S_VOB_STI number is the recording order in the above-mentioned S_VOB_STI table.

FIRST_VOB_REC_TM (First VOB Recording Data and Time)

The recording date and time information of the first (head) still picture VOB in the still picture VOB group is recorded therein.

LAST_VOB_REC_TM (Last VOB Recording Data and Time)

The recording date and time information of the last still picture VOB in the still picture VOB group is recorded therein.

S_VOB_SA (Still Picture VOB Group Start Address)

The start address of the still picture VOB group in the RTR_STO.VRO file is recorded therein.

"CP_MNGI"

CP_MNGI (Copy Management Information) stores copy management information related to the still picture VOB group. Individual fields are the same as the CP_MNGI of the above-mentioned M_VOBI.

"S_VOB_ENT" (FIG. 24)

S_VOB_ENT (Still Picture VOB Entry) corresponds to individual still picture VOBs in the still picture VOB group, and is divided into the following types A and B depending on the presence of audio data.

"S_VOB_ENT (Type A)" (FIG. 24)

The type A comprises S_VOB_ENT_TY and V_PART_SZ. Individual fields are as follows.

S_VOB_ENT_TY (Still Picture VOB Entry Type)

The type information of the still picture VOB is recorded therein in a format shown in FIG. 25.

MAP_TY

Any one of the following values for identifying the type A or the type B is recorded therein.

00b: Type A

01b: Type B

TE

Any one of the following values for identifying the status of the still picture VOB is recorded therein.

0b: Normal status

1b: Temporary erasing status

SPST_Ns

Number of sub-picture streams in the still picture VOB is recorded therein.

V_PART_SZ (Video Part Size)

The data amount of the still picture VOB is recorded therein.

"S_VOB_ENT (Type B)" (FIG. 24)

The type B has A_PART_SZ and A_PB_TM in addition to S_VOB_ENT_TY and V_PART_SZ. Individual fields are as follows.

S_VOB_ENT_TY (Still Picture VOB Entry Type)

The type information of the still picture VOB is recorded therein. Individual fields are the same as the above-mentioned type A.

V_PART_SZ (Video Part Size)

The data amount of a video part in the still picture VOB is recorded therein.

A_PART_SZ (Audio Part Size)

The data amount of an audio part in the still picture VOB is recorded therein.

A_PB_TM (Audio Reproducing Time)

The reproducing time length of the audio part of the still picture VOB is recorded.

"UD_PGCIT" (FIG. 26)

UD_PGCIT (User-Defined PGC Information Table) comprises UD_PGCITI, UD_PGCI_SRP and UD_PGCI.

"UD_PGCITI" (FIG. 26)

UD_PGCITI (User-Defined PGC Information Table Information) stores the following information constituting the user-defined PGC information table.

UD_PGCI_SRP_Ns (Number of User-Defined PGC Information Search Pointers)

Number of UD_PGCI_SRP is recorded therein.

UD_PGCIT_EA (User-Defined PGC Information Table End Address)

The end address of UD_PGCIT is recorded therein.

"UD_PGCI_SRP" (FIG. 26)

UD_PGCI_SA is recorded in UD_PGCI_SRP (User-Defined PGC Information Search Pointer).

UD_PGCI_SA (User-Defined PCG Information Start Address)

The start address of UD_PGCI is recorded in UD_PGCI_SA. A seek is carried out up to a recorded address when the PGCI is accessed.

"UD_PGCI" (FIG. 26)

The details of the UD_PGCI (User-Defined PGC Information) will be described in the following PGCI.

"O_PGCI" (FIG. 5)

The details of O_PGCI (Original PGC Information) will be described in the following PGCI.

"TXTDT_MG" (FIG. 27)

TXTDT_MG (Text Data Management) comprises TXTDTI, IT_TXT_SRP and IT_TXT. Individual fields are as follows.

"TXTDTI" (FIG. 27)

TXTDTI (Text Data Information) comprises CHRS, IT_TXT_SRP_Ns and TXTDT_MG_EA.

CHRS (Character Set Code)

A character set code to be used for the IT_TXT is recorded therein.

IT_TXT SRP_Ns (Number of IT_TXT Search Pointers)

Number of the IT_TXT_SRP is recorded therein.

TXTDT_MG_EA (Text Data Management End Address)

The end address of the TXTDT_MG is recorded therein.

"IT_TXT_SRP" (FIG. 27)

IT_TXT_SRP (IT_TXT Search Pointer) stores the following as access information to corresponding IT_TXT.

IT_TXT_SA (IT_TXT Start Address)

The start address of the IT_TXT is recorded therein. When the IT_TXT is accessed, a seek is carried out up to this address.

IT_TXT_SZ (IT_TXT Size)

The data size of the IT_TXT is recorded therein. When the IT_TXT is to be read, data with only this size is read.

"IT_TXT" (FIG. 27)

The IT_TXT comprises a plurality of sets or one set, each set having IDCD (identification code), TXT (text) corresponding to the IDCD and TMCD (termination code). When there is no TXT corresponding to the IDCD, the IDCD and the TMCD may make a set without TXT. The IDCD is defined as follows.

Genre Code
- 30h: Movie
- 31h: Music
- 32h: Drama
- 33h: Animation
- 34h: Sports
- 35h: Documentary
- 36h: News
- 37h: Weather
- 38h: Education
- 39h: Hobby
- 3Ah: Entertainment
- 3Bh: Art (play, opera)
- 3Ch: Shopping Input Source Code
- 60h: Broadcasting station
- 61h: Camcorder
- 62h: Photograph
- 63h: Memo
- 64h: Others

"PGCI" (FIG. 28)

PGCI (PGC Information) has a data structure which is common to O_PGCI and UD_PGCI, and comprises PGC_GI, PGI, CI_SRP and CI.

"PGC_GI" (FIG. 28)

PGC_GI (PGC_General Information) comprises PG_Ns and CI_SRP_Ns as the PGC general information. Individual fields are as follows.

PG_Ns (Number of Programs)

Number of programs in the PGC is recorded therein. For the user-defined PGC, "0" is recorded in this field because the user-defined PGC has no program.

CI_SRP_Ns (Number of CI_SRP)

Number of CI_SRP which will be described below is recorded.

"PGI" (FIG. 28)

PGI (Program Information) comprises PG_TY, C_Ns, PRM_TXTI, IT_TXT_SRPN and THM_PTRI. Individual fields are as follows.

PG_TY (Program Type)

The following information indicative of the status of this program is recorded therein by using a format shown in FIG. 29.

Protect (Protect)
- 0b: Normal status
- 1b: Protect status

C_Ns (Number of Cells)

Number of cells in this program is described.

PRM_TXTI (Primary Text Information)

Text information indicative of the contents of this program is recorded therein. The details are the same as in the above-mentioned PL_SRPT.

IT_TXT_SRPN (IT_TXT_SRP Number)

In the case where information indicative of the contents of this program is optionally recorded as the IT_TXT in addition to the abovementioned primary text, the number of IT_TXT_SRP recorded in the TXTDT_MG is recorded in this field.

THM_PTRI (Thumb Nail Pointer Information)

Thumb nail information which is representative of this program is described therein. The details of THM_PTRI are the same as in the THM_PTRI of the above-mentioned PL_SRPT.

"CI_SRP" (FIG. 28)

CI_SRP (Cell Information Search Pointer) stores address information for accessing the cell information.

CI_SA (Cell Information Start Address)

The start address of the cell information is recorded therein. In the case where the cell is accessed, a seek is carried out up to this address.

"CI" (FIG. 30)

CI (Cell Information) is classified into MI_CI for a motion picture and S_CI for a still picture.

"M_CI" (FIG. 30)

M_CI (Motion picture Cell Information) comprises M_C_GI and M___EPI.

"M_C_GI" (FIG. 30)

M_C_GI (Motion picture Cell General Information) has the following basic information constituting a cell.

C_TY (Cell Type)

Figure 31:
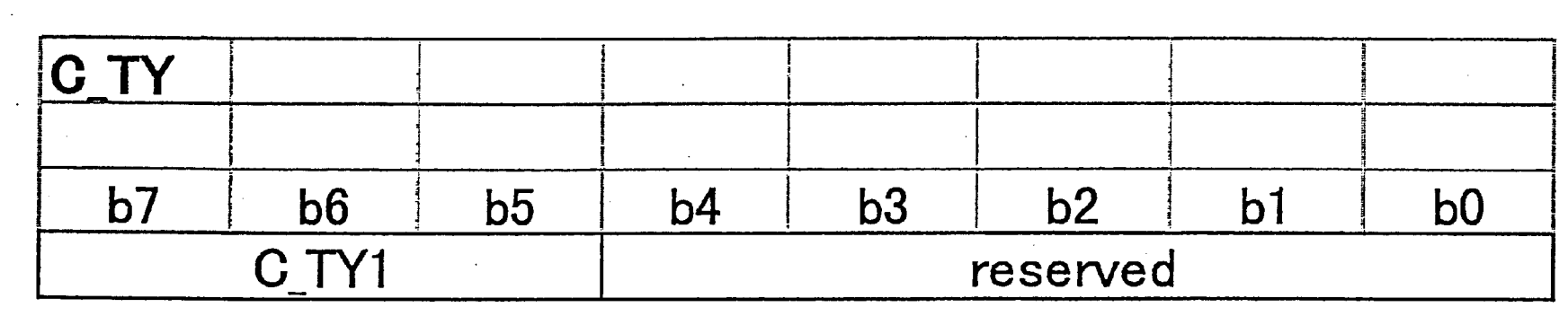

The following information for identifying a motion picture cell and a still picture cell are recorded in a format shown in FIG. 31.

C_TY1
  000b: Motion Picture (Movie) Cell
  001b: Still Picture Cell
M_VOBI_SRPN (Movie VOB Information Search Pointer Number)

The search pointer number of movie VOB information to which this cell corresponds is recorded therein. In the case where access is to be given to stream data to which this cell corresponds, access is first given to a movie VOB information search pointer number indicated by this field.

C_EPI_Ns (Number of Cell Entry Point Information)

Number of entry point present in this cell is recorded therein.

C_V_S_PTM (Cell Video Start Time)

The reproducing start time of this cell is recorded in a format shown in FIG. 10.

C_V_E_PTM (Cell Video End Time)

The reproducing end time of this cell is recorded in the format shown in FIG. 10. The effective interval of this cell in the VOB to which this cell corresponds is specified by using the C_V_S_PTM and C_V_E_PTM.

"M_C_EPI" (FIG. 32)

M_C_EPI (Motion Picture Cell Entry Point Information) is classified into a type A and a type B depending on the presence of a primary text.

"M_C_EPI (Type A)" (FIG. 32)

M_C_EPI (Type A) comprises the following information indicative of an entry point.

EP_TY (Entry Point Type)

Figure 33:
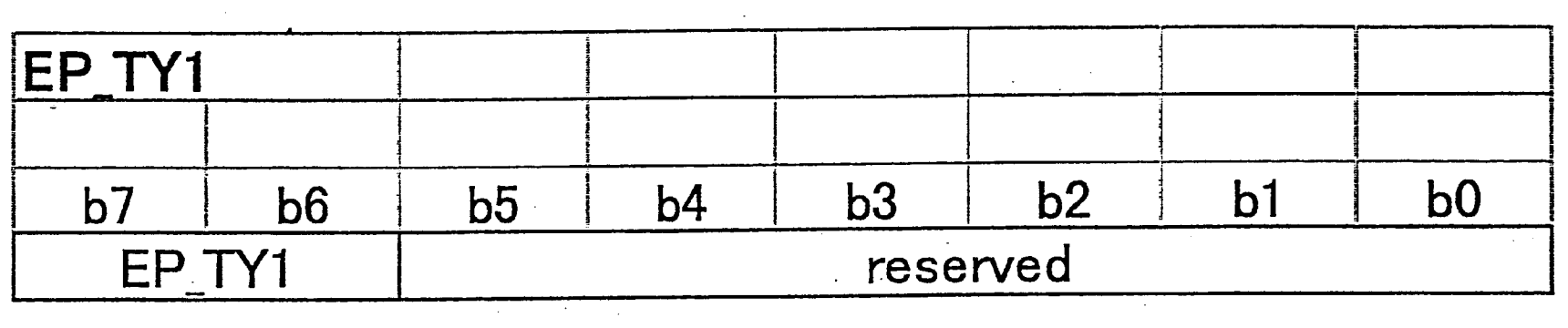

The following information for identifying the type of this entry point is recorded in accordance with a format shown in FIG. 33.

EP_TY1
  00b: Type A
  01b: Type B

EP_PTM (Entry Point Time)

A time that the entry point is put is recorded in accordance with the format shown in FIG. 10.

"M_C_EPI (Type B)" (FIG. 32)

M_C_EPI (Type B) has the following PRM_TXTI in addition to the EP_TY and EP_PTM included in the type A.

PRM_TXTI (Primary Text Information)

Recorded therein is text information indicative of the contents of locations indicated by this entry point. The details are the same as in the above-mentioned PL_SRPT.

"S_CI" (FIG. 30)

S_CI (Still Picture Cell Information) comprises S_C_GI and S_EPI.

"S_C_GI" (FIG. 30)

S_C_GI (Still Picture Cell General Information) has the following basic information constituting a cell.

C_TY (Cell Type)

Information for identifying a motion picture cell and a still picture cell are recorded. The details are the same as in the above-mentioned motion picture cell.

S_VOGI_SRPN (Still Picture VOB Group Information Search Pointer Number)

Recorded therein is the search pointer number of still picture VOB group information to which this cell corresponds. In the case where access is to be given to stream data to which this cell corresponds, access is first given to a still picture VOB group information search pointer number indicated by this field.

C_EPI_Ns (Number of Cell Entry Point Information)

Number of entry points present in this cell is recorded.

S_S_VOB_ENTN (Start Still Picture VOB Number)

The reproducing start still picture VOB number of this cell is recorded in the format shown in FIG. 11. The still picture VOB number is the order in the S_VOG indicated by the above-mentioned S_VOGI_SRPN.

E_S_VOB_ENTN (End Still Picture VOB Number)

The reproducing end still picture VOB number of this cell is recorded in the format shown in FIG. 11. The still picture VOB number is the order in the S_VOG indicated by the above-mentioned S_VOGI_SRPN. The effective interval of this cell in the S_VOG to which the cell corresponds is specified by using the S_S_VOB_ENTN and E_S_VOB_ENTN.

"S_C_EPI" (FIG. 32)

S_C_EPI (Still Picture Cell Entry Point Information) is classified into a type A and a type B depending on the presence of a primary text.

"S_C_EPI (Type A)" (FIG. 32)

S_C_EPI (Type A) comprises the following information indicative of an entry point.

EP_TY (Entry Point Type)

The following information for identifying the type of this entry point is recorded in accordance with a format shown in FIG. 33.

EP_TY1
  00b: Type A
  01b: Type B

S_VOB_ENTN (Still Picture VOB Entry Number)

A number of still picture on which an entry point is put is recorded therein in accordance with the format shown in FIG. 11.

"S_C_EPI (Type B)" (FIG. 32)

S_C_EPI (Type B) has the following PRM_TXTI in addition to the EP_TY and S_VOB_ENTN included in S_C_EPI of type A.

PRM_TXTI (Primary Text Information)

Recorded therein is text information indicative of the contents of locations indicated by this entry point. The details are the same as in the above-mentioned PL_SRPT.

(DVD Recorder)

Next, the structure of the DVD recorder in this embodiment will be described.

Figure 53:
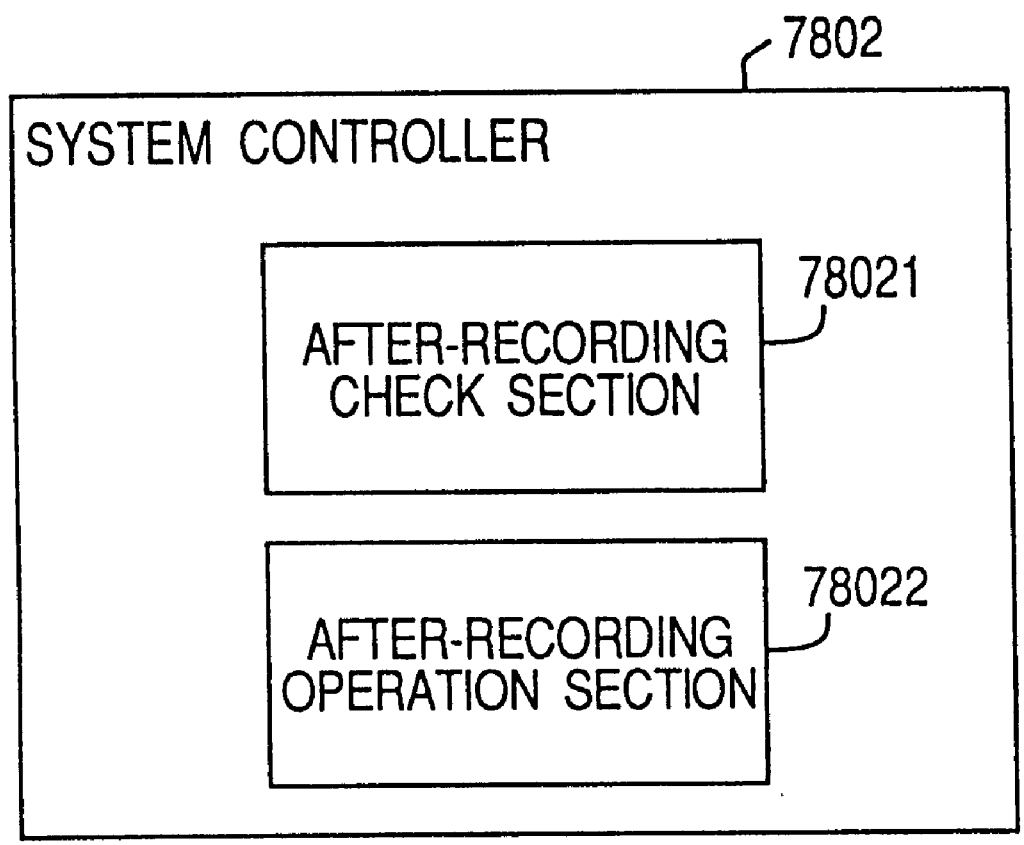
FIG. 53 is a diagram illustrating the structure of a system controller in the second embodiment.

The DVD-recorder of this embodiment has almost the same structure as the one of the first embodiment but differs in the following point. That is, in the DVD-recorder, the system controller 7802 includes an after-recording check section 78021 and an after-recording operation section 78022 for performing after-recording as shown in FIG. 53.

Though the operation of the recorder of this embodiment is almost same as in the first embodiment, a significant difference is that the after-recording check section 78021 in the recorder of this embodiment checks in advance whether the recorder has an ability to perform after-recording for an audio stream which is intended to be after-recorded.

As described above, the optical disc of this embodiment has bit rate information ("Bitrate") as attribute information of a dummy audio stream provided for after-recording in addition to audio coding mode information, and information of number of audio channels.

With reference to the audio attribute information, the DVD recorder checks in advance whether or not the recorder can perform an after-recording operation by using the dummy audio stream.

Concretely, it is determined whether the after-recording operation is possible or not by comparing audio coding mode, audio channel number and bit rate with an encode ability of the DVD recorder.

When the after-recording operation is determined to be possible, the after-recording operation is performed as in the first embodiment. When the after-recording operation is determined to be impossible, the user is notified that the after-recording operation is impossible via the user interface 7801 in a predetermined manner (for example, to display message). This operation is described below with reference to flow charts in FIGS. 54, 55 and 56.

Figure 54:
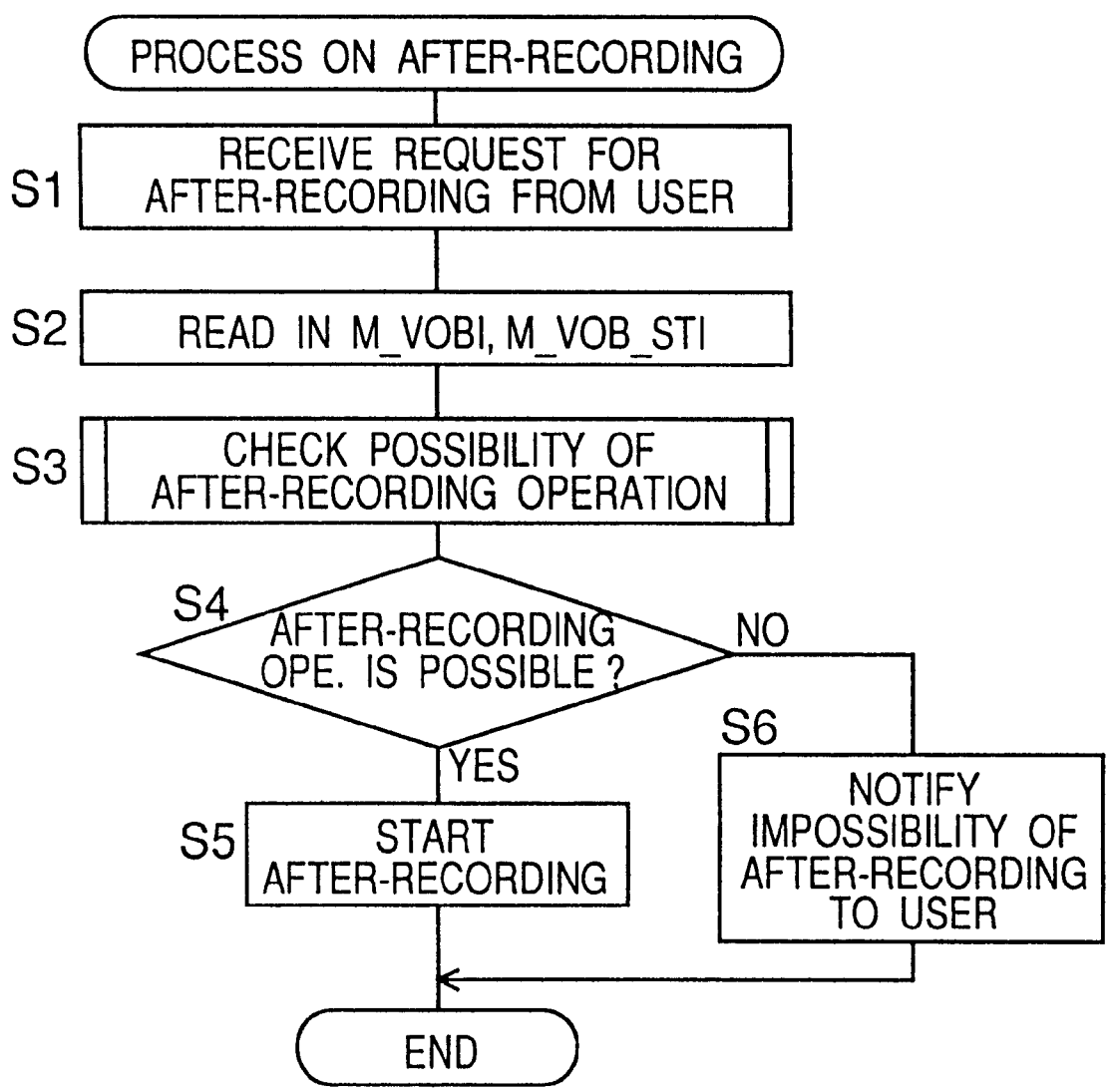
FIG. 54 is a flowchart of process on after-recording or dubbing by a DVD recorder in the second embodiment.

Referring to FIG. 54, upon receiving a user request for after-recording to a desired program (PG) via the user interface 7801 (S1), the system controller 7802 reads in movie VOB information (M_VOBI) and movie VOB stream information (M_VOB_STI) related to the designated program (PG) (S2). Then, the possibility of an after-recording operation in the recorder is checked (S3). That is, it is determined whether or not the after-recording operation is possible with reference to M_VOBI and M_VOB_STI (S3). With the result, when the after-recording operation is determined to be possible (S4), the controller starts the after-recording operation (S5). When the after-recording operation is determined to be impossible (S4), the controller notifies the user that the after recording operation is impossible (for example, displays message) (S6).

Figure 55:
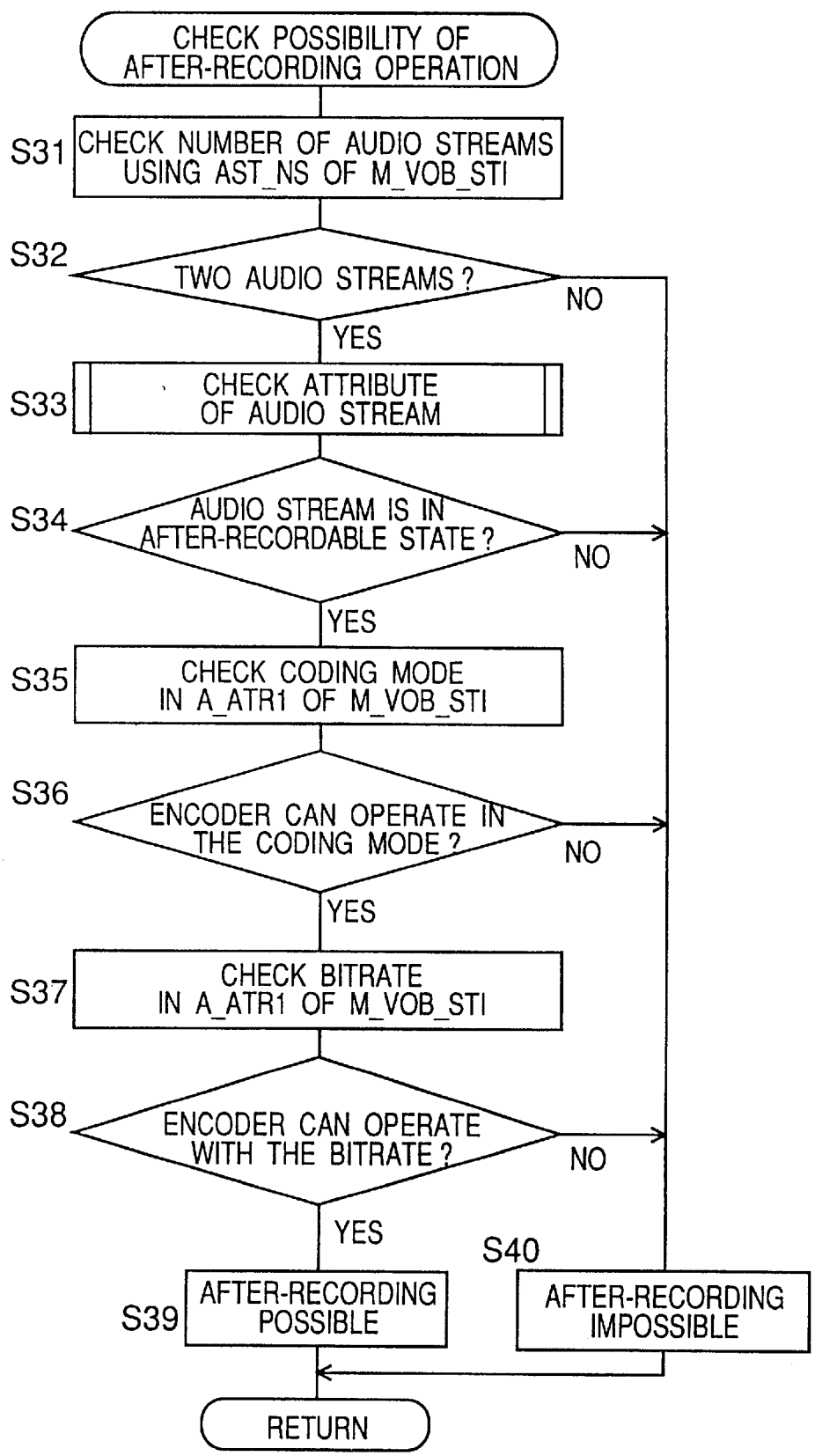
FIG. 55 is a flowchart of a check routine for checking possibility of an after-recording operation in the after-recording process.

The check routine of the possibility of the after-recording operation (step S3) is performed as follows in accordance with the flowchart of FIG. 55.

The controller checks number of audio streams based on AST_Ns of M_VOB_STI (in FIG. 12) (S31). When there are two audio streams (S32), attribute of each audio stream is checked or determined whether or not each audio stream is in a state where it is possible to perform the after-recording operation to the stream (referred to as "after-recordable state") (S33). Details of this process will be described later. With the result of the check, when the audio stream is in after-recordable state (S34), coding mode ("Audio Coding Mode") (see FIG. 13) in A_ATR1 of M_VOB_STI is checked (S35). When an encoder of the DVD recorder is operable in the checked coding mode (S36), bit rate ("Bitrate") in A_ATR1 of M_VOB_STI is checked (S37). When the encoder is operable in the checked bit rate (S38), it is decided that the after-recording operation is "possible" (S39). Otherwise, it is decided that an after-recording operation is "impossible" (S40).

Figure 56:
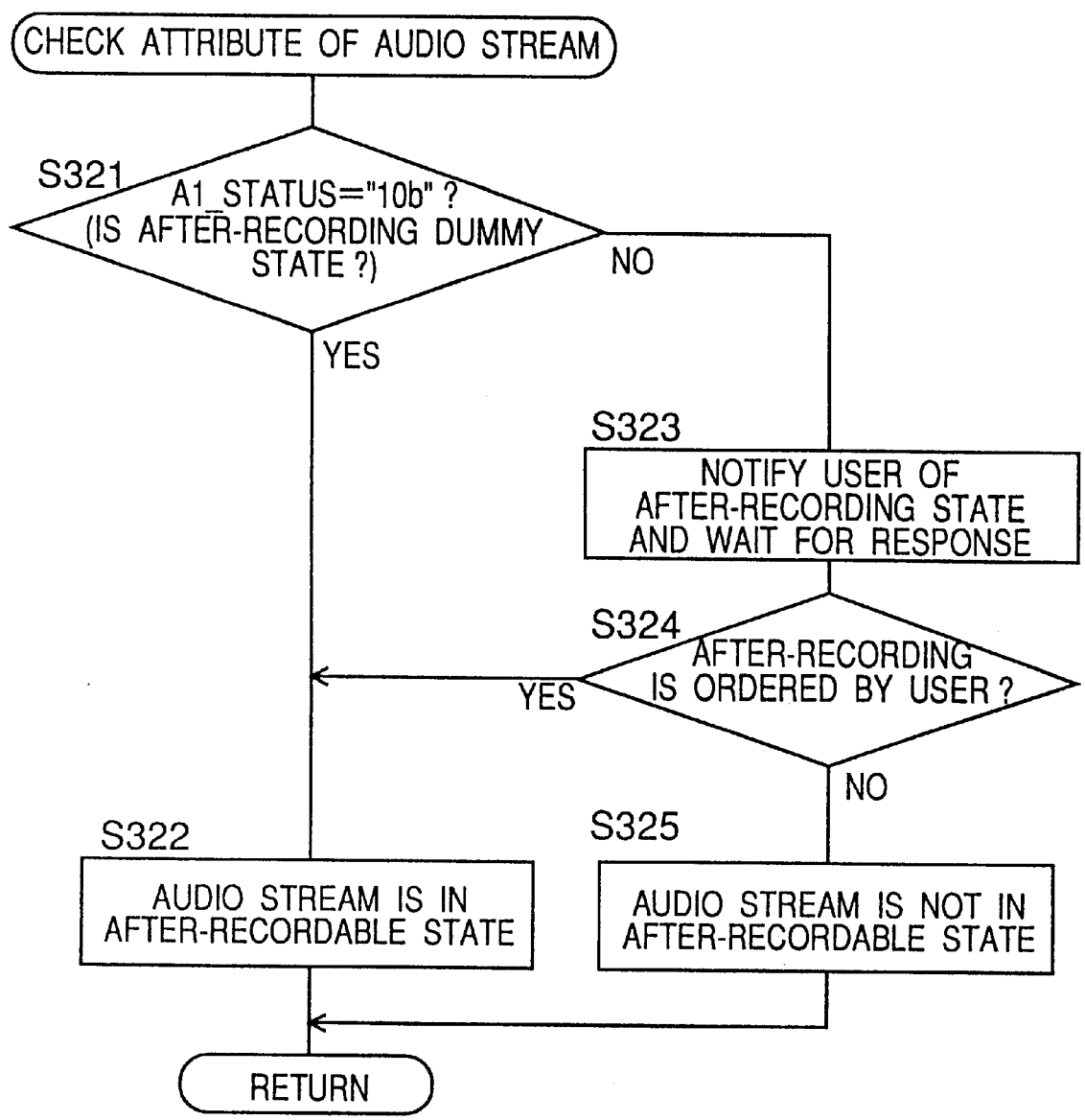
FIG. 56 is a flowchart of check routine for checking an attribute of an audio stream in the after-recording possibility check routine.

The check routine of attribute of audio stream (step S33) is performed as follows in accordance with the flowchart in FIG. 56.

Firstly, it is determined whether the A1_STATUS of audio stream for after-recording (audio stream 2) (see FIG. 17) is in "dummy state for after-recording" (S321). When the A1_STATUS is in "dummy state for after-recording", the audio stream is decided to be in "after-recordable state" (S322). It is noted that "dummy state for after-recording" indicates that the audio stream is prepared for after-recording but that after-recording data have not been recorded yet in the audio stream. When the A1_STATUS is not in "dummy state for after-recording", notice is served to user that the audio stream has already been after-recorded, and user's response is waited (S323). When after-recording is ordered by user in the response (S324), the audio stream is decided to be in after-recordable state (S322). When after-recording is not ordered by user in the response (S324), the audio stream is decided not to be in after-recordable state (S325).

The DVD recorder according to this embodiment creates the management information for each motion picture recording. The DVD recorder especially creates audio coding mode, number of audio channels and bit rate information as an audio stream attribute information, and records them onto the optical disc.

While in this embodiment the recorder is provided for the DVD-RAM disc, this invention is not limited to DVD-RAM but applicable to re-writable disc.

While in this embodiment details of data structure on the disc is described, the data structure is not limited to the structure described above. That is, this invention can be implemented by the recorder that compares audio attribute information including bit rate with encoding ability in advance when the recorder performs after-recording.

While in this embodiment the description is made for two audio streams, same advantage could be obtained when only one audio stream is recorded as in the case where two audio streams are recorded.

Although the present invention has been described in connection with specified embodiments thereof, many other modifications, corrections and applications are apparent to those skilled in the art. Therefore, the present invention is not limited by the disclosure provided herein but limited only to the scope of the appended claims.

What is claimed is:

1. An information recording medium comprising an area for storing at least one video object and an area for storing management information, wherein:

the video object includes a video stream which is obtained by coding a video signal, a first audio stream which is obtained by coding an audio signal and a second audio stream which is obtained by coding an audio signal;

the management information comprises a first management information and a second management information;

the first management information includes at least one stream information, the stream information includes a bit rate of the first audio stream, bit rate of the second audio stream, number of audio streams included in the video object, coding mode of the first audio stream, and coding mode of the second audio stream;

the second management information stores management information for the video object that includes a status information and a specified number, the status information indicates whether or not the second audio stream is provided for after-recording operation, and whether or not the after-recording data is recorded to the second audio stream when the second audio stream is provided for after-recording operation, and the specified number designates one of the stream information corresponding to the video object.

2. An information recording apparatus for performing after-recording to the second audio stream included in the video object stored on the information recording medium according to claim 1, the apparatus comprising:

checking section for checking in advance whether or not the apparatus is operable to perform after-recording to the second audio stream based on at least the status information and the bit rate included in the management information before the after-recording operation; and starting section for starting after-recording operation when it is decided by the checking section that the apparatus is operable to perform after-recording to the second audio stream.

3. The apparatus according to claim 2, wherein the checking section comprises:

a first determining section for determining whether or not the second audio stream is in a status where the after-recording operation can be done with reference to the status information of the second audio stream included in the management information;

a second determining section for determining whether or not the apparatus is able to encode the second audio stream with reference to the bit rate of the second audio stream included in the management information; and a third determining section for determining that the apparatus is able to perform after-recording when it is determined that the second audio stream is in the status where the after-recording operation can be done and that the apparatus is able to encode the second audio stream.

4. The apparatus according to claim 3, wherein the checking section further comprises a notifying section for notifying a user that after-recording operation is impossible when the third determining section determines that the apparatus is not able to perform after-recording.

5. The apparatus according to claim 3, wherein when the management information further comprises the number of audio streams included in the video object, the first determining section makes the determination with reference to the number of audio streams in addition to the status information.

6. The apparatus according to claim 3, wherein when the management information further comprises coding mode of the second audio stream, the second determining section determines whether or not the apparatus can encode the second audio stream with reference to the coding mode of the second audio stream in addition to the bit rate of the second audio stream.

7. A method for performing after-recording to the second audio stream recorded on the recording medium according to claim 1 by using a recording apparatus, the method comprising:

checking in advance whether or not the apparatus is operable to perform after-recording to the second audio stream based on at least the status information and the bit rate included in the management-information before the after-recording operation; and starting after-recording operation when it is decided by the checking that the apparatus is operable to perform after-recording to the second audio stream.

8. The method according to claim 7, wherein the checking comprises:

first determining whether or not the second audio stream is in a status where the after-recording operation can be done with reference to the status information of the second audio stream included in the management information;

second determining whether or not the apparatus is able to encode the second audio stream with reference to the bit rate of the second audio stream included in the management information; and third determining that the apparatus is able to perform after-recording when it is determined that the second audio stream is in the status where the after-recording operation can be done and that the apparatus is able to encode the second audio stream.

9. The method according to claim 8, wherein the checking further comprises notifying a user that after-recording operation is impossible when by the third determining it is determined that the apparatus is not able to perform after-recording.

10. The method according to claim 8, wherein when the management information further comprises the number of audio streams included in the video object, the first determining makes the determination with reference to the number of audio streams in addition to the status information.

11. The method according to claim 8, wherein when the management information further comprises coding mode of the second audio stream, the second determining determines whether or not the apparatus can encode the second audio stream with reference to the coding mode of the second audio stream in addition to the bit rate of the second audio stream.

12. A reproduction apparatus for reproducing information recorded in the information recording medium according to claim 1.

13. An information recording medium comprising:

an area operable to store at least one video object and an area operable to store management information;

wherein the video object comprises a video stream which is obtained by coding a video signal, a first audio stream which is obtained by coding an audio signal, and a second audio stream which is obtained by coding an audio signal;

wherein the management information comprises a first management information and a second management information;

wherein the first management information comprises at least one stream information, the stream information comprises bit rate of the first audio stream, bit rate of the second audio stream, number of audio streams included in the video object, coding mode of the first audio stream, and coding mode of the second audio stream; and wherein the second management information comprises management information for the video object that includes a status information and a specified number, the status information operable to indicate whether or not the second audio stream is provided for after-recording operation, and operable to indicate whether or not the after-recording data is recorded to the second audio stream when the second audio stream is provided for after-recording operation, and the specified number is operable to designate one of the stream information corresponding to the video object.

14. An information recording apparatus for performing after-recording to the second audio stream included in the video object stored on the information recording medium according to claim 13, said information recording apparatus comprising:

checking section operable to check in advance whether or not said information recording apparatus is operable to perform after-recording to the second audio stream based on at least the status information and the bit rate included in the management information before the after-recording operation; and starting section operable to start the after-recording operation when it is decided by said checking section that said information recording apparatus is operable to perform after-recording to the second audio stream.

15. An information recording apparatus as claimed in claim 14, wherein said checking section comprises:

a first determining section operable to determine whether or not the second audio stream is in a status where the after-recording operation can be performed with reference to the status information of the second audio stream included in the management information;

a second determining section operable to determine whether or not said information recording apparatus is able to encode the second audio stream with reference to the bit rate of the second audio stream included in the management information; and a third determining section operable to determine that said information recording apparatus is able to perform after-recording when it is determined that the second audio stream is in the status where the after-recording operation can be performed and that said information recording apparatus is able to encode the second audio stream.

16. An information recording apparatus as claimed in claim 15, wherein said checking section further comprises a notifying section operable to notify a user that the after-recording operation is impossible when said third determining section determines that said information recording apparatus is not able to perform after-recording.

17. An information recording apparatus as claimed in claim 15, wherein said first determining section is operable to make the determination with reference to the number of audio streams included in the video object in addition to the status information.

18. An information recording apparatus as claimed in claim 15, wherein said second determining section is operable to determine whether or not said information recording apparatus can encode the second audio stream with reference to the coding mode of the second audio stream in addition to the bit rate of the second audio stream.

19. A method for performing after-recording to the second audio stream recorded on the information recording medium according to claim 13 by using a recording apparatus, said method comprising:

checking in advance whether or not the recording apparatus is operable to perform after-recording to the second audio stream based on at least the status information and the bit rate included in the management information before the after-recording operation; and starting the after-recording operation when it is decided by said checking that the recording apparatus is operable to perform after-recording to the second audio stream.

20. A method as claimed in claim 19, wherein said checking comprises:

first determining whether or not the second audio stream is in a status where the after-recording operation can be performed with reference to the status information of the second audio stream included in the management information;

second determining whether or not the recording apparatus is able to encode the second audio stream with reference to the bit rate of the second audio stream included in the management information; and third determining that the recording apparatus is able to perform after-recording when it is determined that the second audio stream is in the status where the after-recording operation can be performed and that the recording apparatus is able to encode the second audio stream.

21. A method as claimed in claim 20, wherein said checking further comprises notifying a user that the after-recording operation is impossible when by said third determining it is determined that the recording apparatus is not able to perform after-recording.

22. A method as claimed in claim 20, wherein said first determining makes the determination with reference to the number of audio streams included in the video object in addition to the status information.

23. A method as claimed in claim 20, wherein said second determining determines whether or not the recording apparatus can encode the second audio stream with reference to the coding mode of the second audio stream in addition to the bit rate of the second audio stream.

24. A reproduction apparatus for reproducing information recorded in the information recording medium according to claim 13.

* * * * *

UNITED STATES PATENT AND TRADEMARK OFFICE
CERTIFICATE OF CORRECTION

PATENT NO. : 6,529,682 B1  Page 1 of 2
DATED : March 4, 2003
INVENTOR(S) : Tomoyuki Okada et al.

It is certified that error appears in the above-identified patent and that said Letters Patent is hereby corrected as shown below:

Title page,
Item [56], References Cited, please add the following U.S. PATENT DOCUMENTS:
-- 6,374,037 B1 4/2002 Okada et al.
   6,016,295    1/2000 Endoh et al. --
Item [57], ABSTRACT,
Line 4, add -- an -- after "includes".

Column 1,
Line 25, delete "." after "AV".

Column 2,
Line 50, change "data to" to -- data ([a1, a2]) to --.

Column 3,
Line 20, change "intraframe" to -- intra-frame --.

Column 4,
Line 5, change "(PS-TD)" to -- E-STD (Extended System Target Decoder) --.

Column 6,
Line 52, change "coritents" to -- contents --.

Column 7,
Line 58, change "(P-STD)" to -- E-STD (Extended System Target Decoder) --.

Column 14,
Line 15, delete "-" after "are".

Column 16,
Line 2, delete "-" after "divided".

Column 18,
Line 36, change "therein.." to -- therein. --.

Column 19,
Line 12, delete "." after "picture".
Line 53, change "01b: 625 50 (PAL)" to -- 01b: 625/50 (PAL) --.

Column 21,
Line 51, change "M_VOBI SRP" to -- M_VOBI_SRP --.
Line 63, change "M_VOB GI" to -- M_VOB_GI --.
Line 66, change "Movie_VOB" to -- Movie VOB --.

UNITED STATES PATENT AND TRADEMARK OFFICE
CERTIFICATE OF CORRECTION

PATENT NO. : 6,529,682 B1
DATED : March 4, 2003
INVENTOR(S) : Tomoyuki Okada et al.

It is certified that error appears in the above-identified patent and that said Letters Patent is hereby corrected as shown below:

Column 22,
Line 23, delete "the" after "recorded".
Line 24, change "rein" to -- therein --.

Column 23,
Line 42, change "PREV_VOB_LAST SCR (Previous VOB Last SCR)" to
-- PREV_VOB_LAST_SCR (Previous VOB Last SCR) --.

Column 25,
Line 45, change "S_VOGI_SA_SA (Still Picture VOB Group Information Address)." to
-- S_VOGI_SA (Still Picture VOB Group Information Start Address). --.

Column 27,
Line 28, change "IT_TXT SRP_Ns (Number of IT_TXT Search Pointers)" to
-- IT_TXT_SRP_Ns (Number of IT_TXT Search Pointers) --.

Column 28,
Line 9, change "PGC_GI (PGC_General Information) comprises" to
-- PGC_GI (PGC General Information) comprises --.
Line 59, change "M___EPI" to -- M_C_EPI --.

Column 29,
Line 49, change "S___EPI." to -- S_C_EPI. --.

Signed and Sealed this

Seventh Day of October, 2003

JAMES E. ROGAN
*Director of the United States Patent and Trademark Office*